(12) United States Patent
Bao et al.

(10) Patent No.: US 12,520,273 B2
(45) Date of Patent: Jan. 6, 2026

(54) PRS MEASUREMENT SHARING FOR VIRTUAL UE

(71) Applicant: QUALCOMM INCORPORATED, San Diego, CA (US)

(72) Inventors: Jingchao Bao, San Diego, CA (US); Sony Akkarakaran, Poway, CA (US); Tao Luo, San Diego, CA (US); Juan Montojo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 18/264,540

(22) PCT Filed: Feb. 25, 2022

(86) PCT No.: PCT/US2022/017968
§ 371 (c)(1),
(2) Date: Aug. 7, 2023

(87) PCT Pub. No.: WO2022/220934
PCT Pub. Date: Oct. 20, 2022

(65) Prior Publication Data
US 2024/0049168 A1    Feb. 8, 2024

(30) Foreign Application Priority Data
Apr. 13, 2021  (GR) .............................. 20210100254

(51) Int. Cl.
*H04W 64/00* (2009.01)
*G01S 5/00* (2006.01)
*H04W 84/18* (2009.01)

(52) U.S. Cl.
CPC ......... *H04W 64/006* (2013.01); *G01S 5/0072* (2013.01); *H04W 84/18* (2013.01)

(58) Field of Classification Search
CPC ... H04W 64/006; H04W 84/18; H04W 4/023; H04W 4/08; H04W 8/005; H04W 24/08;
(Continued)

(56) References Cited

U.S. PATENT DOCUMENTS 8,849,253 B2 *   9/2014   Nasir ..................... H04W 4/021
                                                                  455/412.2
9,769,610 B1 *   9/2017   Gordon ................. G06F 3/0482
(Continued)

FOREIGN PATENT DOCUMENTS

EP          2676379 B1 *   9/2016    ............. H04B 7/024
JP        2014529947 A    11/2014
(Continued)

OTHER PUBLICATIONS

Taiwan Search Report—TW111107404—TIPO—Jun. 2, 2025.
(Continued)

*Primary Examiner* — Mahendra R Patel
(74) *Attorney, Agent, or Firm* — QUALCOMM Incorporated

(57) ABSTRACT

This disclosure relates to communication device and method of managing a user equipment group, first user equipment and method of providing position information from a first user equipment. A method of managing a UE group includes: determining a plurality of UEs of the UE group based on proximity of each of the plurality of UEs to at least one other UE of the plurality of UEs; and transmitting, from a communication device, to at least one of the plurality of UEs of the UE group, an indication of the UE group.

32 Claims, 17 Drawing Sheets

(58) Field of Classification Search
CPC ..... H04W 64/00; H04W 76/14; G01S 5/0072; H04L 43/0864; H04L 41/0895; H04L 43/106; H04L 43/16; H04L 41/0894; H04L 43/20; H04L 5/0048
USPC ...................................................... 455/456.1
See application file for complete search history.

(56) References Cited

U.S. PATENT DOCUMENTS

| | | | | |
|---|---|---|---|---|
| 11,601,925 | B2* | 3/2023 | Raghavan | H04L 5/0091 |
| 12,156,222 | B2* | 11/2024 | Selvanesan | H04W 72/04 |
| 2008/0146265 | A1* | 6/2008 | Valavi | A61B 5/002 |
| | | | | 455/550.1 |
| 2010/0159952 | A1* | 6/2010 | Hanson | H04W 4/029 |
| | | | | 455/456.2 |
| 2013/0165151 | A1* | 6/2013 | Gits | H04L 67/303 |
| | | | | 455/456.3 |
| 2016/0135235 | A1* | 5/2016 | Elmaleh | H04W 4/08 |
| | | | | 370/329 |
| 2017/0265018 | A1* | 9/2017 | Mok | H04W 4/90 |
| 2020/0092685 | A1* | 3/2020 | Fehrenbach | H04W 72/23 |
| 2020/0128486 | A1* | 4/2020 | Herrmann | H04W 4/08 |
| 2021/0351878 | A1* | 11/2021 | Kwak | H04L 1/20 |
| 2022/0217771 | A1* | 7/2022 | Liu | H04L 5/16 |
| 2022/0244344 | A1* | 8/2022 | Bao | H04W 64/00 |
| 2023/0221397 | A1* | 7/2023 | Baek | H04L 5/005 |
| | | | | 455/456.1 |

FOREIGN PATENT DOCUMENTS

| | | | | |
|---|---|---|---|---|
| JP | | 2017192068 A | 10/2017 | |
| WO | WO-2017210002 A1 * | | 12/2017 | ......... G08B 13/1427 |

OTHER PUBLICATIONS

"3rd Generation Partnership Project, Technical Specification Group Services and System Aspects, Service Enabler Architecture Layer for Verticals (SEAL), Functional Architecture and Information Flows, (Release 17) ", 3GPP Standard, Technical Specification, 3GPP TS 23. 434, 3rd Generation Partnership Project, Mobile Competence Centre, 650, Route Des Lucioles, F-06921 Sophia-Antipolis Cedex, France, vol. SA WG6, No. V17.1.0, Apr. 2, 2021, pp. 1-132, XP052000427.
International Search Report and Written Opinion—PCT/US2022/017968—ISA/EPO—Jul. 18, 2022.
Partial International Search Report—PCT/US2022/017968—ISA/EPO—May 24, 2022.

* cited by examiner

PRS MEASUREMENT SHARING FOR VIRTUAL UE

CROSS-REFERENCE TO RELATED APPLICATIONS

This application is the National Stage of International Application No. PCT/US2022/017968, filed Feb. 25, 2022, entitled "PRS MEASUREMENT SHARING FOR VIRTUAL UE," which claims the benefit of Greek Patent Application No. 20210100254, filed Apr. 13, 2021, entitled "PRS MEASUREMENT SHARING FOR VIRTUAL UE," both of which are assigned to the assignee hereof, and the entire contents of both of which are hereby incorporated herein by reference for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

In an embodiment, a first UE (user equipment) includes: a transceiver; a memory; and a processor, communicatively coupled to the transceiver and the memory, configured to: communicate, via the transceiver, with a second UE to identify a first PRS measurement (positioning reference signal measurement) to be made by the second UE; receive, via the transceiver from the second UE via sidelink communication, first position information based on the first PRS measurement; and transmit, via the transceiver to a network entity, the first position information.

In another embodiment, a first UE includes: a transceiver; a memory; and a processor, communicatively coupled to the transceiver and the memory, configured to: transmit, via the transceiver, a position-information-sharing capability of the first UE to a second UE via sidelink communication; receive, via the transceiver from the second UE via sidelink communication, a request for first position information; measure a PRS resource received from a network entity to determine a PRS measurement; and transmit, via the transceiver to the second UE via sidelink communication, the first position information based on the PRS measurement.

In another embodiment, a communication device for managing a UE group includes: a transceiver; a memory; and a processor, communicatively coupled to the transceiver and the memory, configured to: determine a plurality of UEs of the UE group based on proximity of each of the plurality of UEs to at least one other UE of the plurality of UEs; and transmit, via the transceiver to at least one of the plurality of UEs of the UE group, an indication of the UE group.

In another embodiment, a first UE includes: a transceiver; a memory; and a processor, communicatively coupled to the transceiver and the memory, configured to: receive, via the transceiver, a UE group indication indicating a group of UEs including the first UE and a second UE; and communicate, via the transceiver using sidelink communication, with the second UE to identify first position information to be determined by the first UE, or second position information to be determined by the second UE, or a combination thereof.

In another embodiment, a first UE includes: a transceiver; a memory; and a processor, communicatively coupled to the transceiver and the memory, configured to: measure a first PRS resource to determine a first PRS measurement; receive, via the transceiver from a second UE via sidelink communication, a second PRS measurement of a second PRS resource; and determine whether at least one of the first PRS measurement or the second PRS measurement is unreliable based on a relationship of the first PRS measurement to the second PRS measurement.

DETAILED DESCRIPTION

Figure 1:
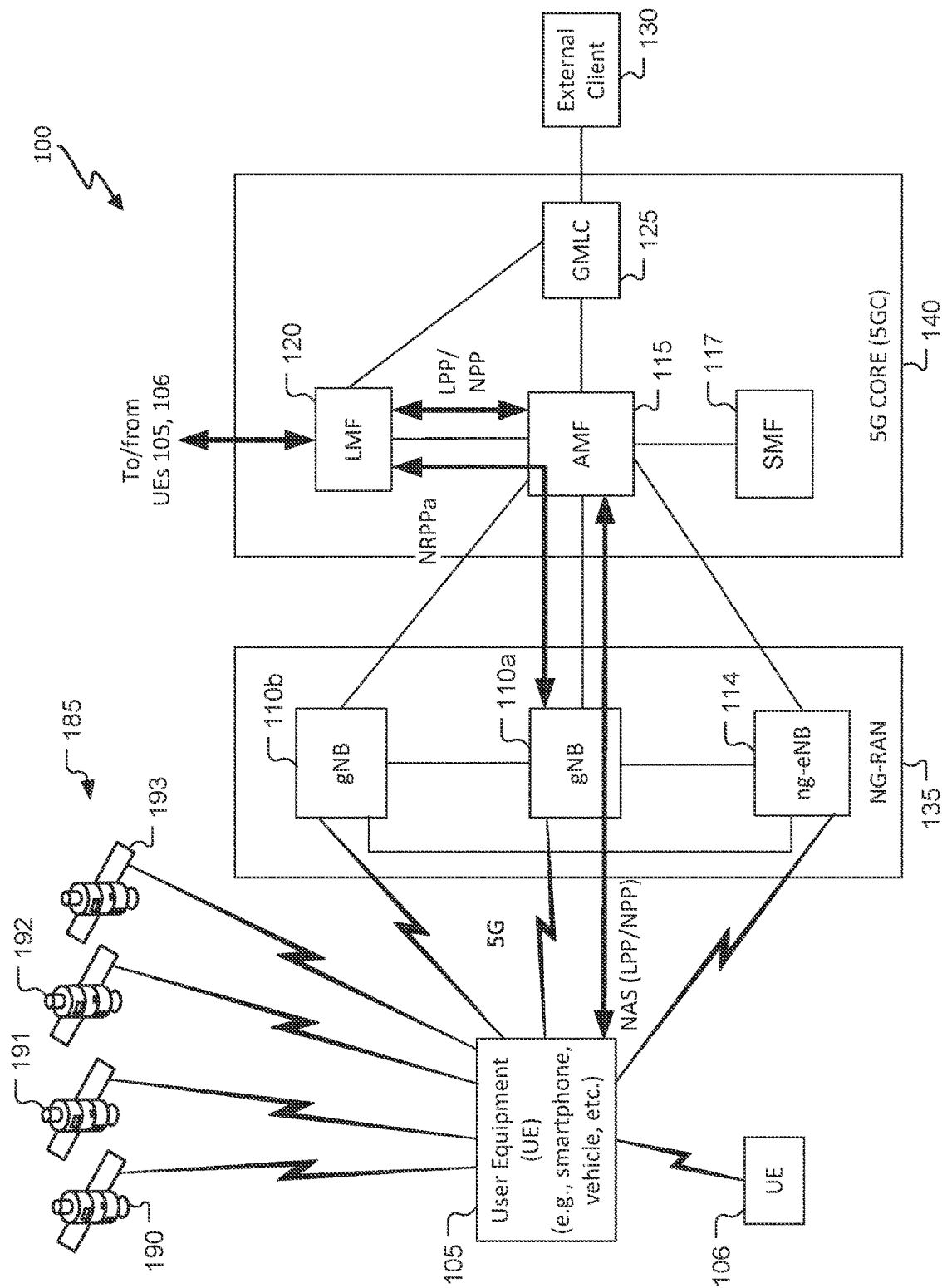
FIG. 1 is a simplified diagram of an example wireless communications system.

Techniques are discussed herein for measuring PRS (positioning reference signal(s)) and reporting PRS measurements. For example, UEs (user equipments) may share one or more PRS measurements. A recipient UE may obtain position information (e.g., one or more PRS measurements, one or more processed PRS measurements (e.g., one or more pseudoranges), and/or one or more location estimates) from a nearby donor UE and report the position information from the donor UE as position information for the recipient UE (e.g., as though the recipient UE made the measurement(s) and/or that a location estimate is for the recipient UE). The recipient UE may make PRS measurements in addition to receiving one or more measurements from one or more donor UEs, or may make no PRS measurements and receive all PRS measurements from the donor UE(s). Also or alternatively, multiple UEs may form a virtual UE, acting in concert, e.g., sharing position information and reporting position information as a group (e.g., from a single delegate, from multiple delegates, and/or from each of the group members), e.g., with position information being associated with a group ID for the virtual UE. A positioning entity (e.g., a location management function (LMF), an LMF in RAN (radio access network), or a UE) may coordinate the group, e.g., adding group members, removing group members, coordinating which group members measure which PRS and/or provide which position information. Also or alternatively, a UE may cross validate a PRS measurement received from another UE. For example, a recipient UE may receive a first PRS measurement from a first donor UE and compare the first measurement with a second PRS measurement made by the recipient UE and/or a third PRS measurement received from a second donor UE and determine whether the first PRS measurement differs significantly from the second PRS measurement and/or the third PRS measurement. If at least one of the PRS measurements is suspected of being unreliable (e.g., corresponding to a PRS received via a non-line-of-sight (NLOS) path), then the arrival timing of the PRS corresponding to the PRS measurements may be used to determine which PRS measurement may be reliable (e.g., corresponding to a PRS received from a line-of-sight (LOS) path). These are examples, and other examples may be implemented.

Items and/or techniques described herein may provide one or more of the following capabilities, as well as other capabilities not mentioned. PRS processing overhead may be reduced, e.g., by sharing PRS measurements. PRS processing by a particular UE may be reduced, e.g., by managing PRS measurements to have another UE perform one or more PRS measurements instead of the particular UE. Power consumption for PRS processing may be reduced, e.g., by one or more UEs and/or by a server (e.g., an LMF). Positioning accuracy may be improved, e.g., by obtaining more accurate PRS measurement by a donor UE than measurable by a beneficiary UE and providing the PRS measurement for the benefit of the beneficiary UE. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Obtaining the locations of mobile devices that are accessing a wireless network may be useful for many applications including, for example, emergency calls, personal navigation, consumer asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station." a "user terminal" or UT, a "mobile terminal," a "mobile station," a "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110*a*, 110*b*, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110*a*, 110*b*, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies.

The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the IMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS (Synchronization Signal) or PRS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the UE's position.

Figure 2:
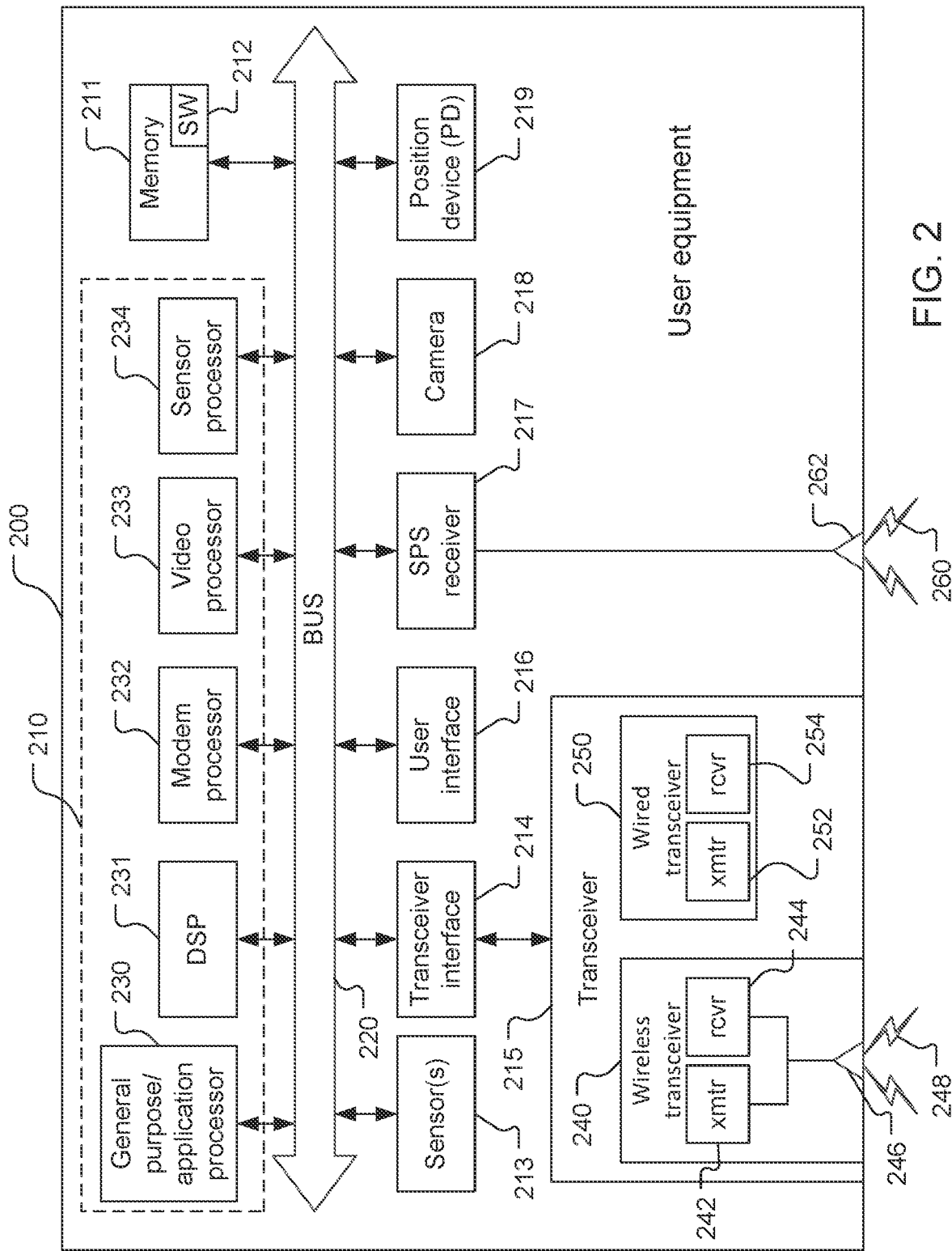
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
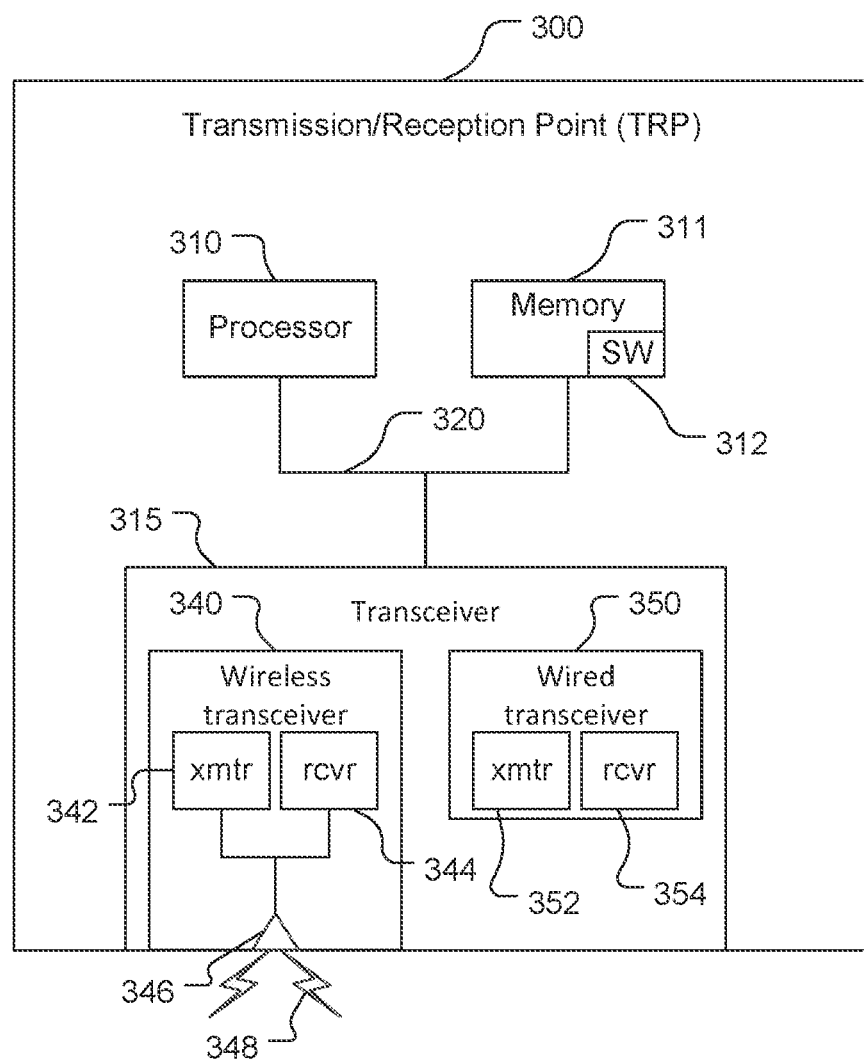
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
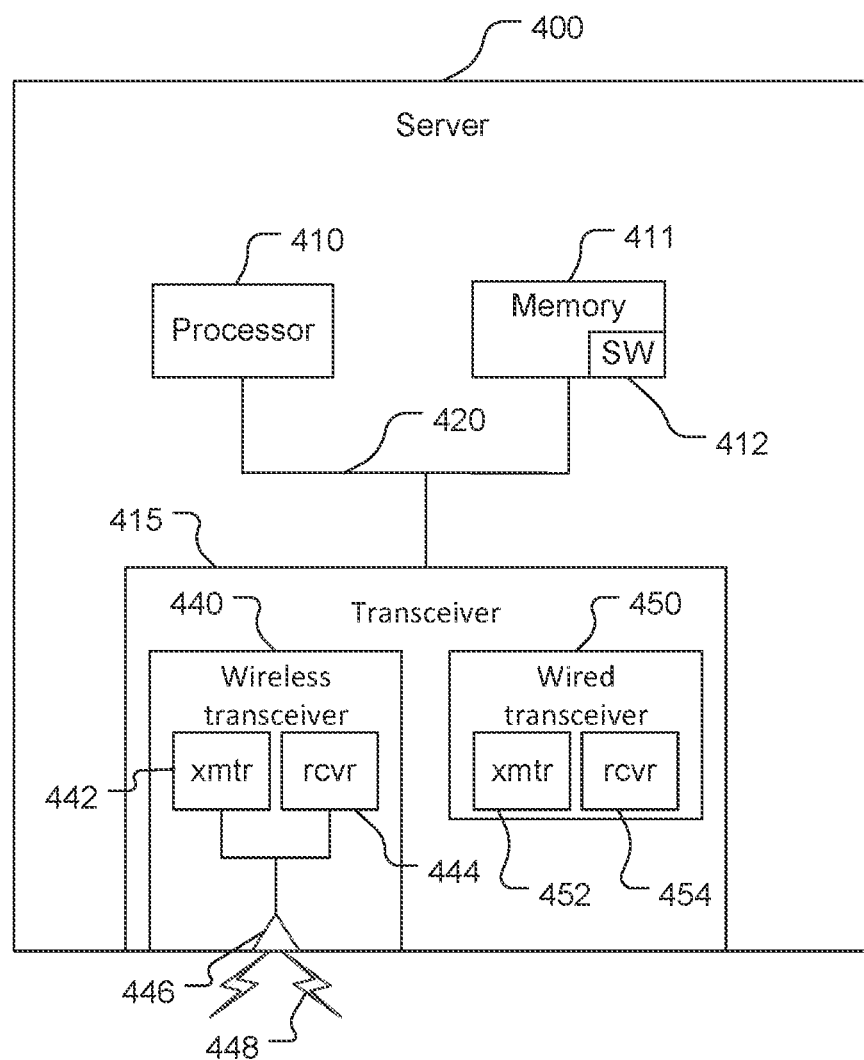
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that only the UEs subscribed to the service can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AOD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx\text{-}Tx}$ or $UE_{Rx\text{-}Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information-Reference Signal), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

PRS Measurement Sharing

Figure 5:
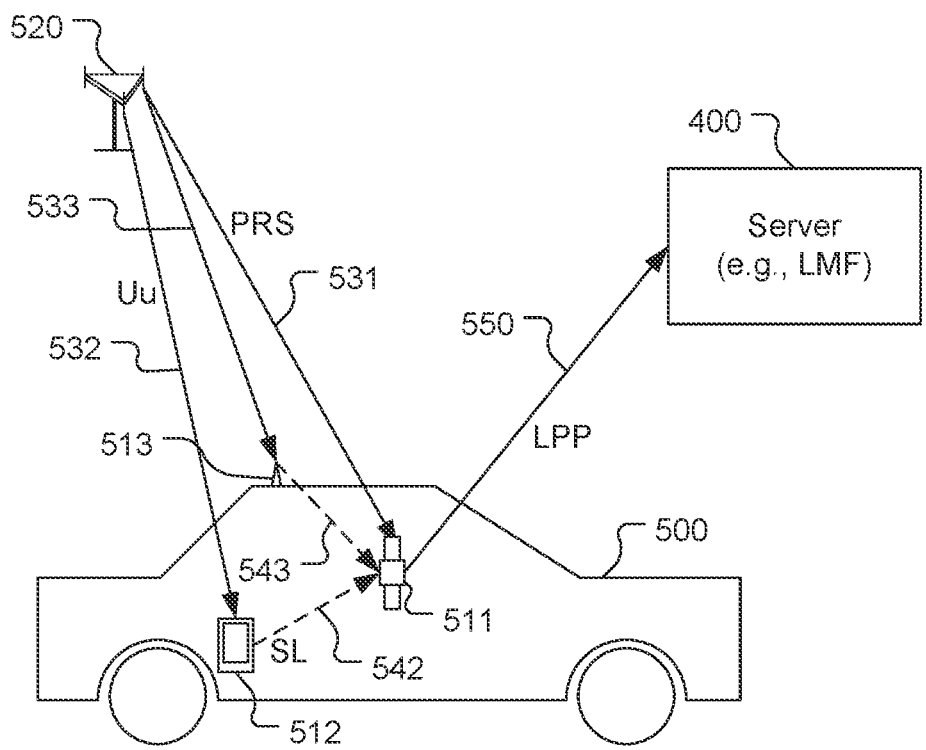
FIG. 5 is a simplified view of a vehicle, a server, and user equipment (UE) examples.
Figure 6:
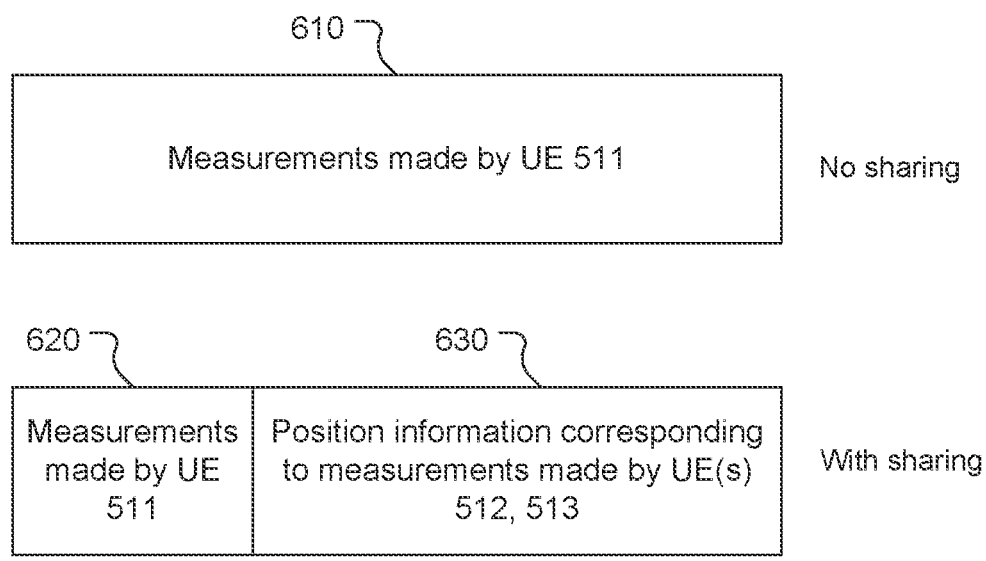
FIG. 6 is a block diagram of measurement distribution with and without measurement sharing between UEs.

Referring to FIGS. 5 and 6, with further reference to FIGS. 1-4, position information (e.g., one or more PRS measurements, one or more processed PRS measurements (e.g., one or more pseudoranges), and/or one or more location estimates) may be shared among UEs that are in close enough proximity that position information for one UE (e.g., a measurement made by one UE or a location estimate for one UE) may be treated as position information for another UE while providing acceptable positioning accuracy. For example, UEs 511, 512, 513 are disposed in close proximity to each other, and can share PRS measurements for positioning purposes with accuracy on the order of the separation of the UEs 511-513. In this example, the UE 511 is a smartwatch, the UE 512 is a smartphone, and the UE 513 is a vehicle UE (integrated into a vehicle 500, and indicated in FIG. 5 by an antenna housing). The UEs 511-513 are disposed within a few meters (e.g., 2 meters) of each other and thus may share PRS measurements for a positioning accuracy of several meters or lower resolution (higher number of meters), e.g., 2 m or more, or may use a common location estimate. As shown, each of the UEs 511-513 receive PRS 531, 532, 533 from a base station 520, the UEs 512, 513 provide position information 542, 543 (e.g., PRS measurement(s), processed PRS measurement(s), and/or location estimate(s)) via sidelink to the UE 511, and the UE 511 provides a measurement report 550 to the server 400 with position information. The measurement report 550 may include one or more PRS measurements made by the UE 511 and/or one or more PRS measurements made by one or more of the UEs 512, 513. Thus, as shown in FIG. 6, an amount of measurements 610 made (and possibly reported) by the UE 511 without the UE 511 receiving shared measurements from the UE(s) 512, 513 is much greater than an amount of measurements 620 made (and possibly reported) by the UE 511 when the UE 511 receives shared position information 630 corresponding to measurements made by the UE(s) 512, 513. Some of the measurements 620 may be the same as some of the position information 630. With sharing, the UE 511 may save energy by avoiding measuring one or more PRS resources when the UE 511 receives, or is expected to receive, position information from the UE(s) 512, 513. FIG. 6 is an example, and is not to scale, e.g., the measurements 620 made by the UE 511 with sharing may be far fewer than (e.g., 1/10 of) the measurements 610 made without position information sharing. The position information sharing may be performed in an individual-benefit mode with information being shared with a UE and used for the benefit of that UE (to determine location of that UE), or may be performed in a group-benefit mode with position information shared and used to the benefit of a group of UEs (to determine a location that can be used for the location of each of the UEs in the group). The position information sharing in the individual-benefit mode may be transparent to the server 400 while the position information sharing in the group-benefit mode is visible to the server 400. The individual-benefit mode may be referred to as a hitchhiking mode because the UE 511 may be considered to be hitching a ride on the position information from one or more other UEs. For example, in the individual-benefit mode, the UE 511 may obtain all PRS measurements from one or more other UEs of the group (e.g., with the UE 511 making no PRS measurements). As another example, the UE 511 may make one or more PRS measurements but only use and/or report PRS measurements obtained from the other UE(s) in the group. The group-benefit mode may be referred to as a ridesharing mode as a group of UEs may be considered to be riding together, acting as a virtual UE to provide position information for the group of UEs. In the group-benefit mode, a positioning entity, which may be the server 400 (e.g., an LMF) or the server 400 integrated with the TRP 300 (e.g., and LMF in RAN), is aware of task offloading between UEs. The individual-benefit mode or the group-benefit mode may be used when positioning accuracy requirement(s) is (are) lenient enough that not knowing the exact location of a UE or a UE within a cluster of UEs, respectively, is acceptable. Location estimation may, however, be improved for a limited-positioning-accuracy device by leveraging position information from a device capable of higher positioning accuracy (e.g., greater bandwidth, more processing capability, etc.) and/or by obtaining position information (e.g., PRS measurements) with fewer positioning errors than the limited-positioning-accuracy device would obtain, e.g., for one or more particular measurements. For example, the vehicle UE 513 may be able to process more PRS instances than the smartwatch UE 511 and therefore obtain a more accurate measurement of the same PRS than the UE 511.

Figure 7:
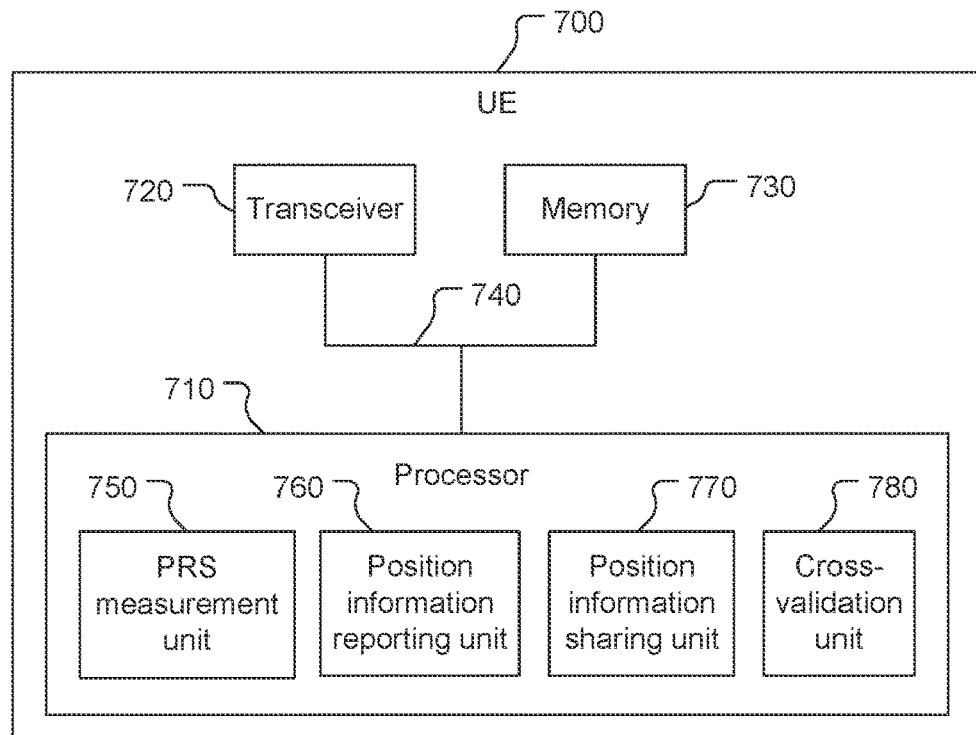
FIG. 7 is a block diagram of an example user equipment.

Referring to FIG. 7, a UE 700 includes a processor 710, a transceiver 720, and a memory 730 communicatively coupled to each other by a bus 740. The UE 700 may include the components shown in FIG. 7, and may include one or more other components such as any of those shown in FIG. 2 such that the UE 200 may be an example of the UE 700. For example, the processor 710 may include one or more of the components of the processor 210. The transceiver 720 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the transceiver 720 may include the wired transmitter 252 and/or the wired receiver 254. The memory 730 may be configured similarly to the memory 211, e.g., including software with processor-readable instructions configured to cause the processor 710 to perform functions.

The description herein may refer to the processor 710 performing a function, but this includes other implementations such as where the processor 710 executes software (stored in the memory 730) and/or firmware. The description herein may refer to the UE 700 performing a function as shorthand for one or more appropriate components (e.g., the processor 710 and the memory 730) of the UE 700 performing the function. The processor 710 (possibly in conjunction with the memory 730 and, as appropriate, the transceiver 720) may include a PRS measurement unit 750, a position information reporting unit 760, a position information sharing unit 770, and a cross-validation unit 780. The PRS measurement unit 750, the position information reporting unit 760, the position information sharing unit 770, and the cross-validation unit 780 are discussed further below, and the description may refer to the processor 710 generally, or the UE 700 generally, as performing any of the functions of the PRS measurement unit 750, the position information reporting unit 760, the position information sharing unit 770, and the cross-validation unit 780, with the UE 700 configured to perform the functions. The position information sharing unit 770 may be configured to transmit position information to another UE and/or to receive position information from another UE.

Figure 8:
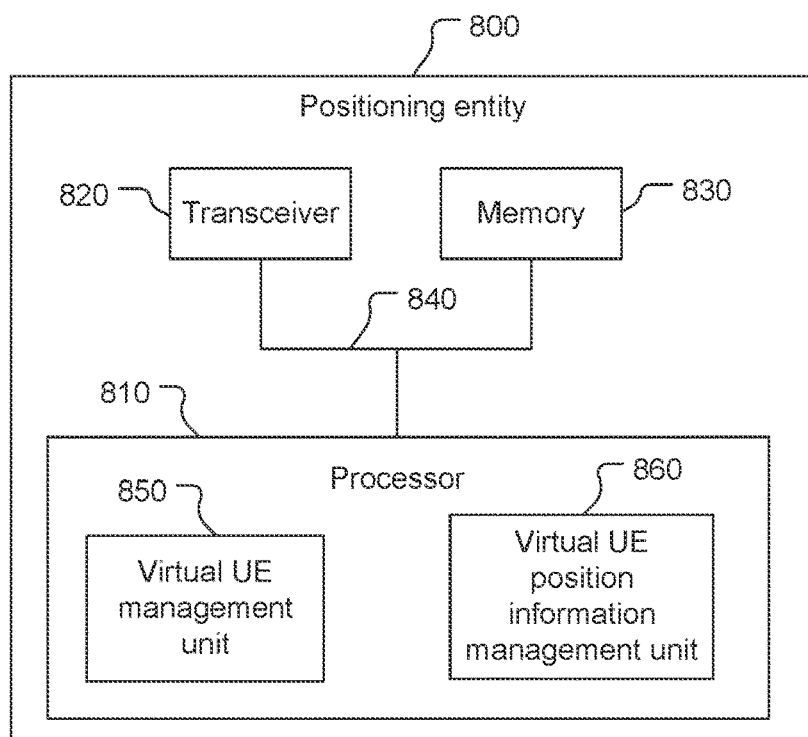
FIG. 8 is a block diagram of an example positioning entity.

Referring to FIG. 8, a positioning entity 800 includes a processor 810, a transceiver 820, and a memory 830 communicatively coupled to each other by a bus 840. The positioning entity 800 may include the components shown in FIG. 8, and may include one or more other components such as any of those shown in FIG. 2, or FIG. 3 and/or FIG. 4 such that the positioning entity 800 may be part of the server 400 (e.g., a location server such as an LMF), integrated in the TRP 300, or integrated in the UE 700. Thus, reference to the processor 810, the transceiver 820, or the memory 830 is equivalent to reference to the corresponding component(s) of the server 400, the TRP 300, or the UE 700. For example, the transceiver 820 may include one or more of the components of the transceiver 215 or the transceiver 315 and/or the transceiver 415, e.g., the antenna 246 and the wireless transmitter 242 and/or the wireless receiver 244, the antenna 346 and the wireless transmitter 342 and/or the wireless receiver 344, and/or the antenna 446 and the wireless transmitter 442 and/or the wireless receiver 444. Also or alternatively, the transceiver 820 may include the wired transmitter 252 and/or the wired receiver 254, or the wired transmitter 352 and/or the wired receiver 354, and/or the wired transmitter 452 and/or the wired receiver 454. The memory 830 may be configured similarly to the memory 211, or the memory 311 and/or the memory 411, e.g., including software with processor-readable instructions configured to cause the processor 810 to perform functions.

The description herein may refer to the processor 810 performing a function, but this includes other implementations such as where the processor 810 executes software (stored in the memory 830) and/or firmware. The description herein may refer to the positioning entity 800 performing a function as shorthand for one or more appropriate components (e.g., the processor 810 and the memory 830) of the positioning entity 800 performing the function. The processor 810 (possibly in conjunction with the memory 830 and, as appropriate, the transceiver 820) may include a virtual UE management unit 850 and a virtual UE position information management unit 860. The virtual UE management unit 850 and the virtual UE position information management unit 860 are discussed further below, and the description may refer to the processor 810 generally, or the positioning entity 800 generally, as performing any of the functions of the virtual UE management unit 850 and/or the virtual UE position information management unit 860, with the positioning entity configured to perform the functions.

Individual—Benefit Mode

Referring again to FIG. 5, with further reference to FIG. 7, in the individual-benefit mode, the UE 700 (e.g., the UE 511) may offload one or more PRS measurements in a procedure that is transparent to the server 400 with little or no impact to the LPP protocol. A donor UE, e.g., the UE 512 and/or the UE 513, is a UE that provides one or more PRS measurements to another UE. A recipient UE (also called a hitchhiker UE) is a UE, e.g., the UE 511, that receives one or more PRS measurements via sidelink from one or more other UEs. In the individual-benefit mode, each UE (donor and recipient) maintains an independent positioning session (for measuring and reporting) with the server 400. The donor UE may provide the PRS measurement(s) to the recipient UE with a UE-neutral PRS-ID (i.e., a PRS-ID that is not UE-specific) and the recipient UE may report the PRS measurement with the UE-neutral PRS-ID and/or with a UE-specific PRS-ID corresponding to the recipient UE. The UE 700, e.g., the position information sharing unit 770, may be configured to be a donor UE only, or to be a recipient UE only, or to be both a donor UE and a recipient UE, with each of the UEs 511-513 being an example of the UE 700.

Various information may be shared by the donor UE to the recipient UE. For example, measurements of RSRP, RSTD, Rx-Tx (e.g., $UE_{Rx-Tx}$), AOA, AoD, timestamp, etc. (e.g., any available measurement defined in LPP) may be provided by the position information sharing unit 770 of the donor UE to the position information sharing unit 770 of the recipient UE. Also or alternatively, one or more location estimates may be provided by the position information sharing unit 770 of the donor UE to the position information sharing unit 770 of the recipient UE, e.g., if the donor UE is in UE-based (UE-B) positioning mode or is in UE-assisted (UE-A) positioning mode and is the location client and receives the location estimate (for the donor UE) from the server 400 (e.g., an LMF). A donor UE in UE-B positioning mode may share measurements (including processed measurements) and/or location estimate(s) with a recipient UE in UE-B positioning mode. A donor UE in UE-B positioning mode may share measurements with a recipient UE in UE-A positioning mode. A donor UE in UE-A positioning mode may share measurements with a recipient UE in UE-A positioning mode. A donor UE in UE-A positioning mode may share measurements and/or location estimate(s) (if the donor UE has the location estimate(s) from the server) with a recipient UE in UE-B positioning mode.

The position information sharing unit 770 of the donor UE may be configured to associate each shared measurement (including processed measurement) with a PRS-ID. A PRS-ID may have any of a variety of forms and levels of detail. For Uu-PRS (e.g., DL-PRS from the TRP 300 to the UE 700), a PRS-ID may include a TRP-ID, a TRP-ID and a PRS resource set ID, or a TRP-ID and a PRS resource set ID and a PRS resource ID. What level of detail is provided for the PRS-ID may depend on what type of positioning technique the measurement is to be used for and/or what type of measurement is being shared. For example, for RSTD, providing the TRP-ID alone may be sufficient to allow the recipient UE to determine the cell or the site of the measurement. For AoA or AoD, the PRS-ID may include a PRS resource ID because multiple RSRP measurements corresponding to multiple PRS resources may be provided and/or because resolution at the PRS resource level may be required to meet desired accuracy. For SL-PRS (sidelink PRS between UEs), the PRS-ID may include a UE-ID, or the UE-ID and an SL-PRS resource related ID. The PRS-ID provided by the donor UE is a UE-neutral ID, e.g., a global ID, that the position information sharing unit 770 of the recipient UE 700 may convert to a PRS-ID specific to the recipient UE.

The position information sharing unit 770 of the donor UE may be configured to share a subset of the position information available for sharing by the donor UE. For example, the position information sharing unit 770 of the donor UE may be configured to share a few representative measurements per TRP, per PRS-resource set, or per PRS source site (e.g., base station, which may include multiple TRPs). The position information sharing unit 770 may be configured to select what position information to share based on one or more factors. For example, the position information sharing unit 770 may apply an earliest-arrival principle to select the position information corresponding to the PRS resource(s) that arrived at the donor UE earliest. The earliest-arrival principle may be applied in particular for timing measurements, e.g., RSTDs made with the earliest ToA measurements. As another example, the position information sharing unit 770 may apply a strongest principle to select the position information corresponding to the PRS resource(s) that arrived at the donor UE with the most power. The strongest principle may be applied in particular for power measurements, e.g., RSRP measurements. To select measurement(s) per site, the donor UE uses knowledge of location of each anchor node (e.g., TRP, UE). The donor UE may obtain the location information of each anchor node in assistance data provided to the donor UE if the donor UE is in UE-B positioning mode, or by request from the donor UE if the donor UE is in UE-A positioning mode. The server 400 may provide a single location for a group of co-located TRPs, which reduces overhead compared to separately providing the location for each of the co-located TRPs. The PRS measurement unit 750 of the donor UE may use the single location for a group of TRPs to avoid redundant measurement(s), e.g., by measuring one PRS corresponding to the site of the co-located TRPs.

Figure 9:
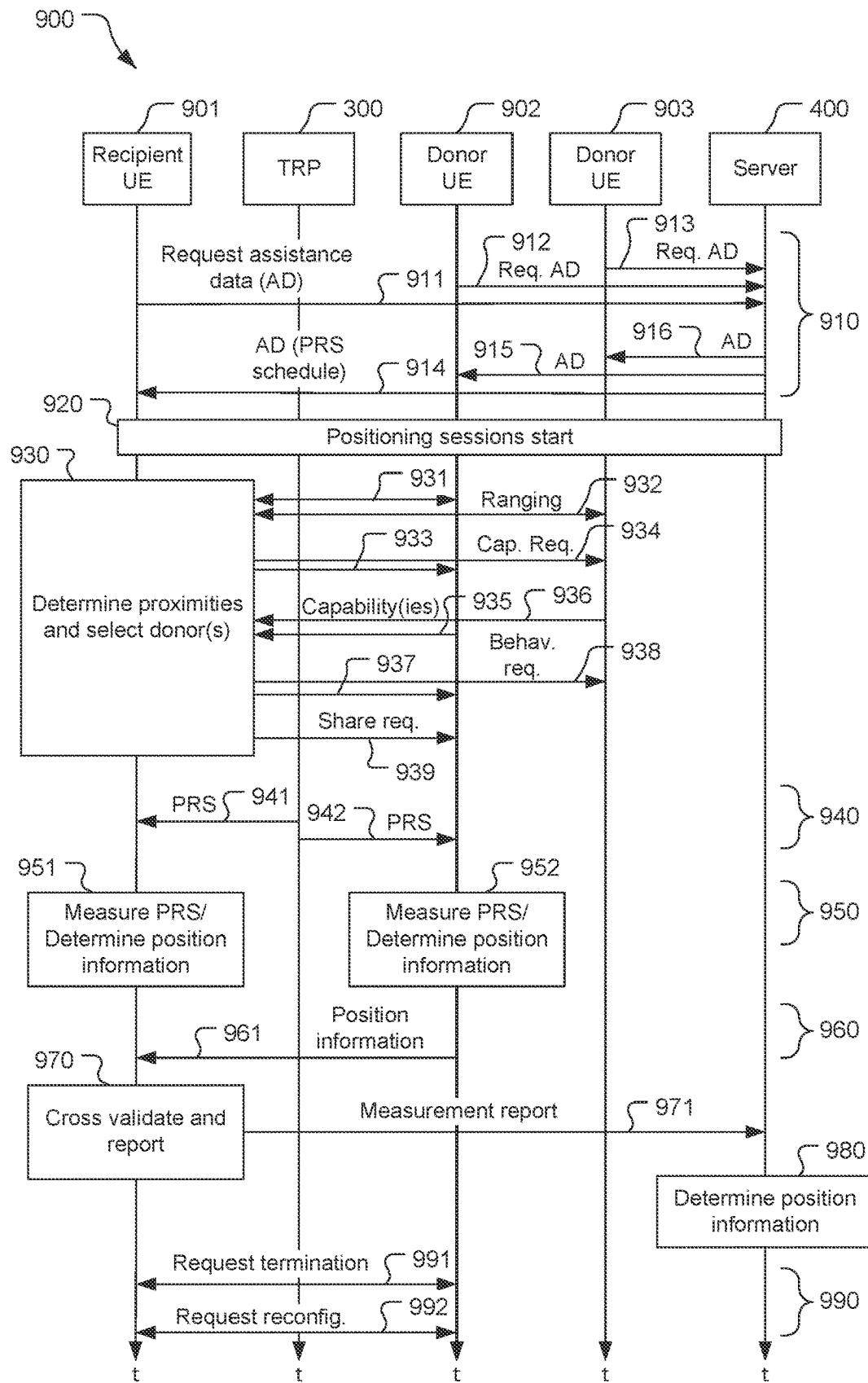
FIG. 9 is a signaling and process flow diagram of a method for providing and measuring PRS resources, requesting reporting of PRS resource measurement, and reporting PRS resource measurement.

Referring to FIG. 9, with further reference to FIGS. 1-8, a signaling and process flow 900 for providing and measuring PRS resources, requesting reporting of PRS resource measurement, and reporting PRS resource measurement includes the stages shown. The flow 900 is an example, as stages may be added, rearranged, and/or removed. Signals may be exchanged directly between UEs 901, 902, 903 and the server 400 in the flow 900 and/or may be exchanged via the TRP 300.

At stage 910, the UEs 901-903 request and receive assistance data (AD). The UEs 901-903 send AD requests 911, 912, 913 and the server 400 responds by sending assistance data messages 914, 915, 916 to the UEs 901-903, respectively, with respective AD. The AD messages 914-916 are shown being sent from the server 400 to the UEs 901-903, but the AD may be sent by the TRP 300 to the UEs 901-903. The AD messages 914-916 include respective PRS schedules and PRS configurations (e.g., original PRS configurations and/or PRS re-configurations) for the UEs 901-903. The PRS schedules may provide schedules of DL-PRS, SL-PRS, and/or UL-PRS. The PRS schedules indicate the timing and frequency of PRS resources to assist the UEs 901-903 to measure the scheduled PRS resources. The PRS schedules are provided by the server 400 to the UEs 901-903 and the TRP 300 (e.g., provided to the UEs 901-903 via the TRP 300). The server 400 may send indications of (e.g., parameters of) PRS schedules to the TRP 300 and the TRP 300 (e.g., the processor 310) may determine the PRS schedules based on the indications from the server 400.

At stage 920, position sessions between the server 400 and each of a recipient UE 901, a donor UE 902, and a donor UE 903 start. The UEs 901-903 perform a handshake by exchanging appropriate messages to establish respective positioning sessions for exchanging signaling for use in determining a position (location) of the recipient UE 901. The handshaking may include determining a positioning technique and appropriate position information (measurement(s) and/or location estimate(s)) to be determined. Each of the UEs 901-903 may be an example of the UE 700, with the UE 901 configured at least to receive shared position information from the donor UEs 902, 903 and the donor UEs 902, 903 configured at least to share position information with the recipient UE 901.

At stage 930, the recipient UE 901 determines which of the donor UEs 902, 903 is (are) within an acceptable proximity of the recipient UE 901. At this point, the recipient UE 901 is a candidate recipient UE (having not yet received shared position information) and the donor UEs 902, 903 are candidate donor UEs (having not yet shared position information with the recipient UE 901) but are referred to as donor UEs. The recipient UE 901 determines proximities of the donor UEs 902, 903 to determine whether either or both of the donor UEs 902, 903 are within an acceptable proximity of the recipient UE 901. An acceptable proximity may be a proximity such that a candidate donor UE is close enough that position information determined by the candidate UE may be used by the recipient UE 901 as position information for the recipient UE 901 to determine a position estimate for the recipient UE 901 that will meet a desired positioning accuracy (and/or one or more other QoS metrics). For example, an acceptable proximity may be that the candidate donor UE is within a threshold distance of the recipient UE 901. The recipient UE 901 may determine whether each of the donor UEs 902, 903 is within an acceptable proximity using one or more of a variety of techniques. For example, the position information sharing unit 770 may include one or more of the sensors 213 (e.g., radar and/or lidar) and/or the transceiver 720 to exchange ranging signals 931 with the donor UE 902 and/or ranging signals 932 with the donor UE 903 to determine proximity. The ranging signals 931, 932 may include radar signals, lidar signals, and/or SL-PRS. Any of the ranging signals 931, 932 may be used to determine RTT and thus a range between the recipient UE 901 and each of the donor UEs 902, 903. SL-PRS may be used to determine RTT, RSSI, and/or RSRP to determine a range between the recipient UE 901 and each of the donor UEs 902, 903. As another example, SL-discovery may indicate close proximity of UEs, e.g., with a sidelink communication being sent from the recipient UE 901 with a known transmission power and if the recipient UE 901 receives an acknowledgement that the donor UE 902 and/or the donor UE 903 received the SL communication, then the recipient UE 901 may conclude that the responding UE(s) 902, 903 is (are) within an acceptable proximity. For example, the recipient UE 901 may know that for the transmission power and frequency used for the SL communication, the range for receiving the SL communication with adequate power to be decoded is within an acceptable proximity. As another example, the recipient UE 901 may connect with one or more candidate donor UEs using a short-range wireless technology such as WLAN (wireless local area network), BLUETOOTH®, and/or low-energy BLUETOOTH®, with successful connection being equated with acceptable proximity. For example, the UE 511 may register with the UE 513 in response to entering the vehicle 500. As other examples, proximity of UEs may be determined using observed time delay and/or comparing UE locations (e.g., determined using GNSS and/or one or more other techniques). The recipient UE 901 may require a candidate donor UE to be within a threshold proximity for a threshold amount of time in order to be considered a donor UE. The recipient UE 901 may determine that a candidate donor UE is within an acceptable proximity based on the recipient UE 901 and the candidate donor UE having the same or similar neighbor list of TRPs. The recipient UE 901 may determine that a candidate donor UE is within an acceptable proximity based on the recipient UE 901 and the candidate donor UE moving similarly (e.g., moving in unison due to being in the same vehicle). Still other techniques may be used to determine whether a candidate UE is within an acceptable proximity of the recipient UE 901.

Also at stage 930, the recipient UE 901 negotiates with the donor UEs 902, 903 regarding capabilities of the UEs 902, 903. The recipient UE 901 sends capability requests 933, 934 to the donor UEs 902, 903 requesting reports of capabilities of the donor UEs 902, 903. In response to the requests 933, 934, the donor UEs 902, 903 transmit respective capability reports 935, 936 to the recipient UE 901 indicating one or more capabilities of the donor UEs 902, 903, respectively. For example, one or more of the capability reports 935, 936 may indicate one or more processing capabilities (e.g., bandwidth, buffer size, number of instances that can be measured) of the donor UEs 902, 903, respectively. As another example, one or more of the capability reports 935, 936 may indicate one or more PRS measurement sharing capabilities, e.g., type(s) of position information that the UEs 902, 903 can determine and share with the recipient UE 901 and/or UE-neutral PRS-ID(s) of scheduled PRS resource(s) for the donor UE(s) 902, 903, respectively. The capability reports 935, 936 may indicate which PRS resources the donor UEs 902, 903 plan to measure and/or what position information the donor UEs 902, 903 plan to determine. The content of the capability reports 935, 936 may be included in the AD message 914 provided to the recipient UE 901 (e.g., and possibly not sent by the donor UEs 902, 903 in the separate capability reports 935, 936 as shown). The recipient UE 901 may send a behavior request 937 to the donor UE 902 and/or a behavior request 938 to the donor UE 903 to request one or more sharing behaviors explicitly and/or implicitly. For example, the recipient UE 901 may explicitly request that the donor UE(s) 902, 903 measure one or more PRS resources and/or determine position information that the donor UE(s) 902, 903 do not plan to measure and/or determine. As another example, the recipient UE 901 may provide one or more QoS criteria desired by the recipient UE 901 and the donor UE(s) 902, 903 may reply with what behavior the donor UE(s) 902, 903 will provide. For example, the donor UEs 902, 903 may indicate that the respective donor UE 902, 903 will provide position information on a best-effort basis, providing the position information if the donor UE 902, 903 has the position information. As another example, the donor UEs 902, 903 may indicate that the respective donor UE 902, 903, based on the request from the recipient UE 901, will obtain extra (unplanned) position information (e.g., taking one or more unplanned measurements and/or processing one or more measurements to determine other position information (e.g. processed measurement(s) and/or location estimate(s)). There may be multiple communications between the recipient UE 901 and one or both of the donor UEs 902, 903 to agree upon behavior of the donor UEs 902, 903 (e.g., supplemental capability report(s) sent by the UE(s) 902, 903 in response to the request(s) 937, 938 and possibly supplement request(s) sent in response to the supplemental capability report(s), etc.).

Also at stage 930, the recipient UE 901 selects one or more candidate donor UEs to serve as donor UE(s) and what position information to share. For example, the position information sharing unit 770 of the recipient UE 901 may identify multiple candidate donor UEs within an acceptable proximity and select, based on one or more factors, one of more of these candidate donor UEs to share position information. For example, the position information sharing unit 770 of the recipient UE 901 may, for example, select the candidate donor UE(s) with the highest processing capability(ies). As another example, the position information sharing unit 770 of the recipient UE 901 may select the candidate donor UE(s) with the most PRS resources scheduled in common with the recipient UE 901 (e.g., based on the UE-neutral PRS-ID(s)), e.g., to help reduce the processing performed by the recipient UE 901. As another example, the position information sharing unit 770 of the recipient UE 901 may select the candidate donor UE that is closest to the recipient UE 901 (e.g., based on received signal strength, and/or based on coarse location estimate of the recipient UE 901 and location estimates of the donor UEs, and/or based on one or more other factors). The position information sharing unit 770 of the recipient UE 901 may select one or more of the candidate donor UEs based on a combination of factors such as processing capability and overlapped scheduled PRS resources. If multiple candidate donor UEs are equally desirable based on the one or more factors, then a tie breaker may be employed, e.g., to select the closer candidate donor UE (e.g., the shorter RTT or the stronger RSRP). The recipient UE 901 sends a share request to each of the donor UEs 902, 903 that the recipient UE 901 selects to share position information. In this example, the recipient UE 901 transmits a share request 939 to the donor UE 902.

The share request 939 may include an indication of a requested periodicity for the donor UE 902 to share position information with the recipient UE 901. The requested periodicity (e.g., aperiodic, periodic, or semi-persistent (i.e., periodic that is aperiodically triggered)) may depend on a reporting periodicity of the recipient UE 901. For example, if the recipient UE 901 is providing aperiodic measurement reports, then the recipient UE 901 may request aperiodic position information sharing from the donor UE 902. The share request 939 may be transmitted by the recipient UE 901 using, and thus the position information sharing may be initiated by, SCI (sidelink control information), SL-MAC-CE (sidelink-media access control-control element), or SL-RRC (sidelink radio resource control) via sidelink or through a serving cell (e.g., through the TRP 300). The share request 939 may include detailed measurement request information. For example, for Uu-PRS (PRS between a TRP and a UE), the share request 939 may include a specific TRP, a specific TRP and PRS resource set, or a specific TRP and PRS resource set and PRS resource. The share request 939 may, for example identify a TRP from which the recipient UE 901 would like the donor UE 902 to measure PRS or may identify a TRP and request the donor UE 902 to measure PRS from one or more TRPs other than the identified TRP. As another example, the recipient UE 901 may identify one or more measurements that the donor UE 902 should exclude from sharing with the recipient UE 901 (e.g., to avoid redundancy because the recipient UE 901 will make the measurement(s)). For SL-PRS, the share request 939 may include UE-ID, or UE-ID and an SL-PRS resource related ID.

At stage 940, the TRP 300 sends PRS 941, 942 to the UEs 901, 902, respectively. For example, the TRP 300 sends the PRS 941, 942 in accordance with the PRS schedules indicated in the AD messages 914, 915. In this example, DL-PRS are sent by the TRP 300, but other PRS (e.g., SL-PRS) may also or alternatively be transmitted at stage 940 to the recipient UE 901 and/or the donor UE 902. The PRS 941, 942 may be identical, e.g., if the TRP 300 is broadcasting the PRS.

At stage 950, the recipient UE 901 may measure none, a subset of, or all of the PRS 941 and the donor UE 902 measures at least some of the PRS 942. For example, at sub-stage 951, the PRS measurement unit 750 of the recipient UE 901 may measure none of the PRS resources of the PRS 941 or may measure one or more PRS resources of the PRS 941, e.g., based on desired measurements for the positioning technique used, QoS criteria to be met, position information expected to be received from the donor UE 902, and/or processing limits/desires (e.g., a power limit) of the recipient UE 901. At sub-stage 952, the PRS measurement unit 750 of the recipient UE 901 may, for example, measure all of the PRS 941, less than all of the PRS 941, or none of the PRS 941. The PRS measurement unit 750 of the donor UE 902 may measure one or more PRS resources of the PRS 942, e.g., based on the measurement behavior agreed upon (explicitly or implicitly (e.g., to meet one or more agreed-upon criteria such as position information to be provided) at stage 930. For example, the donor UE 902 may employ a best-effort behavior regarding measuring PRS or may measure one or more extra PRS resources as appropriate, e.g., to meet a request by the recipient UE 901 and if the extra measurement(s) is (arc) within any measurement limitation of the donor UE 902. At sub-stages 951, 952, the recipient UE 901 and/or the donor UE 902 may determine position information from one or more respective PRS measurements (e.g., PRS measurements and/or processed PRS measurement(s) (e.g., pseudorange(s) for UE-assisted positioning or UE-based positioning, and location estimate(s) for UE-based positioning). The position information may include one or more processed measurements (e.g., pseudorange(s)) and/or one or more location estimates of the recipient UE 901 or the donor UE 902, respectively.

At stage 960, the donor UE 902 transmits position information 961 to the recipient UE 901. The position information sharing unit 770 of the donor UE 902 transmits position information determined by the donor UE 902, e.g., position information agreed at stage 930 to be provided, to the recipient UE 901 via sidelink communication. The position information may be provided periodically, semi-persistently, or aperiodically (e.g., in response to an aperiodic request from the recipient UE 901, such as the share request 939). The position information 961 may indicate the PRS measured to obtain the corresponding position information, with the PRS being indicated by a UE-neutral ID. The position information sharing unit 770 of the donor UE 902 may convert a UE-specific PRS-ID for the donor UE 902 into the UE-neutral ID and transmit the UE-neutral ID to the recipient UE 901 and the position information sharing unit 770 of the recipient UE 901 may convert the UE-neutral ID into a UE-specific ID corresponding to the recipient UE 901.

At stage 970, the recipient UE 901 may cross validate position information. For example, the cross-validation unit 780 of the recipient UE 901 may compare a piece of position information received from the donor UE 902 with similar position information determined by the recipient UE 901 and/or a similar piece of position information received from another donor UE (in close proximity to the recipient UE 901). For example, the cross-validation unit 780 of the recipient UE 901 may compare a PRS measurement from the position information 961 with a similar measurement made by the PRS measurement unit 750 of the recipient UE 901. The measurements may correspond, for example, to the same PRS source site, the same TRP, the same PRS resource set, or the same PRS resource. If the measurements differ by less than a threshold amount (e.g., an absolute value of a difference (subtraction) being less than a threshold or an absolute value of a ratio being less than another threshold), then the cross-validation unit 780 of the recipient UE 901 determines that both of the measurements may be reliable or both of the measurements may be unreliable. If the measurements differ by more than a threshold amount, then at least one of the measurements is determined to be unreliable (e.g., due to multipath), e.g., undesirable to be used to determine location of the recipient UE 901. For example, for timing measurements where one measurement is determined to be unreliable (an outlier), then the cross-validation unit 780 may identify the measurement corresponding to the earlier-arriving PRS resource as potentially reliable and identify the measurement corresponding to the later-arriving PRS resource as unreliable. The earlier-arriving PRS resource has an earlier time of arrival, i.e., a ToA measurement of the earlier-arriving PRS resource will be earlier in time than a ToA measurement of the later-arriving PRS resource. As another example, where RTT measurements differ by more than a threshold amount, the larger RTT measurement may be identified as unreliable. Because the recipient and donor UEs 901, 902 are in close proximity, RTT measurements by the UEs 901, 902 for the same PRS source site are expected to be very similar. Thus, for example, if one RTT measurement is 10 ms and the other RTT measurement is 100 ms, then the 100 ms RTT measurement may be identified as unreliable. Cross validation is discussed further below.

Also at stage 970, the recipient UE 901 transmits a measurement report 971 to the server 400. The measurement report 971 may be transmitted directly from the recipient UE 901 to the server 400 or via the TRP 300. The position information reporting unit 760 of the recipient UE 901 may omit any position information determined to be unreliable by the cross validation. The measurement report 971 may include position information corresponding to one or more measurements made by the recipient UE 901 and/or one or more measurements made by the donor UE 902 (e.g., similar to the measurements 620 and the position information 630 shown in FIG. 6). The measurement report 971 may include one or more recipient UE measurements that are similar to one or more donor UE measurements, e.g., measurements of the same PRS resource(s), or PRS resources from the same site, or the same TRP, or the same TRP resource set. The position information reporting unit 760 of the recipient UE 901 may format the measurement report 971 to correspond to the recipient UE 901, e.g., identifying PRS by UE-specific PRS-ID(s) corresponding to the recipient UE 901. The position information reporting unit 760 of the recipient UE 901 may provide no indication that any position information in the measurement report 971 was provided by the donor UE 902 in order to have the position information sharing be transparent to the server 400.

At stage 980, the server 400 determines position information for UE-assisted positioning. For example, the processor 410 uses the measurement report 971, and possibly other information (e.g., measurements from one or more TRPs 300 of one or more signals from the recipient UE 901), to determine position information for the recipient UE 901, e.g., to determine one or more signal measurements, one or more ranges (e.g., pseudoranges), and/or one or more location estimates for the recipient UE 901.

At stage 990, one or more early-termination requests may be exchanged and/or one or more requests to change the sharing configuration may be exchanged. For example, the recipient UE 901 and/or the donor UE 902 may send a termination request 991 to the donor UE 902 or the recipient UE 901, respectively. The termination request 991 may request termination of position information sharing before expiration of a time for periodic or semi-persistent sharing. As another example, the recipient UE 901 and/or the donor UE 902 may send a reconfiguration request 992 to the donor UE 902 or the recipient UE 901, respectively. The reconfiguration request 992 may request to initiate a new negotiation of sharing behavior and/or may indicate one or more specific position information sharing behaviors (e.g., specific position information sought, change to best-effort sharing, etc.).

Figure 10:
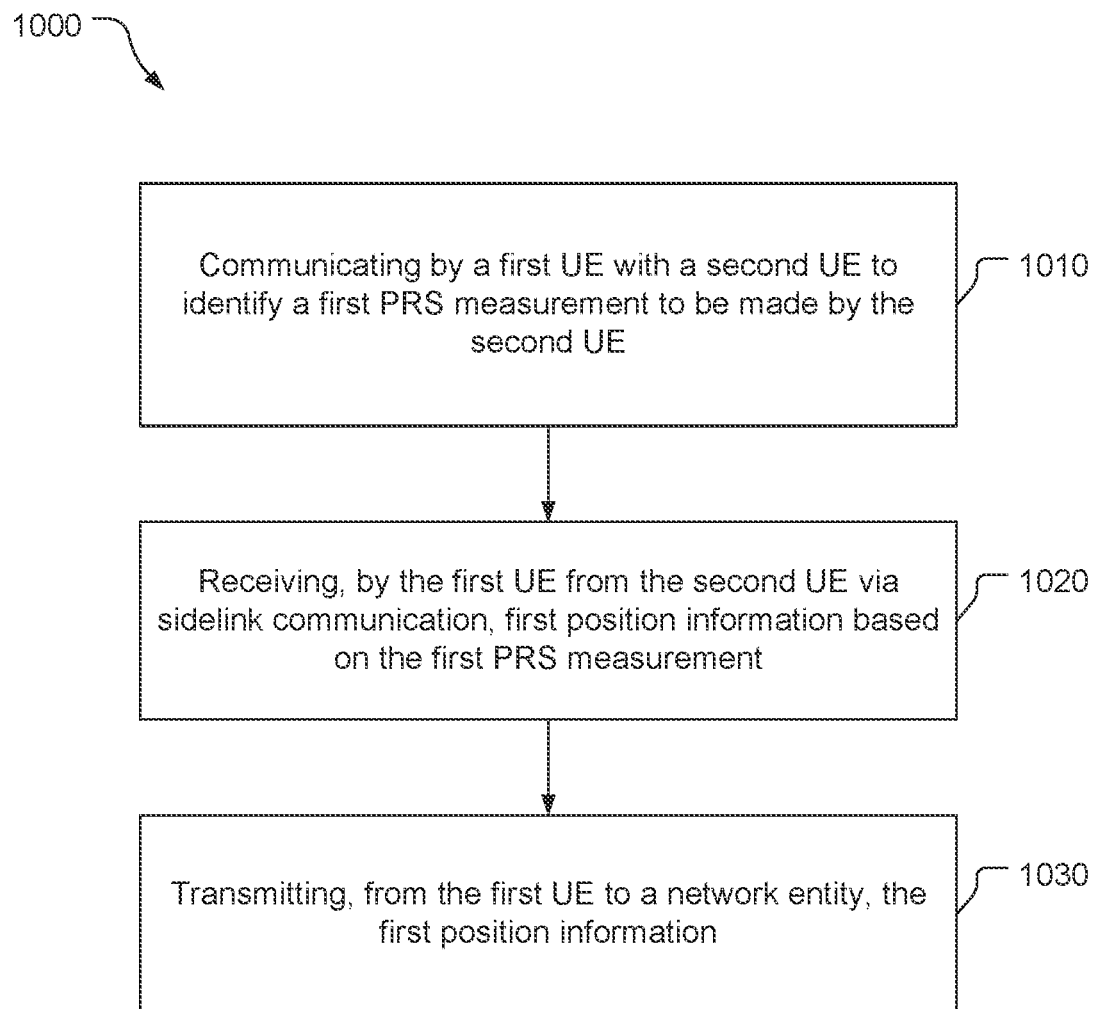
FIG. 10 is a block flow diagram of a position information reporting method.

Referring to FIG. 10, with further reference to FIGS. 1-9, a position information reporting method 1000 includes the stages shown. The method 1000 is, however, an example and not limiting. The method 1000 may be altered, e.g., by having stages added, removed, rearranged, combined, performed concurrently, and/or having single stages split into multiple stages.

At stage 1010, the method 1000 includes communicating by a first UE with a second UE to identify a first PRS measurement to be made by the second UE. For example, at stage 930 the recipient UE 901 communicates with the donor UE 902 to identify (e.g., to determine or agree to) one or more PRS measurements for the donor UE 902 to make (instead of or in addition to the recipient UE 901). The processor 710, possibly in combination with the memory 730, in combination with the transceiver 720 (e.g., the antenna 246 and the wireless transmitter 242, and possibly the wireless receiver 244) may comprise means for communicating with the second UE.

At stage 1020, the method 1000 includes receiving, by the first UE from the second UE via sidelink communication, first position information based on the first PRS measurement. For example, at stage 960 the recipient UE 901 receives the position information 961 based on measurement of the PRS 942 at sub-stage 952. The processor 710, possibly in combination with the memory 730, in combination with the transceiver 720 (e.g., the wireless receiver 244 and the antenna 246) may comprise means for receiving the first position information.

At stage 1030, the method 1000 includes transmitting, from the first UE to a network entity, the first position information. For example, at stage 970 the position information reporting unit 760 of the recipient UE 901 transmits the measurement report 971, including position information determined by the donor UE 902 and shared with the recipient UE 901, to the server 400. The measurement report 971 may or may not include position information determined from one or more PRS measurements taken by the recipient UE 901. The processor 710, possibly in combination with the memory 730, in combination with the transceiver 720 (e.g., the antenna 246 and the wireless transmitter 242) may comprise means for transmitting the first position information and the second position information to the network entity.

Implementations of the method 1000 may include one or more of the following features. In an example implementation, the method 1000 comprises determining a proximity of the second UE to the first UE, where transmitting the first position information to the network entity comprises transmitting the first position information to the network entity based on the proximity of the second UE to the first UE being acceptably close. For example, at stage 930 the recipient UE 901 may determine proximities to candidate donor UEs by exchanging ranging signals, e.g., using one or more of the sensors (e.g., radar, lidar, etc.) and/or one or more signals received by the wireless receiver 244 via the antenna 246 (possibly in response to one or more signals transmitted by the wireless transmitter 242 via the antenna 246). The recipient UE 901 may only negotiate with the donor UE 902 (and/or other donor UE) if the donor UE 902 has been determined to be acceptably close to the recipient UE 901 (e.g., within a threshold distance, within communication range of the recipient UE 901 with transmit power of the recipient UE 901 of a threshold value or less, etc.). As another example, the recipient UE 901 may only transmit position information received from the donor UE 902 if the donor UE 902 has been determined to be acceptably close to the recipient UE 901. The processor 710, possibly in combination with the memory 730, possibly in combination with the transceiver 720 (e.g., the antenna 246, the wireless receiver 244 and possibly the wireless transmitter 242) and/or one or more of the sensor(s) 213 (e.g., a radar sensor, a lidar sensor, etc.) may comprise means for determining proximities to candidate donor UEs. In another example implementation, the method 1000 comprises: identifying a plurality of candidate UEs within an acceptable proximity of the first UE; and selecting, to serve as a position information donor, the second UE from the plurality of candidate UEs based on processing capabilities of the plurality of candidate UEs. For example, at stage 930 the recipient UE 901 determines proximities to candidate donor UEs and may use processing capabilities (indicated in the capability reports 935, 936) of multiple UEs within acceptable proximity of the recipient UE 901 to select a donor UE (or donor UEs) from which to receive position information. The processor 710, possibly in combination with the memory 730, possibly in combination with the transceiver 720 (e.g., the antenna 246, the wireless receiver 244 and possibly the wireless transmitter 242) and/or one or more of the sensor(s) 213 (e.g., a radar sensor, a lidar sensor, etc.) may comprise means for identifying candidate UEs within an acceptable proximity of the recipient UE 901 and the processor 710, possibly in combination with the memory 730, may comprise means for selecting the second UE to serve as a position information donor (e.g., select the donor UE 902 from the candidate UEs) based on processing capabilities of the plurality of candidate UEs. In another example implementation, the method 1000 comprises: identifying a plurality of candidate UEs within an acceptable proximity of the first UE; and selecting, to serve as a position information donor, the second UE from the plurality of candidate UEs based on overlaps of a first PRS configuration associated with the first UE and second PRS configurations each associated with a respective one of the plurality of candidate UEs. For example, at stage 930 the recipient UE 901 determines proximities to candidate donor UEs and may use PRS configurations of multiple UEs within acceptable proximity of the recipient UE 901 to select a donor UE (or donor UEs) from which to receive position information, e.g., the UE(s) having the PRS configuration(s) with the most PRS resources in common with the PRS configuration of the recipient UE 901. The processor 710, possibly in combination with the memory 730, may comprise means for selecting the second UE to serve as a position information donor (e.g., select the donor UE 902 from the candidate UEs) based on overlaps of the PRS configuration of the first UE and PRS configurations of the plurality of candidate UEs. In another example implementation, the method 1000 comprises: identifying a plurality of candidate UEs within an acceptable proximity of the first UE; and selecting, to serve as a position information donor, the second UE from the plurality of candidate UEs based on the second UE being closest, of the plurality of candidate UEs, to the first UE. For example, at stage 930 the recipient UE 901 determines proximities to candidate donor UEs and may use the candidate donor UE that is closest to the recipient UE 901 as a donor UE. The processor 710, possibly in combination with the memory 730, may comprise means for selecting the second UE to serve as a position information donor (e.g., select the donor UE 902 from the candidate UEs) based on the second UE being closest to the first UE.

Also or alternatively, implementations of the method 1000 may include one or more of the following features. In an example implementation, the method 1000 comprises transmitting a request to the second UE for the second UE to transmit the first position information with a requested periodicity of one of periodically, semi-persistently, or aperiodically. For example, at stage 930 the position information sharing unit 770 of the recipient UE 901 sends the share request 939 to the donor UE 902 indicating a periodicity for sharing position information to the recipient UE 901. The processor 710, possibly in combination with the memory 730, in combination with the transceiver 720 (e.g., the antenna 246 and the wireless transmitter 242) may comprise means for transmitting the request to the second UE. In another example implementation, the requested periodicity is based on a reporting periodicity of the first UE for the second position information. For example, the position information sharing unit 770 of the recipient UE 901 may configure the share request 939 with the requested periodicity based on a reporting periodicity indicated by the position information reporting unit 760 of the recipient UE 901.

Also or alternatively, implementations of the method 1000 may include one or more of the following features. In an example implementation, the method 1000 comprises indicating, by the first UE to the second UE, for the first PRS measurement, a TRP, or the TRP and a PRS resource set, or the TRP and the PRS resource set and a PRS resource, or a UE-ID, or the UE-ID and a sidelink-PRS resource related ID. For example, the share request 939 may provide specific information regarding PRS to measure in order to report corresponding position information. For example, for Uu-PRS (PRS between TRP and UE), the share request 939 may indicate TRP, TRP+PRS resource set, or TRP+PRS resource set+PRS resource. As another example, for SL-PRS, the share request 939 may indicate a UE-ID, or a UE-ID+SL-PRS ID, e.g., an SL-PRS resource set ID and/or an SL-PRS resource ID. The processor 710, possibly in combination with the memory 730, in combination with the transceiver 720 (e.g., the antenna 246 and the wireless transmitter 242) may comprise means for indicating such information for the first PRS measurement. In another example implementation, the method 1000 comprises validating the first PRS measurement indicated in the first position information by comparing the first PRS measurement with a similar measurement made by a device other than the second UE. For example, at stage 970 the cross-validation unit 780 of the recipient UE 901 may cross validate a measurement by the PRS measurement unit 750 of the donor UE 902 with another similar measurement (e.g., of the same PRS resource, or from the same PRS resource set, or from the same TRP, or from the same site, etc.) made by the recipient UE 901 or another UE. The device making the similar measurement may be the first UE (e.g., the recipient UE 901) or another device (e.g., another UE) that is separate from both the first UE and the second UE. The cross-validation unit 780 of the recipient UE 901 may cross validate a measurement made by the PRS measurement unit 750 of the donor UE 902 (and received from the donor UE 902 by the position information sharing unit 770 of the recipient UE 901) with another similar measurement made by the recipient UE 901 and/or with a similar measurement from another UE in acceptably close proximity to the recipient UE 901. The processor 710, possibly in combination with the memory 730, may comprise means for validating the first PRS measurement. In another example implementation, the method 1000 includes: measuring, by the first UE, a PRS resource to determine a second PRS measurement; and transmitting, from the first UE to the network entity, second position information based on the second PRS measurement. For example, at sub-stage 951 the recipient UE 901 (e.g., the PRS measurement unit 750 of the recipient UE 901) measures a subset of the PRS 941 received at stage 940, and at stage 970 transmits position information (e.g., measurement(s), processed measurement (s), location estimate(s)) in the measurement report 971 based on the measurement(s) of the PRS 941. The processor 710, possibly in combination with the memory 730, in combination with the transceiver 720 (e.g., the wireless receiver 244 and the antenna 246) may comprise means for measuring the PRS resource. In another example implementation, the method 1000 comprises transmitting the first position information to the network entity with a group indication indicative of a group including the first UE and the second UE. For example, the position information reporting unit 760 of the recipient UE 901 may include a group ID of a virtual UE in association with the first position information (e.g., such that the server 400 can combine the first position information with other appropriate information and/or transmit position information derived using the first position information to one or more appropriate devices, e.g., UEs, and/or take other appropriate action). The group ID may be obtained by the recipient UE 901 by being received from another UE or from the server 400, or by being produced by the recipient UE 901 (acting as a positioning entity/virtual UE controller). The processor 710, possibly in combination with the memory 730, in combination with the transceiver 720 (e.g., the antenna 246 and the wireless transmitter 242) may comprise means for transmitting the first position information with a group indication.

Figure 11:
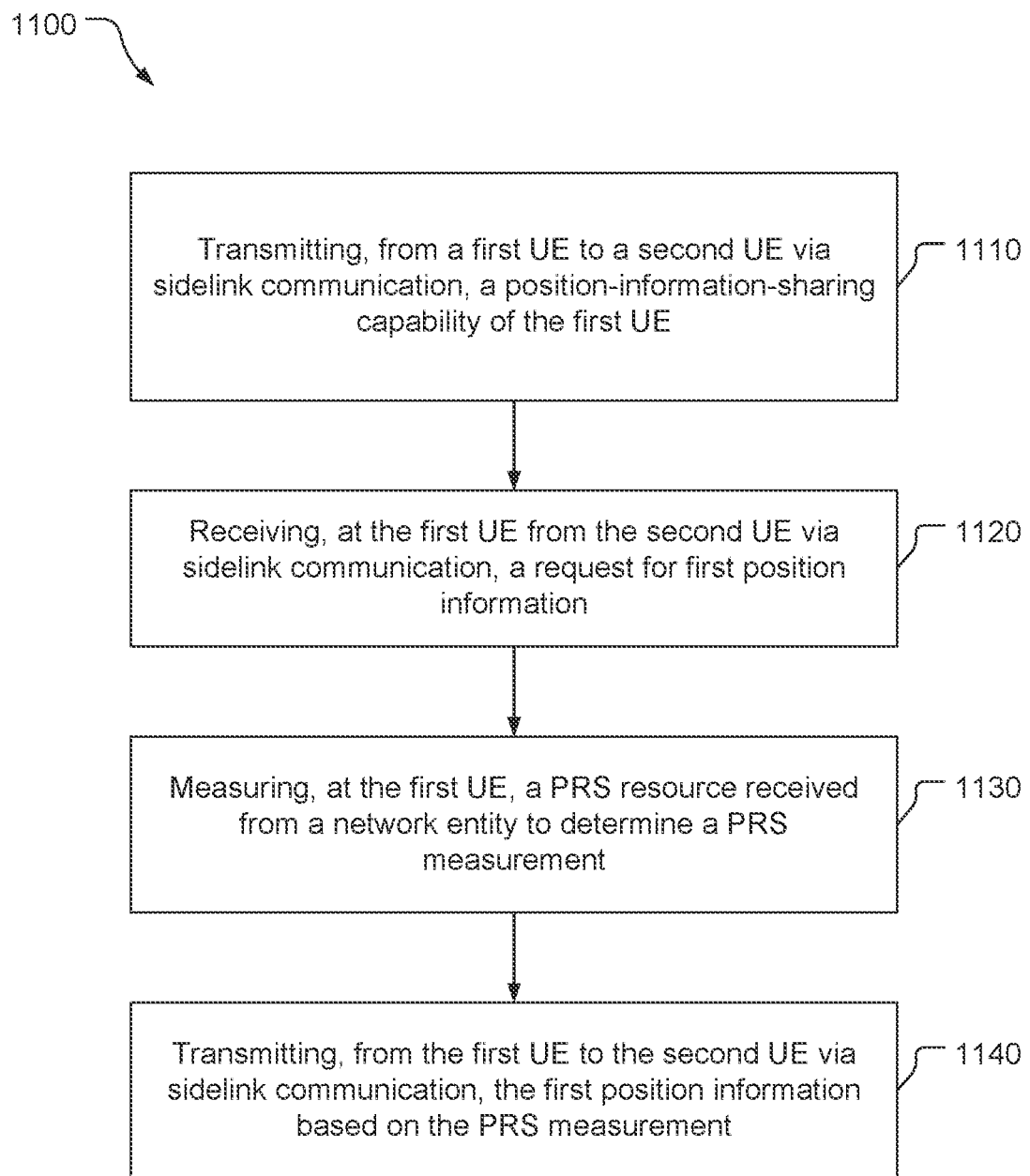
FIG. 11 is a block flow diagram of a position information sharing method.

Referring to FIG. 11, with further reference to FIGS. 1-9, a position information sharing method 1100 includes the stages shown. The method 1100 is, however, an example and not limiting. The method 1100 may be altered, e.g., by having stages added, removed, rearranged, combined, performed concurrently, and/or having single stages split into multiple stages.

At stage 1110, the method 1100 includes transmitting, from a first UE to a second UE via sidelink communication, a position-information-sharing capability of the first UE. For example, the position information sharing unit 770 of the donor UE 902 transmits the capability report 935 to the recipient UE 901 indicating one or more position information sharing capabilities, e.g., an ability to share position information, processing capacity, bandwidth, scheduled PRS resources that the donor UE 902 may measure, etc. The processor 710, possibly in combination with the memory 730, in combination with the transceiver 720 (e.g., the wireless transmitter 242 and the antenna 246) may comprise means for transmitting a position-information-sharing capability.

At stage 1120, the method 1100 includes receiving, at the first UE from the second UE via sidelink communication, a request for first position information. For example, the donor UE 902 receives the share request 939 from the recipient UE 901. The request may be a request for aperiodic, periodic, or semi-persistent sharing of position information by the donor UE 902 with the recipient UE 901. The processor 710, possibly in combination with the memory 730, in combination with the transceiver 720 (e.g., the wireless receiver 244 and the antenna 246) may comprise means for receiving the request.

At stage 1130, the method 1100 includes measuring, at the first UE, a PRS resource received from a network entity to determine a PRS measurement. For example, at sub-stage 952 the PRS measurement unit 750 of the donor UE 902 measures at one PRS resource of the PRS 942 received at stage 940. The processor 710, possibly in combination with the memory 730, in combination with the transceiver 720 (e.g., the wireless receiver 244 and the antenna 246) may comprise means for measuring the PRS resource.

At stage 1140, the method 1100 includes transmitting, from the first UE to the second UE via sidelink communication, the first position information based on the PRS measurement. For example, at stage 960 the position information sharing unit 770 of the donor UE 902 transmits the position information 961 to the recipient UE 901. The processor 710, possibly in combination with the memory 730, in combination with the transceiver 720 (e.g., the wireless transmitter 242 and the antenna 246) may comprise means for transmitting the first position information.

Implementations of the method 1100 may include one or more of the following features. In an example implementation, transmitting the first position information comprises transmitting the first position information only if the first UE measures the PRS resource independently of the request for the first position information. For example, the position information sharing unit 770 of the donor UE 902 may use a best-effort sharing behavior, sharing position information that the donor UE 902 measures/determines for the sake of the donor UE 902 and not measuring/determining position information due solely to receiving the request, e.g., the request 937 or the share request 939. In another example implementation, measuring the PRS resource comprises measuring the PRS resource in response to receiving the request such that the PRS measurement is an extra measurement in addition to one or more other PRS measurements that the first UE would make absent receipt of the request. For example, in response to receiving the request 937 or the share request 939 the PRS measurement unit 750 of the donor UE 902 may measure one or more PRS resources that the donor UE 902 would not measure without receiving the request 937, 939.

Also or alternatively, implementations of the method 1100 may include one or more of the following features. In an example implementation, the PRS resource is a first PRS resource and the PRS measurement is a first PRS measurement, and the method further comprises: measuring, by the first UE, a second PRS resource to determine a second PRS measurement; and abstaining from transmitting the second PRS measurement from the first UE to the second UE. For example, the donor UE 902 may transmit a subset of position information (e.g., a subset of measurements) that the donor UE 902 has available for sharing and not transmit another subset of position information to the recipient UE 901. The donor UE 902 may, for example, share one or more representative measurements per TRP, per TRP resource set, or per site (PRS source site). The processor 710, possibly in combination with the memory 730, may comprise means for abstaining from transmitting the second PRS measurement. In another example implementation, the first UE abstains from transmitting the second PRS measurement to the second UE based on the first PRS measurement being an earlier time of arrival than the second PRS measurement. For example, the position information sharing unit 770 of the donor UE 902 may determine which PRS measurement, e.g., timing measurement, not to share with the recipient UE 901 based on arrival times of the measurements, e.g., sharing a measurement of a PRS resource that arrived earlier (with an earlier ToA as opposed to an earlier PRS instance) than another PRS resource and not sharing the measurement of the other PRS resource (that arrived later). In another example implementation, the first UE abstains from transmitting the second PRS measurement to the second UE based on the first PRS resource being received with stronger power than the second PRS resource. For example, the position information sharing unit 770 of the donor UE 902 may determine which PRS measurement, e.g., power measurement, not to share with the recipient UE 901 based on indications of received signal power (e.g., RSSI, RSRP), e.g., sharing a measurement of a PRS resource that arrived with greater power than another PRS resource and not sharing the measurement of the other PRS resource (that arrived with less power). In another example implementation, the first UE abstains from transmitting the second PRS measurement to the second UE based on both the first PRS resource and the second PRS resource being at least one of associated with a single transmission/reception point, or associated with a single PRS resource set, or associated with a single PRS source site. For example, if the donor UE 902 has measurements for multiple PRS resources, the position information sharing unit 770 of the donor UE 902 may select to transmit one of the measurements and not another if both measurements correspond to the same TRP, or the same TRP resource set, or the same PRS source site, e.g., if the multiple measurements would be redundant.

Group—Benefit Mode

Figure 12:
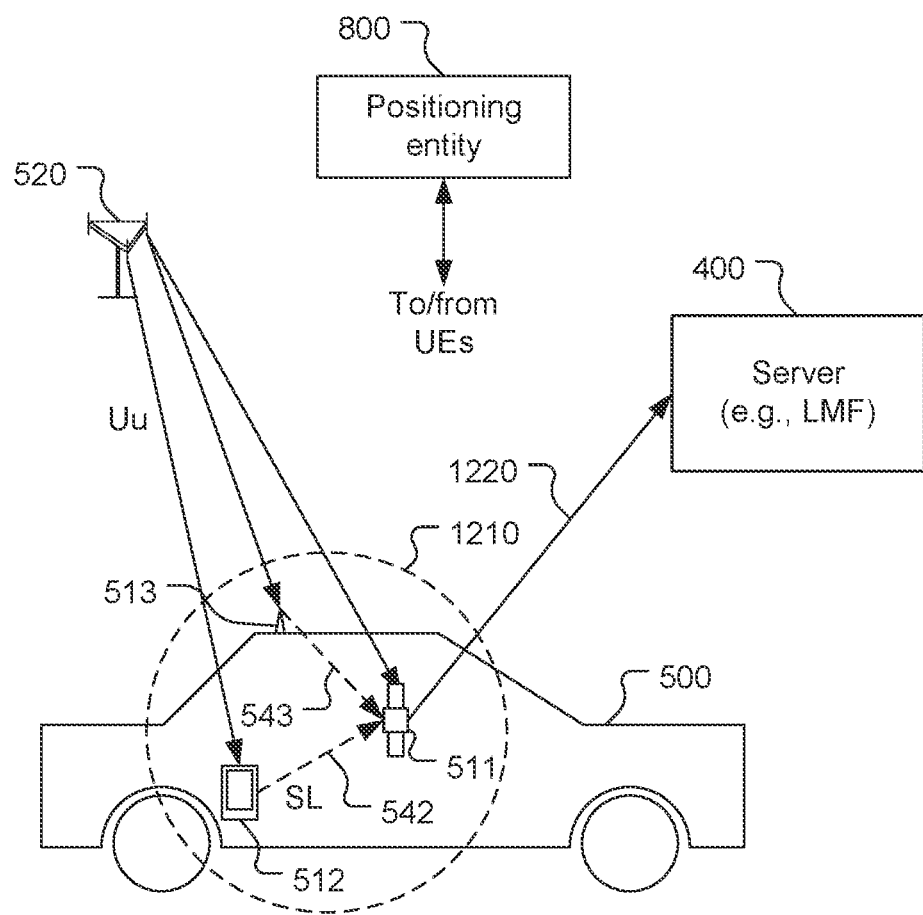
FIG. 12 a simplified view of a vehicle, a server, user equipment (UE) examples, and a positioning entity.

Referring also to FIG. 12, with further reference to FIGS. 5-8, in the group-benefit mode, multiple UEs, here the UEs 511-513, act together for at least some positioning tasks (e.g., position information determination (e.g., PRS measurement, processed measurement calculation, location estimate calculation) position information sharing) as a single virtual UE 1210. The virtual UE 1210 shown is an example, and countless other virtual UEs are possible (e.g., a virtual UE including multiple vehicle UEs). As with the individual-benefit mode, in the group-benefit mode one or more tasks, e.g., PRS measurements and/or position information calculations, may be offloaded from one UE to another UE. Implementation of the group-benefit mode may involve modifications to the legacy LPP protocol and the legacy SL protocol. In the group-benefit mode, a UE may act as a position information recipient and/or a position information donor, exchanging UE-neutral position information (position information in a UE-neutral format). Members of the virtual UE 1210 are all within close proximity of each other (e.g., such that position information measured/determined by one of the virtual UE members may be used as position information for another of the virtual UE members while maintaining desired positioning accuracy). The positioning entity 800 is configured to manage the virtual UE 1210, e.g., adding members to the virtual UE 1210, removing members from the virtual UE 1210, distributing measurement tasks between the members, determining one or more delegates for the virtual UE 1210, etc. Measurement reports provided to the server 400 from the virtual UE may indicate that reported position information is associated with the virtual UE 1210 (and thus all the members of the virtual UE 1210), e.g., by including a group ID corresponding to the virtual UE 1210.

The positioning entity 800 is configured to manage virtual UEs (e.g., the virtual UE 1210), e.g., controlling including membership and possibly controlling positioning task performance by the members. The positioning entity 800 may be a separate entity as shown, or may be integrated with an entity (e.g., the server 400, the TRP 300 (e.g., in the base station 520), or a UE such as any of the UEs 511-513). The positioning entity 800 may communicate directly and/or indirectly with the UEs in the virtual UE 1210 and UEs that are candidate for the virtual UE 1210. The virtual UE management unit 850 is configured to control membership in virtual UEs, in this example, the virtual UE 1210. The virtual UE management unit 850 may control membership to ensure that each member is within close proximity of all other members, e.g., based on rough estimates of member locations (e.g., using E-CID, previously-determined locations, and/or dead-reckoning location estimates, etc.).

The virtual UE management unit 850 may send a virtual UE request to each of one or more UEs that are candidate virtual UE members, e.g., based on the location(s) of the candidate member UE(s). If the positioning entity is not a UE or part of a UE (i.e., part of the server, part of a TRP, or independent), then the virtual UE management unit 850 may send a virtual UE request to each of two or more candidate virtual UE members. The virtual UE request may include an inquiry as to whether the UE supports position information sharing via sidelink with other UEs. The virtual UE request may include a virtual-UE-ID that may be included with reported position information to associate the position information with the virtual UE 1210. The virtual UE request may include UE-IDs (e.g., IMEI (International Mobile Equipment Identity), IMSI (International Mobile Subscriber Identity), etc.) of the virtual UE members to help the virtual UE members establish SL connections between each other.

If the positioning entity is part of a UE, then the request may include (1) the inquiry as to whether the receiving UE supports position information sharing via sidelink, (2) the UE-ID of the positioning entity, (3) a virtual-UE-ID, and (4) other UE IDs (if the request is transmitted to more than one UE).

The virtual UE management unit 850 may establish and manage (e.g., grow, reduce, terminate) a virtual UE. For example, the virtual UE management unit 850 may determine a virtual-UE-ID, determine one or more initial members, possibly determine a proximity requirement for the virtual UE, add one or more UEs to an existing virtual UE, remove one or more members from an existing virtual UE, or terminate an existing virtual UE.

The UE 700 (e.g., the position information sharing unit 770) may be configured to send, and the positioning entity 800 may be configured to receive, a request for the UE 700 to be added to a virtual UE, for the UE 700 to be removed from a virtual UE, or for the positioning entity 800 to form a virtual UE. For example, the UE 700 may, in response to SL-discovery/connection to another UE, send a request to the positioning entity 800 to join a virtual UE or to have the positioning entity 800 form a virtual UE. The UE 700 may request to join a specific virtual UE (e.g., by including the virtual-UE-ID in the request) in response to SL discovery of a virtual UE, e.g., obtaining a virtual-UE-ID from a UE that the UE 700 discovers using SL. Requests to join a virtual UE may be sent to the positioning entity 800 individually by each UE requesting entry into a virtual UE, and/or may be sent by a delegate of the virtual UE to the positioning entity 800 on behalf of the UE requesting membership in the virtual UE. A virtual UE may include one or more delegates that may send requests on behalf of other members or candidate members of the virtual UE, and/or may send position information collected from one or more other members of an existing virtual UE. A request to join an existing virtual UE may include the virtual-UE-ID and/or may contain the UE-ID(s) of one or more UEs of the existing virtual UE. A request to form a virtual UE may include UE-ID(s) of one or more UEs requested to be in a new virtual UE along with the requester. A request to form a virtual UE may include a proposed virtual-UE-ID. To leave a virtual UE, a member of the virtual UE may send a request to the positioning entity 800 directly (especially if the positioning entity 800 is part of a UE of the virtual UE) and/or via a delegate of the virtual UE.

Each UE in the virtual UE 1210 may be responsible, as coordinated by the positioning entity 800, for a portion of PRS measurements to be taken by the virtual UE 1210. For example, the virtual UE position information management unit 860 may coordinate (e.g., assign) the position information to be determined (e.g., the PRS measurement(s) to be made) by each of the members of the virtual UE 1210. The virtual UE position information management unit 860 may be configured to unify PRS configurations across members of the virtual UE, e.g., providing mappings of UE-specific PRS configurations to a UE-neutral PRS configuration. For example, the UE 511 may take one or more measurements of PRS from one TRP (TRP1, although not shown in FIG. 12), the UE 512 may take one or more measurements of PRS from another TRP (TRP2, although not shown in FIG. 12), and the UE 513 may take measurement of PRS from a set of TRPs (TRP3, TRP4, TRP5, although not shown in FIG. 12). If a UE does not share the position information determined by that UE, but receives position information from another UE in the virtual UE 1210, then that UE is acting like the individual-benefit (hitchhiking) mode, but in this case the receipt of the shared position information will be visible to the server 400 and a determined location can still be used for, and thus benefit, the group of UEs in the virtual UE 1210. The positioning entity 800 may be responsible for distributing (including redistributing as appropriate) the position-information-determination tasks (including measurement tasks) among the UEs in the virtual UE 1210. The positioning entity 800 may split measurements tasks at the TRP level, or at the PRS resource set level (within a TRP), or at the PRS resource level (within a TRP). To split measurements tasks at the PRS resource set level or the PRS resource level, detailed configuration information of PRS resource set or PRS resource, respectively, is provided during negotiation between the positioning entity 800 and the UEs in the virtual UE 1210 and during position information sharing. A shared measurement may be identified at the level of measurement split depending on the use of the measurement. For example, for AoD determination, the measurement may be identified at a PRS resource level, even if a split was at the TRP level, in order to provide sufficient AoD resolution.

Communication between members of the virtual UE 1210 and the positioning entity 800, including reporting position information, may occur in a variety of ways. For example, each member of the virtual UE 1210 may communicate with the positioning entity 800 without communications passing through another member of the virtual UE 1210 (although the communications may pass through one or more other entities such as a TRP). As another example, a member of the virtual UE 1210 may serve as a delegate or multiple members of the virtual UE 1210 may serve as delegates for communication with the server 400. As another example of communication between the virtual UE 1210 and the server 400, hybrid communication may be used where one or more non-delegate members of the virtual UE 1210 may communicate with the server 400 (e.g., to report position information) without the communication passing through a delegate and one or more delegate members of the virtual UE 1210 collect and send position information to the server 400.

For communication between the virtual UE 1210 and the server 400 using one or more delegates, a delegate may collect position information from one or more other members of the virtual UE 1210 and transmit the position information to the server 400. In the example shown in FIG. 12, the UE 511 is acting as a delegate, collecting position information 542, 543 from the UEs 512, 513 and providing a report 1220 that may include at least some of the position information 542, 543 and/or may include position information determined by the UE 511. The report 1220 is transmitted by the UE 511 to the server 400 in a single LPP session. The report 1220 may include a group ID of the virtual UE 1210 and/or may include the ID(s) of one or more of the members of the virtual UE 1210 that the server 400 may associate with the virtual UE 1210. If the virtual UE 1210 includes multiple delegates, some position information may be collected by more than one delegate and reported to the server 400, e.g., to help ensure delivery of the position information to the server 400. The positioning entity 800 may, however, coordinate the determination and/or collection and/or reporting of position information to avoid sending the same position information multiple times from one virtual UE to the server 400, e.g., to limit communication overhead between the virtual UE 1210 and the server 400. A location estimate for the virtual UE 1210 determined by the server 400 may be transmitted by the server 400 to the delegate(s) via LPP and transmitted from the delegate(s) to other members of the virtual UE 1210 via sidelink.

For communication between the virtual UE 1210 and the server 400 from one or more members of the virtual UE 1210 without passing through a delegate, each of one or more non-delegate members of the virtual UE 1210 maintains a respective reporting session (e.g., using LPP) with the server 400. Position information sent from each non-delegate member (which could be all of the members) of the virtual UE 1210 is associated with a group ID of the virtual UE 1210 (e.g., the group ID is included in a report with the position information). The server 400 gathers the position information for the virtual UE 1210 from multiple members (non-delegate member(s) and delegate member(s) if any) of the virtual UE 1210 to determine a location estimation for the virtual UE 1210. The server 400 may be able to use a combination of the position information reported by multiple UEs to determine a location estimate, e.g., when a location estimate (at least meeting desired accuracy) would not determinable based on the position information (e.g., measurements) from a single one of the UEs. The server 400 transmits the location estimate to the non-delegate member (s), and to any delegate members, of the virtual UE 1210 via LPP.

As with the individual-benefit mode, cross validation may be performed in the group-benefit mode. Cross validation of position information, e.g., measurements, may be performed at one or more of the UEs in the virtual UE 1210. The appropriate member UF(s) may discard or otherwise abstain from reporting unreliable position information to the server 400, avoiding communication overhead to transmit the information, avoiding processing of the information by the server 400, and avoiding negative consequences, if any, to the location estimate by using the unreliable information to determine the location estimate. Cross validation is discussed in more detail below.

Figure 13:
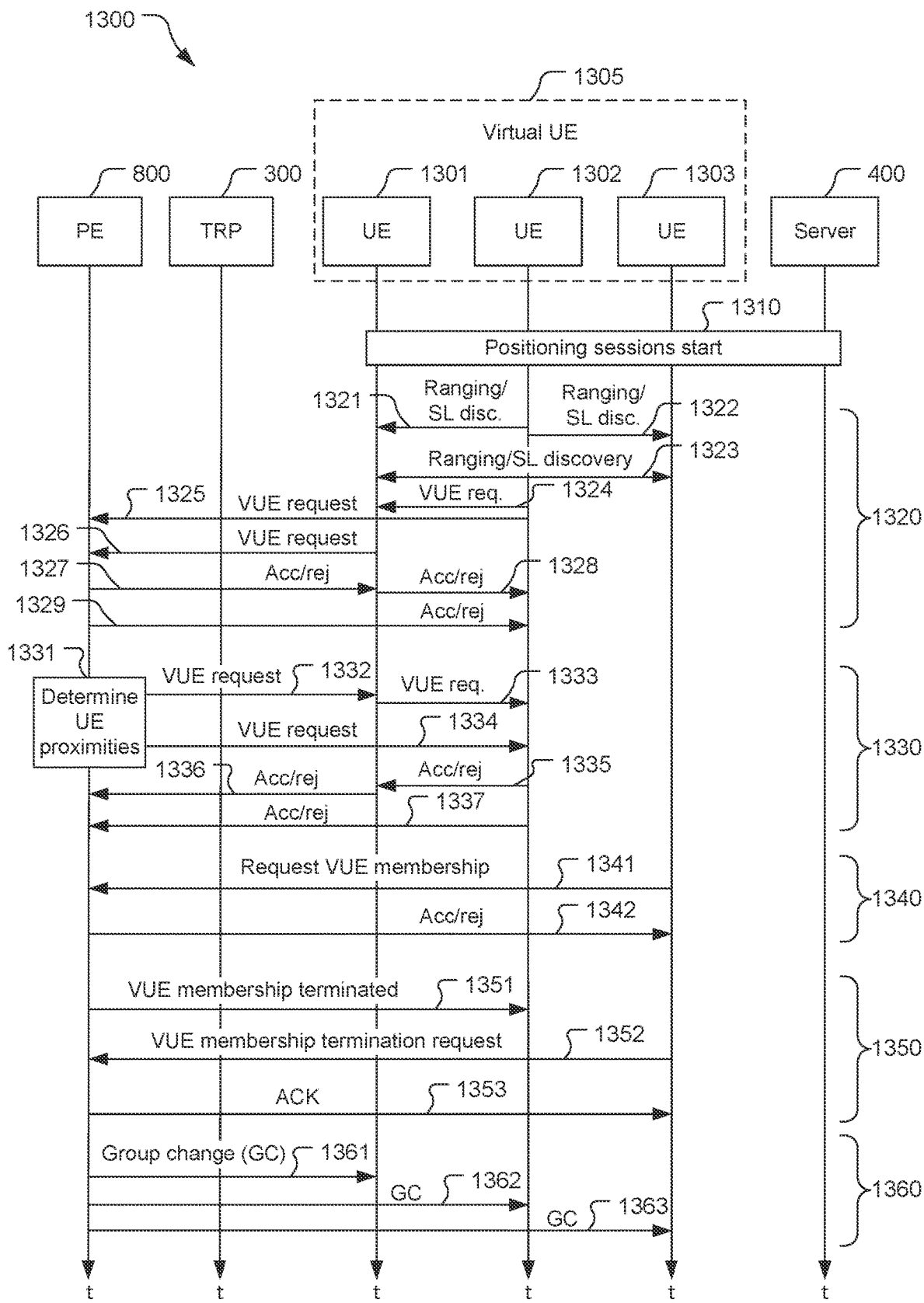
FIG. 13 is a signaling and process flow diagram of a method for establishing and managing, and possibly terminating, a virtual UE.

Referring to FIG. 13, with further reference to FIGS. 1-9 and 12, a signaling and process flow 1300 for establishing and managing, and possibly terminating, a virtual UE includes the stages shown. The flow 1300 is an example, as stages may be added, rearranged, and/or removed. Signals may be exchanged directly between UEs 1301, 1302, 1303 and the server 400 in the flow 1300 and/or may be exchanged via the TRP 300.

At stage 1310, position sessions between the server 400 and each of a UE 1301, a UE 902, and a donor UE 903 start. Stage 1310 is similar to stage 920 discussed above with respect to the flow 900.

At stage 1320, one or more of the UEs 1301-1303 determines proximity relative to the other UEs 1301-1303 and requests formation of, or inclusion in a virtual UE 1305. While the VUE 1305 is shown with three members, i.e., the UEs 1301-1303, one or more of these UEs 1301-1303 may be removed from the VUE 1305 and one or more other UEs may be members of the VUE 1305. Ranging/SL-discovery signals 1321, 1322, 1323 may be exchanged between respective pairs of the UEs 1301-1303 to determine that the UEs 1301-1303 are within an acceptable proximity of each other, similar to the discussion of ranging signals 931, 932 in the flow 900. Position information sharing capability(ies) of the UEs 1301-1302 may also be exchanged at stage 1320. Based on the proximity determination(s) and possibly based on the sharing capability information, one or more requests to form or join a virtual UE may be sent to the positioning entity 800 directly or indirectly. In this example, the UE 1302 sends a virtual-UE request 1324 to the UE 1301 and/or a virtual-UE request 1325 to the positioning entity 800. The request 1324 and/or the request 1325 may request to form a virtual UE with the UE 1301, or request to join a virtual UE that includes the UE 1301. The UE 1301 may send a virtual-UE request 1326 to the positioning entity 800 (e.g., if the request 1325 is not sent and/or in response to receiving the request 1324 with the UE 1301 acting as a delegate UE), with the request 1326 requesting formation of a virtual UE including the UEs 1301, 1302, or a request to add the UE 1302 to a virtual UE containing the UE 1301. The request 1325 and/or the request 1326 may include a virtual-UE-ID of the virtual UE to be formed or the virtual UE to be joined by the UE 1302 (e.g., if the UE 1302 obtained the virtual-UE-ID, e.g., from the UE 1301). The virtual UE management unit 850 of the positioning entity 800 determines whether to form the requested UE or add the UE 1302 to a virtual UE as requested, e.g., based on indicated proximity of the UEs 1301, 1302, processing capability(ies) of one or both of the UEs 1301, 1302, requested processing limit(s) of the UE(s) 1301, 1302, reporting capability(ies) of one or both of the UEs 1301, 1302, and/or requested positioning accuracy, etc. For example, the virtual UE management unit 850 may determine whether forming the virtual UE or adding the UE 1302 to an existing virtual UE will likely improve positioning accuracy and/or will help reduce power consumption to meet one or more power consumption limits of one or both of the UEs 1301, 1302. The virtual UE management unit 850 of positioning entity 800 transmits an accept/reject message 1327 indicating whether the requested virtual UE formation or modification is accepted (approved) or rejected. If the UE 1301 is a delegate UE, then the UE 1301 transmits an accept/reject message 1328 to the UE 1302. The virtual UE management unit 850 of the positioning entity 800 transmits an accept/reject message 1329 to the UE 1302 if the UE 1301 is not acting as a delegate UE, and may send the accept/reject message 1329 to the UE 1302 even if the UE 1301 is acting as a delegate UE. For example, if the UE 1301 is acting as a delegate, the positioning entity 800 may send a report termination message to the UE 1302 to terminate an on-going LPP session between the UE 1302 and the server 400 explicitly. As another example, the LPP session between the UE 1302 and the server 400 may be implicitly terminated, by the UE 1302 responding to acceptance of the UE 1302 into the VUE 1305 with the UE 1301 designated as a delegate by automatically terminating the LPP session between the UE 1302 and the server 400. The messages 1327-1329 may include a virtual-UE-ID (e.g., if the virtual UE is being formed, or to confirm formation of or acceptance into a virtual UE) and/or a list of members of the VUE 1305.

In addition to or instead of stage 1320, at stage 1330, the positioning entity 800 determines proximities of the UEs 1301-1303 to each other. For example, at sub-stage 1331, the virtual UE management unit 850 may use one or more ranging measurements from one or more of the UEs 1301-1303 and/or other information, e.g., rough location estimate (s) of the UE(s) 1301-1303 to determine UEs that are within an acceptable proximity to act as a virtual UE. The virtual UE management unit 850 transmits a VUE request 1332 (virtual UE request) to the UE 1301, in this example requesting formation of a virtual UE including the UEs 1301, 1302 or addition of the UE 1302 to a virtual UE that already includes the UE 1301. The UE 1301 transmits a VUE request 1333 to the UE 1302 based on the VUE request 1332 if the UE 1301 is acting as a delegate. The virtual UE management unit 850 transmits a VUE request 1333 to the UE 1302 if the UE 1301 is not acting as a delegate, and may send the VUE request 1333 to the UE 1302 if the UE 1301 is acting as a delegate. The UE 1302 transmits an accept/reject message 1335 to the UE 1301 accepting or rejecting the VUE request 1333 if the UE 1301 is acting as a delegate. The UE 1301 transmits an accept/reject message 1336, e.g., based on the accept/reject message 1335, to the positioning entity 800 accepting or rejecting the VUE request 1332. The UE 1302 transmits an accept/reject message 1337 to the positioning entity 800 accepting or rejecting the VUE request 1334 if the UE 1301 is not acting as a delegate and may send the message 1337 accepting or rejecting the VUE request 1333 if the UE 1301 is acting as a delegate. The VUE requests 1332-1334 may include a virtual-UE-ID (e.g., if the virtual UE is being formed, or to confirm formation of or acceptance into a virtual UE) and/or a list of members of the VUE 1305.

At stage 1340, the UE 1303 transmits a request VUE membership message 1341 to the positioning entity 800. The message 1341 may be sent directly to the positioning entity 800 as shown. Also or alternatively, if the UE 1301 is acting as a delegate, the UE 1303 may send a VUE membership request to the UE 1301 and the UE 1301 may respond by sending a VUE membership request to the positioning entity (similar to the discussion of requests 1324, 1326 of stage 1320 with respect to the UE 1302 requesting virtual UE membership). The positioning entity 800 determines whether to accept or reject membership of the UE 1303 in the virtual UE and transmits an accept/reject message 1342 to the UE 1303 accordingly. Also or alternatively, if the UE 1301 is acting as a delegate, the positioning entity 800 may transmit an accept/reject message to the UE 1301 and the UE 1301 may respond by transmitting a corresponding accept/reject message to the UE 1303 (similar to the discussion of the messages 1327, 1328 of stage 1320 with respect to the positioning entity 800 accepting/rejecting membership of the UE 1302 in a virtual UE).

At stage 1350, one or more UEs may be removed from a virtual UE or a virtual UE may be terminated. In the example shown, the virtual UE management unit 850 of the positioning entity 800 transmits a VUE membership terminated message 1351 indicating to the UE 1302 that membership of the UE 1302 in an indicated virtual UE, here the VUE 1305, is terminated. The UE 1302 will not be assigned to share position information and position information of the indicated VUE will no longer be provided to the UE 1302. The UE 1303 may, for example, request removal from the VUE 1305 because the UE 1303 is low on power, or is busy with operations independent of operations for the VUE 1305, or desires not to use power for operations for the VUE 1305. Also as shown, the UE 1303 transmits a VUE membership termination request 1352 to the positioning entity 800 requesting removal of the UE 1303 from the virtual UE 1305. The virtual UE management unit 850 of the positioning entity 800 transmits an ACK message 1353 (acknowledgement) acknowledging removal of the UE 1303 from the VUE 1305. If the UE 1301 is acting as a delegate, then VUE termination indications, VUE termination requests, and/or VUE termination ACK messages may be sent via the UE 1301, similar to the discussion above. Thus, for example, if the UE 1301 is serving as a delegate for the VUE 1305, then a VUE membership termination request for any member of the VUE 1305 (or at least any UE of the VUE 1305 for which the UE 1301 is serving as a delegate) may be transmitted by, and received from, the UE 1301. If the positioning entity 800 is a part of a UE that is part of the VUE 1305, then the VUE management unit 850 may terminate a UE from membership in the VUE 1305 in response to the positioning entity 800 losing SL connection with that UE.

At stage 1360, one or more group change (GC) messages 1361, 1362, 1363 may be sent. The GC messages 1361-1363 indicate a change the VUE 1305, e.g., a membership change (indicating one or more UEs that are no longer part of the VUE and/or one or more new members that are now part of the VUE). The GC message 1361 may be sent without sending the GC messages 1362, 1363, e.g., if the UE 1301 is acting as a delegate for the VUE 1305, in which case the UE 1301 may transmit GC messages (not shown) to the UEs 1302, 1303, respectively.

Figure 14:
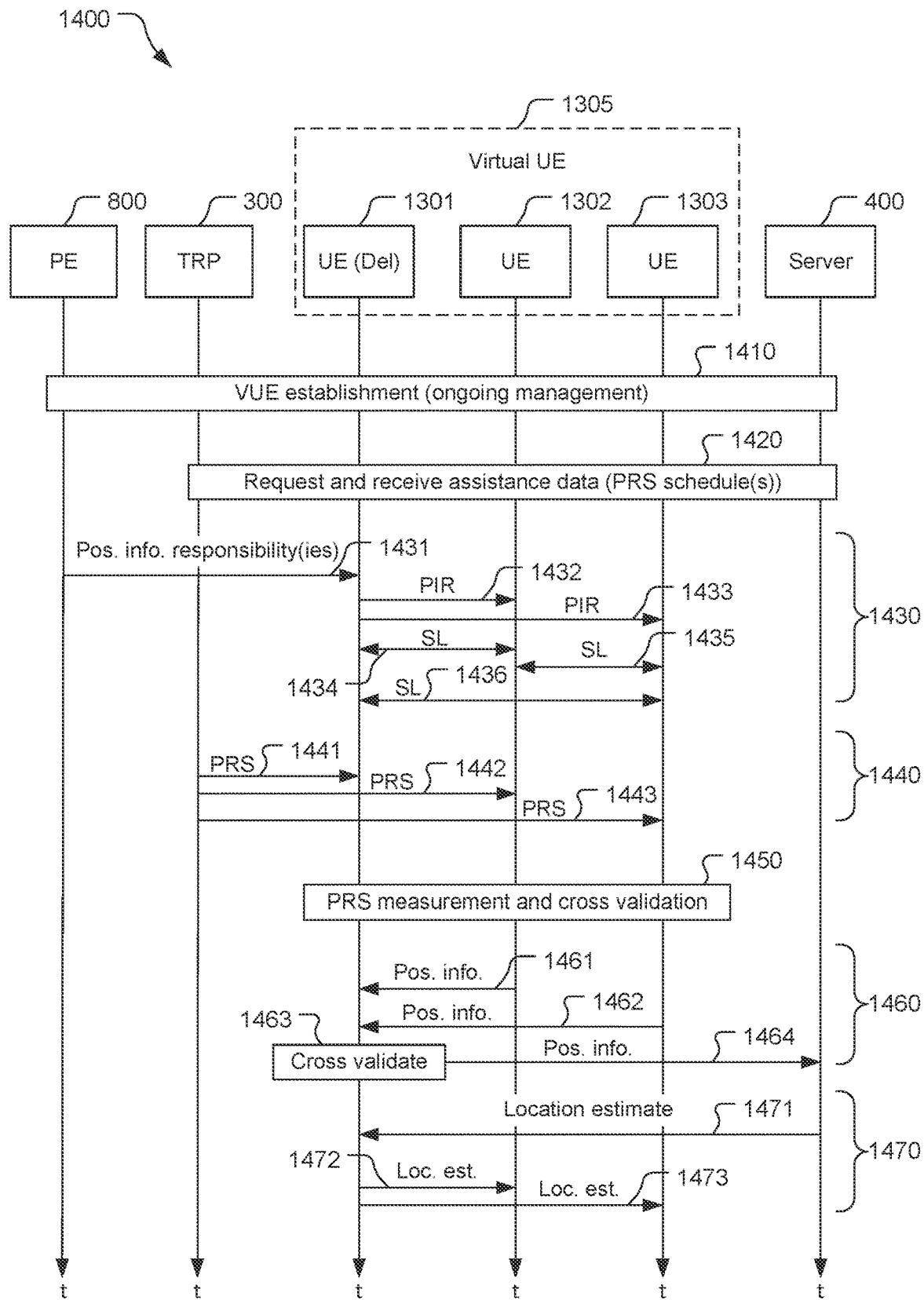
FIG. 14 is a signaling and process flow diagram of a method for sharing position information in the virtual UE shown in FIG. 13 with a delegate.

Referring to FIG. 14, with further reference to FIGS. 1-9, 12, and 13, a signaling and process flow 1400 for sharing position information in the virtual UE 1305 with a delegate and determining a location estimate for the virtual UE 1305 includes the stages shown. The flow 1400 is an example, as stages may be added, rearranged, and/or removed. Signals may be exchanged directly between UEs 1301, 1302, 1303 and the server 400 in the flow 1400 and/or may be exchanged via the TRP 300.

At stage 1410, the VUE 1305 is established and managed in an ongoing fashion. For example, the VUE 1305 is established as discussed with respect to the flow 1300. The VUE 1305 is managed, e.g., as discussed with respect to the flow 1300, which may include addition of members not shown and/or removal of one or more of the members (i.e., the UEs 1301-1303) shown. In this example, the UE 1301 is acting as a delegate for the VUE 1305, here the only delegate for the VUE 1305. If the only delegate in a VUE is removed from a VUE, then a new delegate may be designated or the VUE may operate without a delegate (e.g., as discussed below with respect to FIG. 15).

At stage 1420, the UEs 1301-1303 in the VUE 1305 request and receive assistance data. The UEs 1301-1303 send requests for assistance data to the server 400 (e.g., via the TRP 300). The TRP 300 and the server 400 coordinate PRS schedules. The server 400 and/or the TRP 300 provide assistance data, including respective PRS schedules (e.g., each comprising a new PS schedule or a reconfigured PRS schedule), to the UEs 1301-1303.

At stage 1430, the positioning entity assigns positioning information responsibilities for the VUE 1305. For example, the VUE position information management unit 860 of the positioning entity 800 transmits a position information responsibility (PIR) message 1431 to the UE 1301 that is acting as the sole delegate for the VUE 1305. The UE 1301, e.g., the position information sharing unit 770 of the UE 1301, responds to receipt of the message 1431 by sending position information responsibility messages 1432, 1433 to the UEs 1302, 1303, respectively. The messages 1431-1433 assign respective responsibilities of the UEs 1301-1303 to determine respective position information (e.g., make respective PRS measurements, and possibly determine one or more processed PRS measurements and/or possibly determine one or more location estimates). The message 1432 may indicate the responsibilities for only the UE 1302 and the message 1433 may indicate the responsibilities for only the UE 1303, or the messages 1432, 1433 may indicate responsibilities for other UEs as well. One or more sets of UEs (with at least two UEs per set) of the VUE 1305 may negotiate with each other regarding what positioning responsibilities to perform (e.g., what measurement(s) to make, what processed measurement(s) to determine), e.g., through sidelink communications. For example, the UEs 1301, 1302 may negotiate via SL communications 1434, the UEs 1302, 1303 may negotiate via SL communications 1435, and/or the UEs 1301, 1303 may negotiate via SL communications 1436. The negotiations may replace one or more responsibilities indicated by the PIR messages 1431-1433. The UEs 1301-1303 may negotiate, for example, similar to the discussion above regarding stage 930, with capabilities being exchanged requests being determined based on the capabilities and sent to one or more other UEs until agreement is reached as to a distribution of responsibilities. The assignments/determinations of responsibilities may indicate what PRS resources to measure and may indicate what measurements or other position information to share. The assignments/determinations of responsibilities may help load balance PRS measurements, may help conserve power used by power-limited UEs, and/or may help improve accuracy (e.g., by having UEs with higher-processing capability make appropriate measurements, or by having each UE measure the PRS resource(s) that that UE is best able to measure or that that UE can measure better than other UEs in the VUE 1305), and/or may provide one or more other advantages. Information in one or more of the PIR messages 1431-1433 may also or alternatively be provided in one or more measurement request messages and/or in the PRS configuration(s) exchanged at stage 1420.

At stage 1440, the TRP 300 sends PRS 1441, 1442, 1443 to the UEs 1301, 1302, 1303, respectively. For example, the TRP 300 sends the PRS 1441, 1442, 1443 in accordance with the PRS schedules indicated in the AD at stage 1420. In this example, DL-PRS are sent by the TRP 300, but other PRS (e.g., SL-PRS) may also or alternatively be transmitted at stage 1440 to the UEs 1301-1303.

At stage 1450, the UEs 1301-1303 measure respective PRS resources. The UEs 1301-1303 may measure respective PRS resources (which may overlap (i.e., multiple UEs may measure the same PRS resources or similar PRS resources (e.g., from the same TRP or from the same PRS resource set)). One or more of the UEs 1301-1303 may not measure any PRS resources (at least for some time). One or more of the UEs 1301-1303 may obtain one or more shared measurements from one or more UEs in close proximity (e.g., within and/or outside the VUE 1305). For example, the UE 1301 may obtain PRS measurement(s) from the UE 1302 and/or the UE 1303 (and/or a UE outside the VUE 1305 but in close proximity to the UE 1301), the UE 1302 may obtain PRS measurement(s) from the UE 1301 and/or the UE 1303 (and/or another UE), and/or the UE 1303 may obtain PRS measurement(s) from the UE 1301 and/or the UE 1302 (and/or another UE). Any UE receiving a shared measurement similar to a measurement made by the UE (or received from another UE) may cross validate the measurement(s) to determine whether any measurement is unreliable. A UE that determines that a measurement is unreliable may abstain from further processing and/or sharing that measurement, which may reduce signaling overhead, may avoid using power for further processing of the measurement by the UE, may reduce processing by the server 400, and/or may improve positioning accuracy and/or latency.

At stage 1460, the non-delegate UE(s), here the UEs 1302, 1303, share respective position information 1461, 1462 with the delegate UE(s), here the UE 1301. The shared position information may be all or less than all of the position information determined (or otherwise obtained, e.g., from another close-proximity UE) by the respective UE. At sub-stage 1463, the UE 1301 may use the position information 1461, 1462 to perform cross validation on one or more measurements (e.g., made by any of the UEs 1301-1303 or other close-proximity UE from which the UE 1301 obtained one or more measurements) to determine whether the measurement(s) is (are) unreliable. If the UE 1301 determines that a measurement is unreliable, the UE 1301 may abstain from further processing and/or sharing that measurement. The UE 1301 transmits position information 1464 to the server 400. The position information 1464 may include some or all of the position information determined by the UE 1301, some or all of the position information 1461, 1462 received from the UEs 1302, 1303, and/or position information from one or more other close-proximity UEs (not in the VUE 1305) that shared position information with the UE 1301. In UE-based positioning mode, the position information 1464 will include a location estimate. If the UE 1301 is the client, or if one of the donor UEs 1302, 1303 is the client and the UE 1301 shares the position information 1464 with the client, then the server 400 may or may not transmit the position information 1464 to the client. If the UE 1301 is not the client or does not provide the position information to the client, then the server 400 may provide the location estimate to the client (e.g., one of the UEs 1302, 1303 or to another UE or another entity).

At stage 1470, for UE-assisted positioning, the server 400 processes the position information received at stage 1460 and provides a location estimate for the VUE 1305. The processor 410 may use some or all of the position information 1464 to determine a location estimate 1471 for the VUE 1305 and transmit the location estimate 1471 to the delegate UE(s) of the VUE 1305, here the UE 1301, if any of the UEs 1301-1303 is a location client. The UE 1301 may respond to receiving the location estimate 1471 by transmitting location estimate messages 1472, 1473 to one or both of the UEs 1302, 1303, respectively, indicating the location estimate 1471, based on which of the UEs 1301-1303 is a location client. The location estimate 1471 may include a the virtual-UE-ID (VUE-ID) of the VUE 1305. The UE 1301 may use the VUE-ID to determine to which UEs to send the location estimate 1471.

Figure 15:
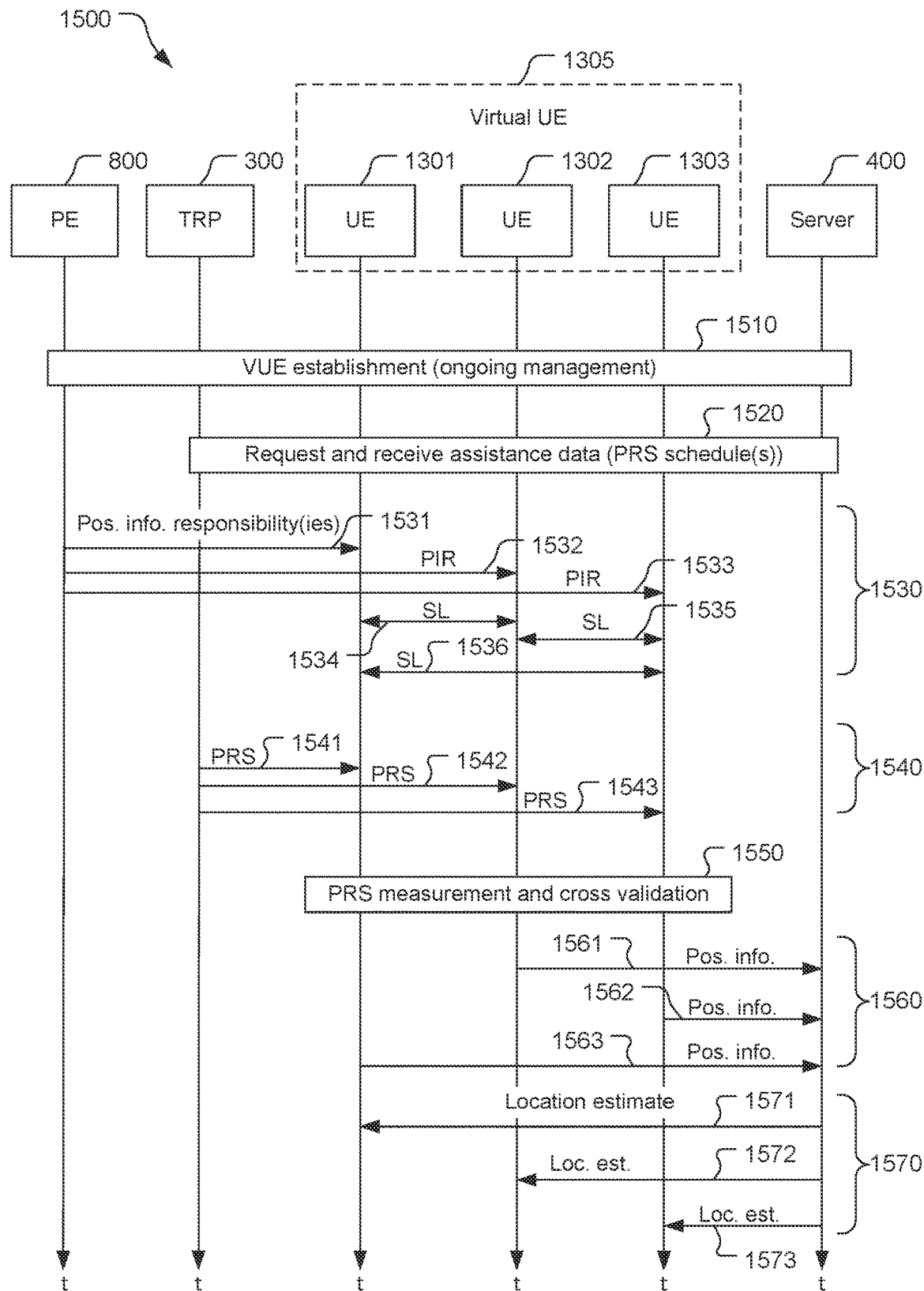
FIG. 15 is a signaling and process flow diagram of a method for sharing position information in the virtual UE shown in FIG. 13 without a delegate and determining a location estimate for the virtual UE.

Referring to FIG. 15, with further reference to FIGS. 1-9, and 12-14, a signaling and process flow 1500 for sharing position information in the virtual UE 1305 without a delegate and determining a location estimate for the virtual UE 1305 includes the stages shown. The flow 1500 is an example, as stages may be added, rearranged, and/or removed. Signals may be exchanged directly between UEs 1301, 1302, 1303 and the server 400 in the flow 1500 and/or may be exchanged via the TRP 300.

Stages 1510, 1520, 1540, and 1550 are the same as or similar to the stages 1410, 1420, 1440, and 1450. At stages 1510, 1520, the VUE 1305 is established and managed, and AD is requested and delivered. At stage 1540, PRS 1541, 1542, 1543 are delivered by the TRP 300 to the UEs 1301-1303. At stage 1550, the PRS are measured and cross validation may be performed by any of the UEs 1301-1303.

At stage 1530, position information responsibilities are assigned. In this example, without a delegate, the positioning entity 800 sends PIR messages 1531, 1532, 1533 to the UEs 1301-1303, respectively. The PIR messages 1531-1533 indicate the respective responsibilities of the UEs 1301-1303 as to what position information to obtain and possibly what position information to report to the server 400. Two or more of the UEs 1301-1303 (in one or more UE sets), similar to the discussion with respect to stage 1430, may exchange SL communications 1534, 1535, 1536 and negotiate position information responsibilities.

At stage 1560, the UEs 1301-1303 transmit respective position information 1561, 1562, 1563. The UEs 1301-1303 transmit the position information 1561-1563 to the server 400 (possibly through the TRP 300) without being sent to a delegate (as at stage 1460).

At stage 1570, the server 400 determines a location estimate for the VUE 1305 and distributes the location estimate to the UEs 1301-1303. The server 400 may transmit the location estimate in one or more location estimate messages 1571, 1572, 1573 to the UEs 1301, 1302, 1303, respectively, instead of sending the location estimate to the delegate UE as in stage 1470. The server 400 may send one or more of the messages 1571-1573 based on which, if any, of the UEs 1301-1303 is a location client.

Figure 16:
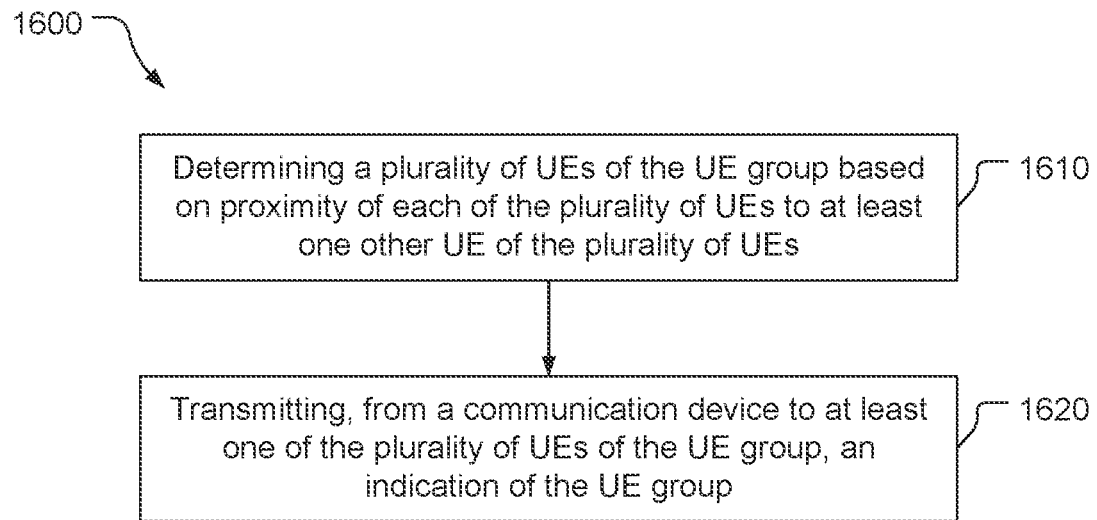
FIG. 16 is a block flow diagram of a method of managing a UE group.

Referring to FIG. 16, with further reference to FIGS. 1-15, a method 1600 of managing a UE group includes the stages shown. The method 1600 is, however, an example and not limiting. The method 1600 may be altered, e.g., by having stages added, removed, rearranged, combined, performed concurrently, and/or having single stages split into multiple stages.

At stage 1610, the method 1600 includes determining a plurality of UEs of the UE group based on proximity of each of the plurality of UEs to at least one other UE of the plurality of UEs. For example, the positioning entity 800 determines the UEs of a VUE based on proximities of the UEs, e.g., proximities of the UEs 1301, 1302, 1303 for the VUE 1305. The positioning entity 800 may determine the proximities based on information from the server 400 and/or the UEs 1301-1303. The processor 810, possibly in combination with the memory 830, possibly in combination with the transceiver 820 (e.g., an antenna and a wireless transmitter and/or a wireless receiver, and/or a wired receiver and/or a wired transmitter) may comprise means for determining the plurality of UEs of the UE group.

At stage 1620, the method 1600 includes transmitting, from a communication device to at least one of the plurality of UEs of the UE group, an indication of the UE group. For example, the positioning entity 800 sends one or more of the VUE requests 1332-1334 (e.g., the VUE request 1332 (and possibly the VUE request 1334) if the UE 1301 is a delegate of the VUE 1305, or the VUE requests 1332, 1334 if there is no delegate for the VUE 1305). As another example, the positioning entity sends the request VUE membership message 1341 to the UE 1303. As other example, the positioning entity sends one or more of the accept/reject messages 1327, 1328, 1342. The processor 810, possibly in combination with the memory 830, in combination with the transceiver 820 (e.g., an antenna (e.g., the antenna 246, 346, or 446) and a wireless transmitter (e.g., the wireless transmitter 242, 342, 442, respectively) and/or a wired transmitter (e.g., the wired transmitter 252, 352, 452) may comprise means for transmitting the indication of the UE group.

Implementations of the method 1600 may include one or more of the following features. In an example implementation, the indication of the UE group includes a group identification. For example, the group indication may include a VUE-ID identifying the group (and possibly the group members). An explicit or implicit instruction may be included to instruct that the VUE-ID be included with position information directly to a network entity (without passing through a delegate of the group). In another example implementation, the method 1600 comprises transmitting a positioning request to a selected UE of the plurality of UEs of the UE group for the selected UE to provide requested position information. For example, the VUE position information management unit 860 of the positioning entity 800 transmits the PIR message 1431 or the PIR messages 1531-1533 indicating positioning information that the respective UEs 1301-1303 are to provide. The positioning information may be one or more measurements, one or more processed measurements, and/or one or more location estimates. The processor 810, possibly in combination with the memory 830, possibly in combination with the transceiver 820 (e.g., an antenna and a wireless transmitter and/or a wired transmitter) may comprise means for transmitting the positioning request. In another example implementation, the method 1600 comprises transmitting a sharing request to a selected UE of the plurality of UEs of the UE group for the selected UE to share the requested position information with a designated UE of the plurality of UEs of the UE group. The sharing request may be transmitted indirectly to the selected UE. For example, the portions of the PIR message 1431 intended for the UEs 1302, 1303 may indicate for the UEs 1302, 1303 to share position information with the UE 1301 that is acting as a delegate for the VUE 1305. The positioning information may be one or more measurements, one or more processed measurements, and/or one or more location estimates. The processor 810, possibly in combination with the memory 830, possibly in combination with the transceiver 820 (e.g., an antenna and a wireless transmitter and/or a wired transmitter) may comprise means for transmitting the sharing request.

Also or alternatively, implementations of the method 1600 may include one or more of the following features. In an example implementation, the method 1600 includes determining the plurality of UEs of the UE group based on proximity of all of the plurality of UEs of the UE group. For example, the virtual UE management unit 850 uses the proximities of each prospective UE to all other prospective VUE group members (e.g., not just a proximity of a UE to a nearest UE) to determine the members of the VUE. This helps prevent some pairs of UEs being in close proximity to each other, but a pair not being in close proximity to each other but still included in the same VUE (e.g., to help ensure positioning accuracy, viability of one location estimate for every member of the VUE, etc.). The processor 810, possibly in combination with the memory 830, and possibly the transceiver (e.g., an antenna and a wireless receiver and/or wireless transmitter, and/or a wired receiver and/or wired transmitter) may comprise means for determining the plurality of UEs of the UE group. In another example implementation, the method 1600 includes receiving a joining request indicating a prospective UE group member; and determining whether to include the prospective UE group member in the plurality of UEs of the UE group in response to receiving the joining request. For example, the VUE management unit 850 of the positioning entity receives one or more of the VUE requests 1325, 1326, 1341 (from a prospective member and/or a VUE delegate) and determines whether to form a VUE to include the requesting UE(s) or to add the requesting UEs to a VUE. The positioning entity may receive the request from the requester directly or via a delegate for a VUE. The processor 810, possibly in combination with the memory 830, and the transceiver (e.g., an antenna and a wireless receiver and/or a wired receiver) may comprise means for receiving the joining request and the processor 810, possibly in combination with the memory 830, may comprise means for determining whether to include the prospective UE in the UE group. In another example implementation, the method 1600 includes detecting a new sidelink connection to a prospective UE group member; and determining whether to include the prospective UE group member in the plurality of UEs of the UE group in response to detecting the new sidelink connection to the prospective UE group member. For example, one or more of the VUE requests 1325, 1326, 1341 may be an indication of a new SL connection with an existing member of a VUE. As another example, the positioning entity may receive an indication from the server 400 of a new SL connection involving a present member of a VUE and a UE that is not presently a member of the VUE. The VUE management unit 850 may respond to an indication of a new SL connection by determining whether to include (e.g., to invite) the prospective UE in the VUE (e.g., based on proximity of the prospective UE to all members of the VUE, processing capability(ies) of the prospective UE, etc.). The processor 810, possibly in combination with the memory 830, and the transceiver (e.g., an antenna and a wireless receiver and/or a wired receiver) may comprise means for detecting the new sidelink connection and the processor 810, possibly in combination with the memory 830, may comprise means for determining whether to include the prospective UE in the UE group. In another example implementation, the method 1600 comprises transmitting a delegate indication to a selected UE of the plurality of UEs of the UE group indicating for the selected UE to act as a delegate of the UE group by collecting respective position information from one or more UEs of the plurality of UEs of the UE group and transmitting the respective position information to a network entity. For example, the accept/reject message 1327 and/or the VUE request 1332 may include an indication (e.g., a request or an instruction) for the UE 1301 to act as a delegate for the VUE 1305. The indication may include from which UE(s) to obtain position information that the delegate is to send to the server 400, and to which UE(s) the delegate is to provide location information, e.g., a location estimate from the server 400. The VUE management unit 850 may determine these sets of UEs (which may be the same or different), e.g., based on proximity(ies) of the delegate UE and the other UE(s), processing capability(ies), etc. The processor 810, possibly in combination with the memory 830, and the transceiver (e.g., an antenna and a wireless transmitter and/or a wired transmitter) may comprise means for transmitting the delegate indication.

Also or alternatively, implementations of the method 1600 may include one or more of the following features. In an example implementation, the method 1600 includes transmitting a group-change indication indicating a new member of the UE group, removal of a previous member of the UE group, or a combination thereof. For example, the VUE management unit 850 may send one or more of the GC messages 1361-1363 to indicate one or more changes to the VUE 1305, e.g., one or more changes in membership of the VUE 1305. The group ID may be provided with the group-change indication, e.g., to disambiguate between multiple groups (e.g., with one or more members in common). The processor 810, possibly in combination with the memory 830, and the transceiver (e.g., an antenna and a wireless transmitter and/or a wired transmitter) may comprise means for transmitting the group-change indication. In another example implementation, the group-change indication indicates removal of the previous member of the UE group at least one of in response to receiving a request for removal of the previous member of the UE group or in response to loss of sidelink connection between the communication device and the previous member of the UE group. For example, the VUE management unit 850 may determine that a UE is to be removed from a VUE in response to receiving a request for removal, e.g., the VUE membership termination request 1352, and/or in response to determining that SL connection has been lost between the positioning entity 800 and another member of the VUE 1305 with the positioning entity 800 being part of a UE of the VUE 1305.

Figure 17:
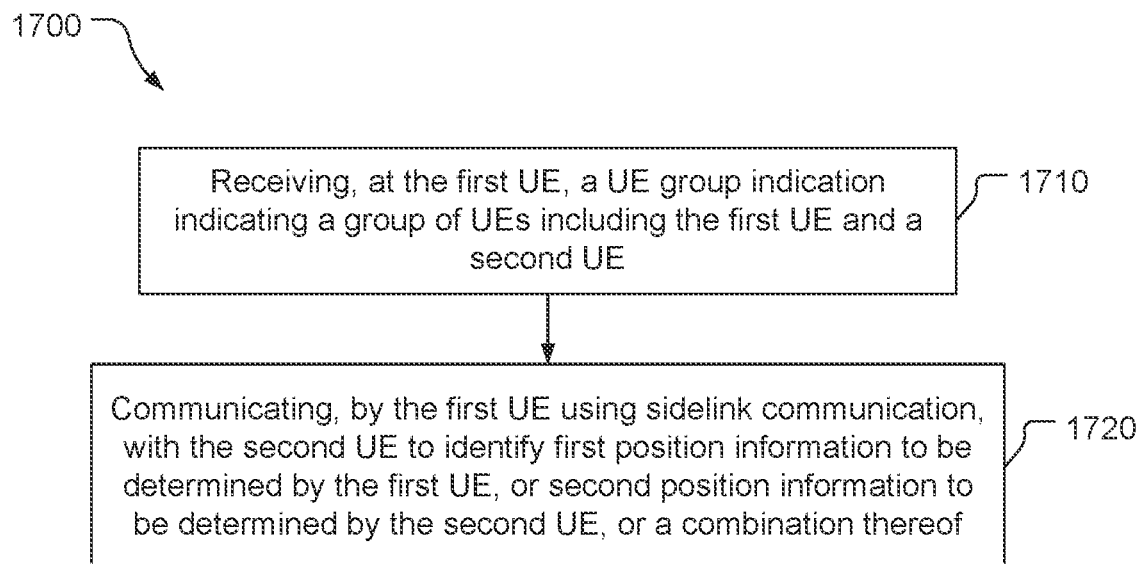
FIG. 17 is a block flow diagram of a method of providing position information.

Referring to FIG. 17, with further reference to FIGS. 1-15, a method 1700 of providing position information from a first UE includes the stages shown. The method 1700 is, however, an example and not limiting. The method 1700 may be altered, e.g., by having stages added, removed, rearranged, combined, performed concurrently, and/or having single stages split into multiple stages.

At stage 1710, the method 1700 includes receiving, at the first UE, a UE group indication indicating a group of UEs including the first UE and a second UE. For example, the UE 1301 receives a VUE-ID at stage 1510, e.g., via the accept/reject message 1327 or the VUE request 1332. As another example, the UE 1302 receives a VUE-ID at stage 1510, e.g., via the accept/reject message 1328 and/or the accept/reject message 1329, or the VUE request 1333 and/or the VUE request 1334. The processor 710 (e.g., the position information sharing unit 770), possibly in combination with the memory 730, in combination with the transceiver 720 (e.g., the antenna 246 and the wireless receiver 244) may comprise means for receiving the UE group indication.

At stage 1720, the method 1700 includes communicating, by the first UE using sidelink communication, with the second UE to identify first position information to be determined by the first UE, or second position information to be determined by the second UE, or a combination thereof. For example, one or more sets of the UEs 1301-1303 may exchange SL communications 1434-1436, 1534-1536 to negotiate position information responsibilities, e.g., based on UE capabilities and/or available UE processing resources. The processor 710 (e.g., the position information sharing unit 770), possibly in combination with the memory 730, in combination with the transceiver 720 (e.g., the wireless transmitter 242, the wireless receiver 244, and the antenna 246) may comprise means for communicating with the second UE to determine first position information to be determined by the first UE and second position information to be determined by the second UE.

Implementations of the method 1700 may include one or more of the following features. In an example implementation, the method 1700 includes: determining the first position information at the first UE; and transmitting the first position information, and a UE group identification in association with the first position information, from the first UE to a network entity. For example, the PRS measurement unit 750 of the UE 1301 measures at least some of the PRS 1441 or the PRS 1541 or the PRS measurement unit 750 of the UE 1302 measures at least some of the PRS 1442 or the PRS 1542. The processor 710 (e.g., the PRS measurement unit 750), possibly in combination with the memory 730, in combination with the transceiver 720 (e.g., the wireless receiver 244, and the antenna 246) may comprise means for determining the first position information. Also, the UE 1301 may transmit at least some of the position information 1464 to the server 400 or at least some of the position information 1561 to the server 400, or the UE 1302 may transmit at least some of the position information 1461 to the UE 1301 (acting as a delegate) or at least some of the position information 1562 to the server 400. The UE(s) 1301, 1302 may transmit a VUE-ID of the VUE 1305 in association with (in the same or different message as) the position information 1461, 1464, 1561, 1562, e.g., to facilitate determination of a location estimate for the VUE 1305 and/or for use in associating a location estimate with the VUE 1305 (and the members thereof). The processor 710 (e.g., the position information sharing unit 770), possibly in combination with the memory 730, in combination with the transceiver 720 (e.g., the wireless transmitter 242 and the antenna 246) may comprise means for transmitting the first position information and the group identification. In another example implementation, the method 1700 includes: determining the first position information at the UE; receiving, at the first UE, a delegate indication that a third UE, separate from the first UE and the second UE, is a delegate of the UE group; and transmitting the first position information, and a UE group identification in association with the first position information, from the first UE to the third UE based on receiving the delegate indication. For example, the first and second UEs may be the UEs 1302, 1303 and the accept/reject message 1342 transmitted to the UE 1303 may include an indication that the UE 1301 is a delegate (for the VUE 1305), and the UE 1303 may transmit the position information 1462 to the UE 1301 based on having received the indication that the UE 1301 is a delegate. The processor 710 (e.g., the position information sharing unit 770), possibly in combination with the memory 730, in combination with the transceiver 720 (e.g., the wireless receiver 244 and the antenna 246) may comprise means for receiving the delegate indication and the processor 710 (e.g., the position information sharing unit 770), possibly in combination with the memory 730, in combination with the transceiver 720 (e.g., the wireless transmitter 242 and the antenna 246) may comprise means for transmitting the first position information and the group identification to the third UE based on receiving the delegate indication.

Also or alternatively, implementations of the method 1700 may include one or more of the following features. In an example implementation, the method 1700 includes: determining the first position information at the first UE; receiving, at the first UE, a delegate indication that the second UE is a delegate of the UE group; and transmitting the first position information from the first UE to the second UE based on receiving the delegate indication. For example, the first and second UEs may be the UEs 1302, 1301, and the accept/reject message 1328 and/or the accept/reject message 1329 indicates that the UE 1301 is a delegate, and the UE 1302 transmits the position information 1461 to the UE 1301 based on having received the indication that the UE 1301 is a delegate. The processor 710 (e.g., the position information sharing unit 770), possibly in combination with the memory 730, in combination with the transceiver 720 (e.g., the wireless receiver 244 and the antenna 246) may comprise means for receiving the delegate indication and the processor 710 (e.g., the position information sharing unit 770), possibly in combination with the memory 730, in combination with the transceiver 720 (e.g., the wireless transmitter 242 and the antenna 246) may comprise means for transmitting the first position information to the second UE based on receiving the delegate indication. In another example implementation, the method 1700 includes: measuring, at the first UE, a PRS resource to determine a first PRS resource measurement; receiving a second PRS resource measurement at the first UE; comparing, at the first UE, the first PRS resource measurement and the second PRS resource measurement; and transmitting the first position information, based on the first PRS resource measurement, from the first UE without transmitting third position information, that is based on the second PRS resource measurement, from the first UE based on the second PRS resource measurement differing unacceptably from the first PRS resource measurement. For example, the PRS measurement unit 750 of the UE 1301 measures at least some of the PRS 1441 or the PRS 1541 or the PRS measurement unit 750 of the UE 1302 measures at least some of the PRS 1442 or the PRS 1542. The processor 710 (e.g., the PRS measurement unit 750), possibly in combination with the memory 730, in combination with the transceiver 720 (e.g., the wireless receiver 244, and the antenna 246) may comprise means for measuring a PRS resource. Also, cross validation may be performed at stage 1450 and/or sub-stage 1463, or stage 1550 and unreliable position information withheld from being transmitted as part of one or more of the position information 1461, 1462, 1464, 1561-1563. A measurement may be deemed unacceptably different if the measurement differs from another similar measurement by more than a threshold and is more likely than the other measurement to be from a non-line-of-sight (NLOS) path, e.g., determined by the unacceptably different measurement being from the PRS resource that arrived at the UE later. The processor 710 (e.g., the position information sharing unit 770), possibly in combination with the memory 730, in combination with the transceiver 720 (e.g., the wireless receiver 244 and the antenna 246) may comprise means for receiving the second PRS resource measurement, the processor 710, possibly in combination with the memory 730, may comprise means for comparing the first and second PRS resource measurements, with the processor 710 (e.g., the position information sharing unit 770), possibly in combination with the memory 730, in combination with the transceiver 720 (e.g., the wireless transmitter 242 and the antenna 246) may comprise means for transmitting the first position information without transmitting the third position information.

Cross Validation

Cross validation of measurements may be used to identify unreliable measurements from measurements made by separate UEs in close proximity. Notification of an unreliable measurement may be provided to a UE that made the unreliable measurement. Unreliable measurements may be discarded and/or not used or transmitted, thus avoiding transmission and/or processing overhead for the unreliable measurements, and avoiding potential negative impact of use of an unreliable measurement on location estimation of a target UE. A UE that identifies a measurement from a neighbor UE as being unreliable may suggest one or more measurements for the neighbor UE to obtain, e.g., may suggest one or more PRS beams for the neighbor UE to measure. For a target UE with high positioning accuracy requirement(s) (e.g., IIOT (Industrial Internet Of Things) requirement(s)), the UE may not use a measurement from a neighbor UE directly, but may use the measurement from the neighbor for cross validation to determine whether a measurement made by the target UE is reliable. Measurements may be shared between neighbor UEs in a unified or UE-generic format (e.g., identifying PRS in a UE-generic format that each UE can map to a UE-specific format as appropriate (e.g., if desired)).

Figure 18:
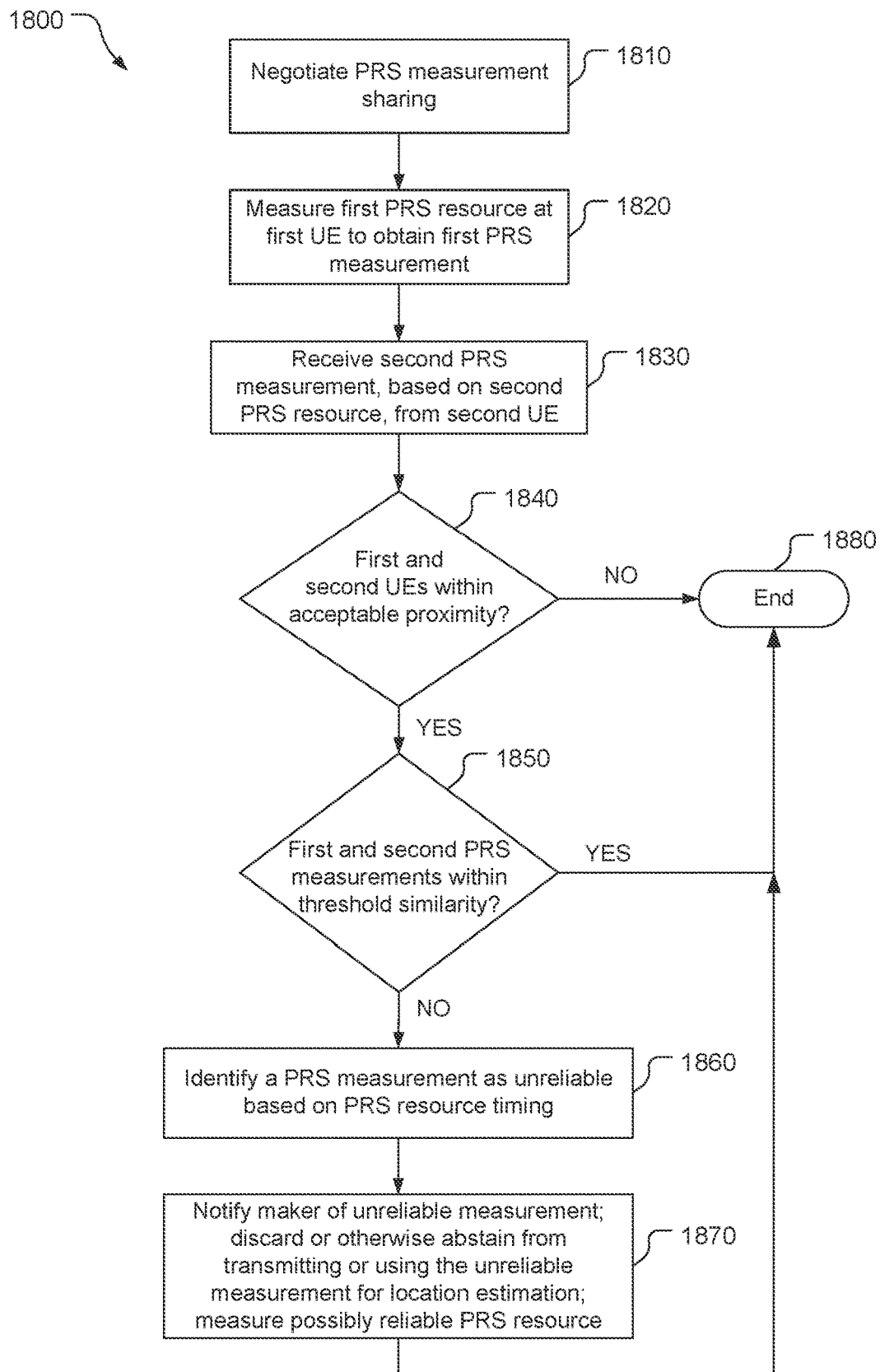
FIG. 18 is a block flow diagram of a method of identifying unreliable PRS (positioning reference signal) measurements.

Referring to FIG. 18, a method 1800 of identifying unreliable PRS measurements includes the stages shown. The method 1800 is, however, an example and not limiting. The method 1800 may be altered, e.g., by having stages added, removed, rearranged, combined, performed concurrently, and/or having single stages split into multiple stages.

Figure 19:
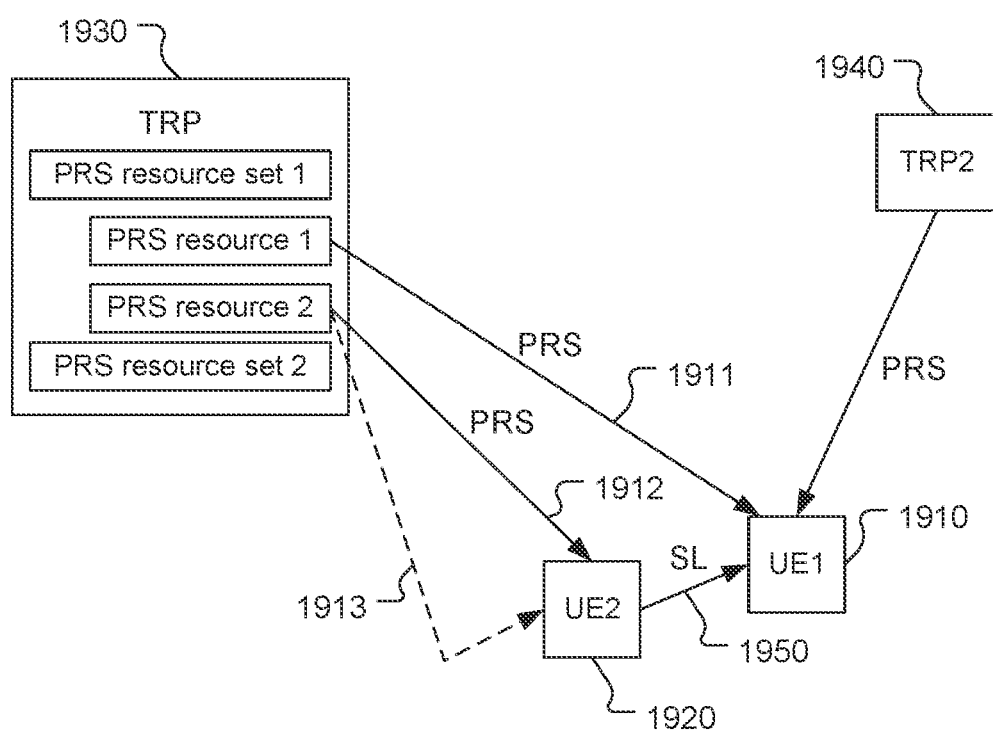
FIG. 19 is a simplified diagram of multiple UEs measuring multiple PRS from multiple transmission/reception points.

At stage 1810, referring also to FIG. 19, two UEs 1910, 1920, labeled UE1 and UE2, negotiate PRS measurement sharing. Each of the UEs 1910, 1920 is an example of the UE 700. In this example, UE1 is a recipient UE that will receive one or more measurements from UE2 which is a donor UE. The position information sharing unit 770 of each of the UEs may communicate regarding processing capabilities and measurement sharing capabilities, and negotiate measurement sharing (for individual-benefit sharing or group-benefit sharing), e.g., to ensure that UE1 will have one or more similar measurements, e.g., PRS resources from the same TRP, or of PRS resources in the same TRP resource set, of the same PRS resource, etc., made by UE1 and received from UE2. The UEs may also negotiate what PRS measurement(s) each UE will make. The negotiation may use UE-generic identifications, e.g., UE-generic PRS-IDs. Measurements made in respect to the same PRS resource or PRS resource set or the same TRP may be cross validated. For example, timing measurements of the same PRS resource from a TRP made by UE1 and UE2 may be cross validated, but a timing measurement of a PRS resource from one TRP, e.g., a TRP 1930, cannot be reliably cross validated with a timing measurement of another PRS resource from another TRP, e.g., a TRP 1940, where the two TRPs 1930, 1940 are not co-sited.

At stage 1820, the recipient UE, UE1 in this example, measures at least one first PRS resource to obtain at least one first PRS measurement. The PRS measurement unit 750 of UE1 measures one or more PRS resources corresponding to the similar PRS measurement(s) negotiated at stage 1810, and may make one or more other measurements (e.g., dissimilar from the measurement(s) to be received from UE2). In the example shown in FIG. 19, UE1 measures PRS resource 1 from the TRP 1930.

At stage 1830, UE1 receives a second PRS measurement, based on measurement of a second PRS resource, from UE2. For purposes of simplicity of discussion, the description of the method 1800, the discussion assumes that only one PRS measurement is shared, but more than one measurement may be made, shared, and cross validated. The recipient UE sends a request to the donor UE for periodic/semi-persistent/aperiodic (P/SP/A) PRS measurement sharing. The donor UE sends the second PRS measurement to the recipient UE. The donor UE may make and/or share the second PRS measurement independent of a sharing request from the recipient UE. For example, as shown in FIG. 19, UE2 measures PRS resource 2 from the TRP 1930 and provides a measurement of PRS resource 2 to UE1 via a sidelink connection 1950.

At stage 1840, an inquiry is made as to whether UE1 and UE2 are within an acceptable proximity of each other for cross validation (e.g., for using a measurement made by UE2 as though the measurement was made by UE1). For example, UE1 may determine whether UE2 is within a threshold distance using one or more of a variety of techniques, e.g., as discussed with respect to stage 930 (e.g., comparing locations, determining RTT, making communication connection(s), detecting signal strength(s), etc.). The inquiry at stage 1840 may be made at a different point in time, e.g., before stage 1810. If the UEs are not within an acceptable proximity for using their measurements for cross validation, then the method 1800 ends at stage 1880 without trying to cross validate the first and second PRS measurements. If the UEs are within an acceptable proximity, then the method 1800 proceeds to stage 1850.

At stage 1850, an inquiry is made as to whether the first PRS measurement and the second PRS measurement are substantially similar. For example, the cross-validation unit 780 of the UE 1910 may determine whether the first and second measurements differ significantly, e.g., by more than a threshold amount. For example, the cross-validation unit 780 may determine whether a magnitude difference between the measurements exceeds a threshold or whether a ratio of the measurements exceeds a threshold. The cross-validation unit 780 may, for example determine whether $$|M1-M2| \le T$$

where M1 is a time measurement of a first PRS resource measured by UE1, M2 is a time measurement of a second PRS resource measured by UE2, and T is a threshold value. The first PRS resource is the same or similar to the second PRS resource, e.g., from the same TRP or from the same PRS resource set (depending on what the measurement is for, and thus whether being from the same PRS resource set or the same TRP is sufficient). If the measurements are within the threshold similarity, then the two measurements may either both be good/reliable (from PRS resources that traveled LOS paths, e.g., paths 1911, 1912 from TRP to UE) or both be bad/unreliable (from PRS resources that traveled NLOS paths from TRP to UE). Either way, the method 1800 ends at stage 1880 and one or more of the measurements may be used or disregarded, or another technique may be used to try to identify whether the measurements are reliable or unreliable. If the measurements differ by more than the threshold similarity, then one of the measurements is an unreliable measurement (e.g., from a PRS resource that traveled an NLOS path such as a path 1913) and the other measurement is a possibly reliable measurement, and the method 1800 proceeds to stage 1860 for identification of the unreliable measurement.

The threshold value used at stage 1850 affects whether measurements are determined to be unreliable or possibly reliable/unreliable and may be based on one or more of a variety of factors. For example, the threshold may be based on a separation distance between the UEs 1910, 1920, measurement uncertainty, and/or measurement resolution. The separation distance may be determined based on one or more factors such as one or more ranging measurements using SL-RTT, estimated RSSI and/or estimated RSRP, transmit power and path loss, time of flight (TOF), and/or one or more sensor (e.g., radar, lidar) measurements. Transmit power and path loss may provide a maximum separation of UEs based on a known maximum distance for receiving a signal sent with a known transmit power. The measurement uncertainty for any particular measurement may be a range of values, or a bound on measurement values, or a level indicator. Different factors may affect the measurement resolution or different measurements. For example, for angle measurements a beamwidth may be considered to determine the threshold, with smaller beamwidth providing finer angle resolution such that the threshold may be smaller. As another example, for a spatial measurement the number of antennas may be considered to determine the threshold, with more antennas typically providing finer spatial resolution such that the threshold may be smaller. As another example, for timing measurements the available bandwidth may be considered, with greater bandwidth typically meaning finer timing resolution (resolution being roughly proportional to the inverse of bandwidth) such that the threshold may be smaller. Combinations of factors may be considered when determining the valued of the similarity threshold, e.g., range and uncertainty combined to determine a threshold time or range of times. The factors and/or the threshold may be provided in assistance data to a UE.

At stage 1860, one of the PRS measurements may be identified as unreliable based on timing of the PRS resources corresponding to the first and second PRS measurements. How the timing is used to determine the unreliable PRS measurement may depend on the kind of PRS measurements involved, e.g., whether the PRS measurements are timing measurements (and what type of timing measurements) or angle measurements.

For timing measurements, times of arrival (and possibly power levels) may be used to identify the unreliable measurement and the possibly reliable measurement. For RTT measurements, the cross-validation unit 780 may identify the PRS measurement corresponding to the PRS resource that arrived earlier as the possibly reliable measurement and the PRS measurement corresponding to the PRS resource that arrived later as the unreliable measurement. The PRS measurements may correspond to the same site (e.g., the same TRP or different, but co-located, TRPs), or the same TRP or the same PRS resource set (for the same TRP), or the same PRS resource (for the same TRP and resource set). For RSTD measurements, the cross-validation unit 780 may identify the PRS measurement corresponding to the smaller RSTD as the possibly reliable measurement and the PRS measurement corresponding to the larger RSTD as the unreliable measurement, with the first and second PRS measurements being determined with reference to the same PRS resource or different PRS resources of the same cell. For the first and second PRS measurements being PDP (power delay profile) measurements, the cross-validation unit 780 may be configured to use a function of RSRPs and corresponding timestamps of each of the first and second PRS measurement to determine a difference between the first and second PRS measurements to identify the unreliable measurement. The cross-validation unit 780 may, for example, determine a norm, or an F-norm (Frobenius norm), or an L1/L2 norm, etc. using the timestamps and RSPRs to define the difference between the first PRS measurement and the second PRS measurement. The cross-validation unit 780 may identify the PDP that contains the earliest timestamp or whose sum of timestamps of the N strongest peaks of the PDP is smaller as the possibly reliable measurement. For the PDP with the later timestamp or larger timestamp sum, the cross-validation unit 780 may identify this PDP as possibly reliable if the norm of difference between the two PDPs is within a threshold and identify this PDP as the unreliable measurement if the norm of the difference exceeds the threshold.

For angle measurements, the cross-validation unit 780 may use times of arrival to identify the unreliable measurement and the possibly reliable measurement. For example, the angle measurement corresponding to the PRS resource that arrived earlier may be identified as the possibly reliable measurement and the angle measurement corresponding to the PRS resource that arrived later identified as the unreliable measurement. Downlink AoD may be measured using RSRPs of PRS resources, with the earlier-arriving PRS resource corresponding to the possibly reliable measurement and the later-arriving PRS resource corresponding to the unreliable measurement. A possibly reliable measurement may be provided by the UE 1910 (e.g., the position information reporting unit 760) using a local coordinate system (LCS) (of the UE 1910) or using a global coordinate system (GCS) (e.g., relative to the Earth). If the reported angle measurement is given in terms of the LCS, then the UE 1910 should also provide the orientation of the UE 1910 along with the reported angle.

The cross-validation unit 780 may attempt to cross validate measurements using power values without timing values. For example, the measurement with the higher RSRP may be identified as the possibly reliable measurement and the measurement with the lower RSRP identified as the unreliable measurement. These identifications may be provided with a caveat, however, as a later-arriving PRS resource may have a higher RSRP than an earlier-arriving PRS resource. As another example, a difference between RSRP values exceeding a threshold may be an indication that channels vary significantly between UEs and that at least one of the measurements may be unreliable.

While the discussion of FIG. 18 assumes only two measurements are under consideration, more than two measurements may be cross validated as long as at least two measurements differ by more than the threshold similarity. With more than two measurements, the measurement corresponding to the earliest-arriving PRS resource may be identified as the possibly reliable measurement and all other measurements identified as being unreliable.

One or more other factors may be analyzed in determining reliability of measurements and thus whether to use and/or report a measurement for positioning. For example, a measurement may be determined to be unreliable if a quality metric of the measurement is below a quality threshold and/or if interference present in the measurement(s) is above an interference threshold.

At stage 1870, the UE 1910, e.g., the cross-validation unit 780, notifies the maker of the unreliable measurement of the unreliability of the measurement and discards or otherwise abstains from using or transmitting the unreliable measurement for determining a location estimate for the UE 1910. For example, if the first PRS measurement (made by the UE 1910) is identified as unreliable, the cross-validation unit 780 may notify the position information reporting unit 760 which may respond to the notification by abstaining from reporting the unreliable measurement for UE-assisted positioning. The processor 710 of the UE 1910 may abstain from using the unreliable measurement for location estimation for UE-based positioning. As another example, the cross-validation unit 780 may notify the position information sharing unit 770 that the first PRS measurement is unreliable in response to which the position information sharing unit 770 may abstain from sharing the unreliable measurement. As another example, if the second PRS measurement (made by the UE 1920) is identified as unreliable, the cross-validation unit 780 may notify the UE 1920 which may respond to the notification by abstaining from measuring the corresponding PRS and/or sharing the unreliable measurement and/or using the unreliable measurement for UE-based positioning and/or reporting the unreliable measurement for UE-assisted positioning. The UE 1910 may abstain from notifying the UE 1920 that the second PRS measurement is unreliable if the UE 1910 shares the first PRS measurement and the UE 1910 is aware that the UE 1920 will cross validate the first and second PRS measurements.

Further at stage 1870, the UE 1910 may perform beam management based on the possible reliability and unreliability of the PRS measurements. This may improve positioning performance and/or reduce PRS beam management overhead. For example, if the first PRS measurement (made by the UE 1910) is unreliable, then the UE 1910 may use one or more recommended PRS beams for future measurement(s) instead of the PRS resource corresponding to the unreliable PRS measurement (e.g., measure PRS resource 2 instead of PRS resource 1 shown in FIG. 19). The recommended PRS beam may be a beam with a strongest RSRP or earliest ToA. For example, if the second PRS measurement is provided from the UE 1920 to the UE 1910 with a detailed PRS-ID (identifying TRP, PRS resource set, and PRS resource) of the second PRS resource, and the first PRS measurement is identified as unreliable and the second PRS measurement as possibly reliable, then the PRS measurement unit 750 of the UE 1910 may measure the second PRS resource going forward (e.g., at least a next PRS session/instance) instead of the first PRS resource. If a detailed PRS-ID was not provided for the second PRS resource, then the position information sharing unit 770 of the UE 1910 may request the detailed PRS-ID from the UE 1920, and then measure the second PRS resource in response to receiving the detailed PRS-ID of the second PRS resource.

Figure 20:
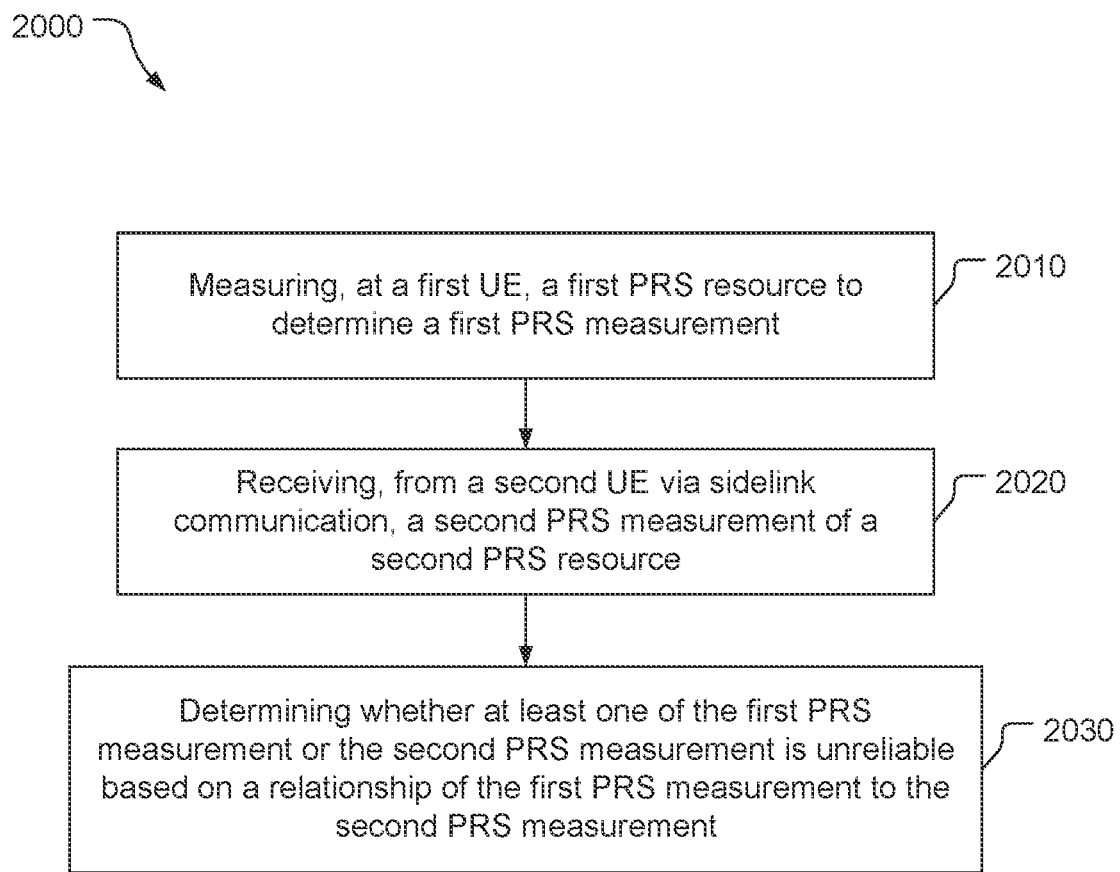
FIG. 20 is a block flow diagram of a method of cross validating a PRS.

Referring to FIG. 20, with further reference to FIGS. 1-19, a method 2000 of cross validating a PRS includes the stages shown. The method 2000 is, however, an example and not limiting. The method 2000 may be altered, e.g., by having stages added, removed, rearranged, combined, performed concurrently, and/or having single stages split into multiple stages.

At stage 2010, the method 2000 includes measuring, at a first UE, a first PRS resource to determine a first PRS measurement. For example, the PRS measurement unit 750 of the UE 1910 measures a PRS resource (e.g., PRS resource 1) to determine a PRS measurement (e.g., ToA, RSRP, etc.). The processor 710, possibly in combination with the memory 730, in combination with the transceiver 720 (e.g., the wireless receiver 244 and the antenna 246) may comprise means for measuring a PRS resource.

At stage 2020, the method 2000 includes receiving, from a second UE via sidelink communication, a second PRS measurement of a second PRS resource. For example, the UE 1910 receives a PRS measurement from the UE 1920 via the sidelink connection 1950. The second PRS measurement may be, for example, of PRS resource 2 as shown in FIG. 19, or of PRS resource 1, or of another PRS resource (from the TRP 1930 or a different TRP (e.g., the TRP 1940) that may or may not be co-located with the TRP 1930). The processor 710, possibly in combination with the memory 730, in combination with the transceiver 720 (e.g., the wireless receiver 244 and the antenna 246) may comprise means for receiving the second PRS measurement.

At stage 2030, the method 2000 includes determining whether at least one of the first PRS measurement or the second PRS measurement is unreliable based on a relationship of the first PRS measurement to the second PRS measurement. For example, the cross-validation unit 780 of the UE 1910 compares the first and second PRS measurements to determine, e.g., as discussed herein, whether at least one of the measurements is unreliable. The processor 710, possibly in combination with the memory 730, in combination with the transceiver 720 (e.g., the wireless receiver 244 and the antenna 246) may comprise means for determining whether at least one of the first PRS measurement or the second PRS measurement is unreliable.

Implementations of the method 2000 may include one or more of the following features. In an example implementation, determining whether at least one of the first PRS measurement or the second PRS measurement is unreliable comprises determining whether at least one of the first PRS measurement or the second PRS measurement is unreliable only if the second UE is within a threshold proximity of the first UE. For example, the UE 1910 may determine at stage 1840 whether the UEs 1910, 1920 are close enough that PRS measurements of the UE 1920 may be used as the PRS measurements for the UE 1910 while providing acceptable positioning accuracy and only determining reliability of at least one of the PRS measurements if the UEs 1910, 1920 are acceptably close to each other.

Also or alternatively, implementations of the method 2000 may include one or more of the following features. In an example implementation, determining whether at least one of the first PRS measurement or the second PRS measurement is unreliable comprises determining that at least one of the first PRS measurement or the second PRS measurement is unreliable based on the first PRS measurement differing from the second PRS measurement by more than a threshold. For example, the cross-validation unit 780 of the UE 1910 may determine whether magnitude difference (e.g., as shown in Equation (1)) of the first and second PRS measurements exceeds a threshold, or whether a ratio of the first and second PRS measurements exceeds a threshold, to determine that at least one of the first and second PRS measurements is unreliable. In another example implementation, the method 2000 includes identifying the first PRS measurement or the second PRS measurement as an unreliable measurement based on timing of the first PRS resource relative to the second PRS resource. For example, the cross-validation unit 780 of the UE 1910 may determine which of the first and second PRS resources arrived at the UEs 1910, 1920, respectively, later (and thus has a ToA PRS measurement that is later) and identify the corresponding PRS measurement as unreliable. As another example, the cross-validation unit 780 of the UE 1910 may determine the unreliable PRS measurement based on a function of time and power of the PRS resources (e.g., a norm, an F-norm, an L1/L2 norm) relative to a threshold. As another example, the cross-validation unit 780 of the UE 1910 may determine the unreliable PRS measurement based on which of the PRS resources does not contain the earliest timestamp of PDPs, or based on which of the PRS resources has a greater sum of timestamps of the N-strongest PDP peaks. The processor 710, possibly in combination with the memory 730, may comprise means for identifying the first PRS measurement or the second PRS measurement as an unreliable measurement. In another example implementation, the method 2000 includes transmitting, to the second UE based on the second PRS measurement being identified as the unreliable measurement, an indication that the second PRS measurement is unreliable. For example, at stage 1870, the cross-validation unit 780 of the UE 1910 may notify the UE 1920 of the unreliable measurement. The processor 710, possibly in combination with the memory 730, in combination with the transceiver 720 (e.g., the wireless transmitter 242 and the antenna 246) may comprise means for transmitting the indication that the second PRS measurement is unreliable. In another example implementation, the method 2000 includes further comprising abstaining from using the unreliable measurement to determine a position estimate for the first UE. For example, at stage 1870 the processor 710 of the UE 1910 may discard the unreliable measurement or otherwise not use the unreliable measurement to determine position information (e.g., a location estimate). The processor 710, possibly in combination with the memory 730, may comprise means for abstaining from using the unreliable measurement to determine a position estimate. In another example implementation, the method 2000 includes abstaining from transmitting the unreliable measurement to a network entity. For example, at stage 1870 the position information sharing unit 770 of the UE 1910 may not transmit the unreliable measurement (e.g., the first PRS measurement) to another UE as shared position information and/or the position information reporting unit 760 may not transmit the unreliable measurement to the server 400 as reported position information. The processor 710, possibly in combination with the memory 730, may comprise means for abstaining from transmitting the unreliable measurement. In another example implementation, the method 2000 includes transmitting, to the second UE, a request for a PRS-ID of the second PRS resource based on the first PRS measurement being identified as the unreliable measurement. For example, at stage 1870 the position information sharing unit 770 of the UE 1910 may request the detailed PRS-ID from the UE 1920 if the first PRS measurement is unreliable and the UE 1920 did not provide PRS-resourcelevel detail of the second PRS resource for the second PRS resource measurement. The processor 710, possibly in combination with the memory 730, in combination with the transceiver 720 (e.g., the wireless transmitter 242 and the antenna 246) may comprise means for transmitting the request for a PRS-ID. In another example implementation, the method 2000 includes measuring a next instance of the second PRS resource based on the first PRS measurement being identified as the unreliable measurement. For example, the PRS measurement unit 750 of the UE 1910 may measure at least the next instance of the second PRS resource (e.g., instead of or in addition to measuring the first PRS resource) in response to the first PRS measurement being determined to be unreliable, e.g., to conserve processing power. The processor 710, possibly in combination with the memory 730, in combination with the transceiver 720 (e.g., the wireless receiver 244 and the antenna 246) may comprise means for measuring a next instance of the second PRS resource. In another example implementation, the method 2000 includes determining the threshold based on a distance between the first UE and the second UE, or a measurement uncertainty, or a measurement resolution, or any combination thereof. The processor 710, possibly in combination with the memory 730, possibly in combination with the transceiver 720 (e.g., the wireless receiver 244 and the antenna 246) may comprise means for determining the threshold. The transceiver 720 may be used to obtain information for use in determining the threshold.

IMPLEMENTATION EXAMPLES

First Implementation Examples

Implementation examples are provided in the following numbered clauses.
  1. A first UE (user equipment) comprising:
  a transceiver;
  a memory; and
  a processor, communicatively coupled to the transceiver and the memory, configured to:
    communicate, via the transceiver, with a second UE to identify a first PRS measurement (positioning reference signal measurement) to be made by the second UE;
    receive, via the transceiver from the second UE via sidelink communication, first position information based on the first PRS measurement; and
    transmit, via the transceiver to a network entity, the first position information.
  2. The first UE of clause 1, wherein the processor is further configured to determine a proximity of the second UE to the first UE and to transmit the first position information to the network entity based on the proximity of the second UE to the first UE being acceptably close.
  3. The first UE of clause 1, wherein the processor is further configured to:
  identify a plurality of candidate UEs within an acceptable proximity of the first UE; and
  select, to serve as a position information donor, the second UE from the plurality of candidate UEs based on processing capabilities of the plurality of candidate UEs.
  4. The first UE of clause 1, wherein the processor is further configured to:
  identify a plurality of candidate UEs within an acceptable proximity of the first UE; and
  select, to serve as a position information donor, the second UE from the plurality of candidate UEs based on overlaps of a first PRS configuration associated with the first UE and second PRS configurations each associated with a respective one of the plurality of candidate UEs.
  5. The first UE of clause 1, wherein the processor is further configured to:
  identify a plurality of candidate UEs within an acceptable proximity of the first UE; and
  select, to serve as a position information donor, the second UE from the plurality of candidate UEs based on the second UE being closest, of the plurality of candidate UEs, to the first UE.
  6. The first UE of clause 1, wherein the processor is further configured to transmit a request to the second UE for the second UE to transmit the first position information with a requested periodicity of one of periodically, semi-persistently, or aperiodically.
  7. The first UE of clause 6, wherein the requested periodicity is based on a reporting periodicity of the first UE for the first position information.
  8. The first UE of clause 1, wherein the processor is further configured to indicate to the second UE, for the first PRS measurement, a transmission/reception point (TRP), or the TRP and a PRS resource set, or the TRP and the PRS resource set and a PRS resource, or a UE-ID (UE identity), or the UE-ID and a sidelink-PRS resource related ID.
  9. The first UE of clause 1, wherein the processor is further configured to validate the first PRS measurement indicated in the first position information by comparing the first PRS measurement with a similar measurement made by a device other than the second UE.
  10. The first UE of clause 1, wherein the processor is further configured to:
  measure a PRS resource to determine a second PRS measurement; and
  transmit, via the transceiver to the network entity, second position information based on the second PRS measurement.
  11. The first UE of clause 1, wherein the processor is further configured to transmit the first position information to the network entity with a group indication indicative of a group including the first UE and the second UE.
  12. A position information reporting method comprising:
  communicating by a first UE (user equipment) with a second UE to identify a first PRS measurement (positioning reference signal measurement) to be made by the second;
  receiving, by the first UE from the second UE via sidelink communication, first position information based on the first PRS measurement; and
  transmitting, from the first UE to a network entity, the first position information.
  13. The method of clause 12, further comprising determining a proximity of the second UE to the first UE, wherein transmitting the first position information to the network entity comprises transmitting the first position information to the network entity based on the proximity of the second UE to the first UE being acceptably close.
  14. The method of clause 12, further comprising:
  identifying a plurality of candidate UEs within an acceptable proximity of the first UE; and selecting, to serve as a position information donor, the second UE from the plurality of candidate UEs based on processing capabilities of the plurality of candidate UEs.

15. The method of clause 12, further comprising:
identifying a plurality of candidate UEs within an acceptable proximity of the first UE; and
selecting, to serve as a position information donor, the second UE from the plurality of candidate UEs based on overlaps of a first PRS configuration associated with the first UE and second PRS configurations each associated with a respective one of the plurality of candidate UEs.

16. The method of clause 12, further comprising:
identifying a plurality of candidate UEs within an acceptable proximity of the first UE; and
selecting, to serve as a position information donor, the second UE from the plurality of candidate UEs based on the second UE being closest, of the plurality of candidate UEs, to the first UE.

17. The method of clause 12, further comprising transmitting a request to the second UE for the second UE to transmit the first position information with a requested periodicity of one of periodically, semi-persistently, or aperiodically.

18. The method of clause 17, wherein the requested periodicity is based on a reporting periodicity of the first UE for the first position information.

19. The method of clause 12, further comprising indicating, by the first UE to the second UE, for the first PRS measurement, a transmission/reception point (TRP), or the TRP and a PRS resource set, or the TRP and the PRS resource set and a PRS resource, or a UE-ID (UE identity), or the UE-ID and a sidelink-PRS resource related ID.

20. The method of clause 12, further comprising validating the first PRS measurement indicated in the first position information by comparing the first PRS measurement with a similar measurement made by a device other than the second UE.

21. The method of clause 12, further comprising:
measuring, by the first UE, a PRS resource to determine a second PRS measurement; and
transmitting, from the first UE to the network entity, second position information based on the second PRS measurement.

22. The method of clause 12, further comprising transmitting the first position information to the network entity with a group indication indicative of a group including the first UE and the second UE.

23. A first UE (user equipment) comprising:
means for communicating with a second UE to identify a first PRS measurement (positioning reference signal measurement) to be made by the second UE;
means for receiving, from the second UE via sidelink communication, first position information based on the first PRS measurement; and
means for transmitting, to a network entity, the first position information.

24. The first UE of clause 23, further comprising means for determining a proximity of the second UE to the first UE, wherein the means for transmitting the first position information to the network entity comprise means for transmitting the first position information to the network entity based on the proximity of the second UE to the first UE being acceptably close.

25. The first UE of clause 23, further comprising:
means for identifying a plurality of candidate UEs within an acceptable proximity of the first UE; and
means for selecting, to serve as a position information donor, the second UE from the plurality of candidate UEs based on processing capabilities of the plurality of candidate UEs.

26. The first UE of clause 23, further comprising:
means for identifying a plurality of candidate UEs within an acceptable proximity of the first UE; and
means for selecting, to serve as a position information donor, the second UE from the plurality of candidate UEs based on overlaps of a first PRS configuration associated with the first UE and second PRS configurations each associated with a respective one of the plurality of candidate UEs.

27. The first UE of clause 23, further comprising:
means for identifying a plurality of candidate UEs within an acceptable proximity of the first UE; and
means for selecting, to serve as a position information donor, the second UE from the plurality of candidate UEs based on the second UE being closest, of the plurality of candidate UEs, to the first UE.

28. The first UE of clause 21, further comprising means for transmitting a request to the second UE for the second UE to transmit the first position information with a requested periodicity of one of periodically, semi-persistently, or aperiodically.

29. The first UE of clause 27, wherein the requested periodicity is based on a reporting periodicity of the first UE for the first position information.

30. The first UE of clause 23, further comprising means for indicating to the second UE, for the first PRS measurement, a transmission/reception point (TRP), or the TRP and a PRS resource set, or the TRP and the PRS resource set and a PRS resource, or a UE-ID (UE identity), or the UE-ID and a sidelink-PRS resource related ID.

31. The first UE of clause 23, further comprising means for validating the first PRS measurement indicated in the first position information by comparing the first PRS measurement with a similar measurement made by a device other than the second UE.

32. The first UE of clause 23, further comprising:
means for measuring a PRS resource to determine a second PRS measurement; and
means for transmitting, to the network entity, second position information based on the second PRS measurement.

33. The first UE of clause 23, further comprising means for transmitting the first position information to the network entity with a group indication indicative of a group including the first UE and the second UE.

34. A non-transitory, processor-readable storage medium comprising processor-readable instructions to cause a processor of a first UE (user equipment) to:
communicate with a second UE to identify a first PRS measurement (positioning reference signal measurement) to be made by the second UE;
receive, from the second UE via sidelink communication, first position information based on the first PRS measurement; and
transmit, to a network entity, the first position information.

35. The storage medium of clause 34, further comprising processor-readable instructions to cause the processor to determine a proximity of the second UE to the first UE, wherein the processor-readable instructions to cause the processor to transmit the first position information to the network entity comprise processor-readable instructions to cause the processor to transmit the first position information to the network entity based on the proximity of the second UE to the first UE being acceptably close.

36. The storage medium of clause 34, further comprising processor-readable instructions to cause the processor to:
identify a plurality of candidate UEs within an acceptable proximity of the first UE; and
select, to serve as a position information donor, the second UE from the plurality of candidate UEs based on processing capabilities of the plurality of candidate UEs.

37. The storage medium of clause 34, further comprising processor-readable instructions to cause the processor to:
identify a plurality of candidate UEs within an acceptable proximity of the first UE; and
select, to serve as a position information donor, the second UE from the plurality of candidate UEs based on overlaps of a first PRS configuration associated with the first UE and second PRS configurations each associated with a respective one of the plurality of candidate UEs.

38. The storage medium of clause 34, further comprising processor-readable instructions to cause the processor to:
identify a plurality of candidate UEs within an acceptable proximity of the first UE; and
select, to serve as a position information donor, the second UE from the plurality of candidate UEs based on the second UE being closest, of the plurality of candidate UEs, to the first UE.

39. The storage medium of clause 34, further comprising processor-readable instructions to cause the processor to transmit a request to the second UE for the second UE to transmit the first position information with a requested periodicity of one of periodically, semi-persistently, or aperiodically.

40. The storage medium of clause 39, wherein the requested periodicity is based on a reporting periodicity of the first UE for the first position information.

41. The storage medium of clause 34, further comprising processor-readable instructions to cause the processor to indicate to the second UE, for the first PRS measurement, a transmission/reception point (TRP), or the TRP and a PRS resource set, or the TRP and the PRS resource set and a PRS resource, or a UE-ID (UE identity), or the UE-ID and a sidelink-PRS resource related ID.

42. The storage medium of clause 34, further comprising processor-readable instructions to cause the processor to validate the first PRS measurement indicated in the first position information by comparing the first PRS measurement with a similar measurement made by a device other than the second UE.

43. The storage medium of clause 34, further comprising processor-readable instructions to cause the processor to:
measure a PRS resource to determine a second PRS measurement; and
transmit, to the network entity, second position information based on the second PRS measurement.

44. The storage medium of clause 34, further comprising processor-readable instructions to cause the processor to transmit the first position information to the network entity with a group indication indicative of a group including the first UE and the second UE.

45. A first UE (user equipment) comprising:
a transceiver;
a memory; and
a processor, communicatively coupled to the transceiver and the memory, configured to:
transmit, via the transceiver, a position-information-sharing capability of the first UE to a second UE via sidelink communication;
receive, via the transceiver from the second UE via sidelink communication, a request for first position information;
measure a PRS resource (positioning reference signal resource) received from a network entity to determine a PRS measurement; and
transmit, via the transceiver to the second UE via sidelink communication, the first position information based on the PRS measurement.

46. The first UE of clause 45, wherein the processor is configured to transmit the first position information only if the processor measures the PRS resource independently of the request for the first position information.

47. The first UE of clause 45, wherein the processor is configured to measure the PRS resource in response to receiving the request such that the PRS measurement is an extra measurement in addition to one or more other PRS measurements that the processor would make absent receipt of the request.

48. The first UE of clause 45, wherein the PRS resource is a first PRS resource and the PRS measurement is a first PRS measurement, and wherein the processor is further configured to:
measure a second PRS resource to determine a second PRS measurement; and
abstain from transmitting the second PRS measurement to the second UE.

49. The first UE of clause 48, wherein the processor is further configured to abstain from transmitting the second PRS measurement to the second UE based on the first PRS measurement being an earlier time of arrival than the second PRS measurement.

50. The first UE of clause 48, wherein the processor is further configured to abstain from transmitting the second PRS measurement to the second UE based on the first PRS resource being received with stronger power than the second PRS resource.

51. The first UE of clause 48, wherein the processor is further configured to abstain from transmitting the second PRS measurement to the second UE based on both the first PRS resource and the second PRS resource being at least one of associated with a single transmission/reception point, or associated with a single PRS resource set, or associated with a single PRS source site.

52. A position information sharing method comprising:
transmitting, from a first UE (user equipment) to a second UE via sidelink communication, a position-information-sharing capability of the first UE;
receiving, at the first UE from the second UE via sidelink communication, a request for first position information;
measuring, at the first UE, a PRS resource (positioning reference signal resource) received from a network entity to determine a PRS measurement; and transmitting, from the first UE to the second UE via sidelink communication, the first position information based on the PRS measurement.

53. The method of clause 52, wherein transmitting the first position information comprises transmitting the first position information only if the first UE measures the PRS resource independently of the request for the first position information.

54. The method of clause 52, wherein measuring the PRS resource comprises measuring the PRS resource in response to receiving the request such that the PRS measurement is an extra measurement in addition to one or more other PRS measurements that the first UE would make absent receipt of the request.

55. The method of clause 52, wherein the PRS resource is a first PRS resource and the PRS measurement is a first PRS measurement, and the method further comprises:

measuring, by the first UE, a second PRS resource to determine a second PRS measurement; and abstaining from transmitting the second PRS measurement from the first UE to the second UE.

56. The method of clause 55, wherein the first UE abstains from transmitting the second PRS measurement to the second UE based on the first PRS measurement being an earlier time of arrival than the second PRS measurement.

57. The method of clause 55, wherein the first UE abstains from transmitting the second PRS measurement to the second UE based on the first PRS resource being received with stronger power than the second PRS resource.

58. The method of clause 55, wherein the first UE abstains from transmitting the second PRS measurement to the second UE based on both the first PRS resource and the second PRS resource being at least one of associated with a single transmission/reception point, or associated with a single PRS resource set, or associated with a single PRS source site.

59. A first UE (user equipment) comprising:

means for transmitting, to a second UE via sidelink communication, a position-information-sharing capability of the first UE;

means for receiving, from the second UE via sidelink communication, a request for first position information;

means for measuring a PRS resource (positioning reference signal resource) received from a network entity to determine a PRS measurement; and means for transmitting, to the second UE via sidelink communication, the first position information based on the PRS measurement.

60. The first UE of clause 59, wherein the means for transmitting the first position information comprise means for transmitting the first position information only if the first UE measures the PRS resource independently of the request for the first position information.

61. The first UE of clause 59, wherein the means for measuring the PRS resource comprise means for measuring the PRS resource in response to receiving the request such that the PRS measurement is an extra measurement in addition to one or more other PRS measurements that the first UE would make absent receipt of the request.

62. The first UE of clause 59, wherein the PRS resource is a first PRS resource and the PRS measurement is a first PRS measurement, and the first UE further comprises:

means for measuring, by the first UE, a second PRS resource to determine a second PRS measurement; and means for abstaining from transmitting the second PRS measurement from the first UE to the second UE.

63. The first UE of clause 62, wherein the means for abstaining from transmitting the second PRS measurement comprise means for abstaining from transmitting the second PRS measurement to the second UE based on the first PRS measurement being an earlier time of arrival than the second PRS measurement.

64. The first UE of clause 62, wherein the means for abstaining from transmitting the second PRS measurement comprise means for abstaining from transmitting the second PRS measurement to the second UE based on the first PRS resource being received with stronger power than the second PRS resource.

65. The first UE of clause 62, wherein the means for abstaining from transmitting the second PRS measurement comprise means for abstaining from transmitting the second PRS measurement to the second UE based on both the first PRS resource and the second PRS resource being at least one of associated with a single transmission/reception point, or associated with a single PRS resource set, or associated with a single PRS source site.

66. A non-transitory, processor-readable storage medium comprising processor-readable instructions to cause a processor of a first UE (user equipment) to:

transmit, to a second UE via sidelink communication, a position-information-sharing capability of the first UE;

receive, from the second UE via sidelink communication, a request for first position information;

measure a PRS resource (positioning reference signal resource) received from a network entity to determine a PRS measurement; and transmit, to the second UE via sidelink communication, the first position information based on the PRS measurement.

67. The storage medium of clause 66, wherein the processor-readable storage medium comprising processor-readable instructions to cause the processor to transmit the first position information comprise processor-readable storage medium comprising processor-readable instructions to cause the processor to transmit the first position information only if the first UE measures the PRS resource independently of the request for the first position information.

68. The storage medium of clause 66, wherein the processor-readable storage medium comprising processor-readable instructions to cause the processor to measure the PRS resource comprise processor-readable storage medium comprising processor-readable instructions to cause the processor to measure the PRS resource in response to receiving the request such that the PRS measurement is an extra measurement in addition to one or more other PRS measurements that the first UE would make absent receipt of the request.

69. The storage medium of clause 66, wherein the PRS resource is a first PRS resource and the PRS measurement is a first PRS measurement, and the storage medium further comprises processor-readable storage medium comprising processor-readable instructions to cause the processor to:

measure a second PRS resource to determine a second PRS measurement; and abstain from transmitting the second PRS measurement from the first UE to the second UE.

70. The storage medium of clause 69, wherein the processor-readable storage medium comprising processor-readable instructions to cause the processor to abstain from transmitting the second PRS measurement comprise processor-readable storage medium comprising processor-readable instructions to cause the processor to abstain from transmitting the second PRS measurement to the second UE based on the first PRS measurement being an earlier time of arrival than the second PRS measurement.

71. The storage medium of clause 69, wherein the processor-readable storage medium comprising processor-readable instructions to cause the processor to abstain from transmitting the second PRS measurement comprise processor-readable storage medium comprising processor-readable instructions to cause the processor to abstain from transmitting the second PRS measurement to the second UE based on the first PRS resource being received with stronger power than the second PRS resource.

72. The storage medium of clause 69, wherein the processor-readable storage medium comprising processor-readable instructions to cause the processor to abstain from transmitting the second PRS measurement comprise processor-readable storage medium comprising processor-readable instructions to cause the processor to abstain from transmitting the second PRS measurement to the second UE based on both the first PRS resource and the second PRS resource being at least one of associated with a single transmission/reception point, or associated with a single PRS resource set, or associated with a single PRS source site.

Second Implementation Examples

Further implementation examples are provided in the following numbered clauses.

1. A communication device for managing a UE group (user equipment group), the communication device comprising:
   a transceiver;
   a memory; and
   a processor, communicatively coupled to the transceiver and the memory, configured to:
   determine a plurality of UEs of the UE group based on proximity of each of the plurality of UEs to at least one other UE of the plurality of UEs; and
   transmit, via the transceiver to at least one of the plurality of UEs of the UE group, an indication of the UE group.
2. The communication device of clause 1, wherein the indication of the UE group includes a group identification.
3. The communication device of clause 1, wherein the processor is further configured to transmit, via the transceiver, a positioning request to a selected UE of the plurality of UEs of the UE group for the selected UE to provide requested position information.
4. The communication device of clause 3, wherein the processor is further configured to transmit, via the transceiver, a sharing request to the selected UE of the plurality of UEs of the UE group for the selected UE to share the requested position information with a designated UE of the plurality of UEs of the UE group.
5. The communication device of clause 1, wherein the processor is configured to determine the plurality of UEs of the UE group based on proximity of all of the plurality of UEs of the UE group.
6. The communication device of clause 1, wherein the processor is further configured to:
   receive a joining request via the transceiver indicating a prospective UE group member; and
   determine whether to include the prospective UE group member in the plurality of UEs of the UE group in response to receiving the joining request.
7. The communication device of clause 1, wherein the processor is further configured to:
   detect a new sidelink connection to a prospective UE group member; and
   determine whether to include the prospective UE group member in the plurality of UEs of the UE group in response to detecting the new sidelink connection to the prospective UE group member.
8. The communication device of clause 1, wherein the processor is further configured to transmit a delegate indication to a selected UE of the plurality of UEs of the UE group indicating for the selected UE to act as a delegate of the UE group by collecting respective position information from one or more UEs of the plurality of UEs of the UE group and transmitting the respective position information to a network entity.
9. The communication device of clause 1, wherein the processor is further configured to transmit, via the transceiver, a group-change indication indicating a new member of the UE group, removal of a previous member of the UE group, or a combination thereof.
10. The communication device of clause 9, wherein the processor is configured to transmit the group-change indication indicating removal of the previous member of the UE group at least one of in response to receiving a request for removal of the previous member of the UE group or in response to loss of sidelink connection between the communication device and the previous member of the UE group.
11. A communication device for managing a UE group (user equipment group), the communication device comprising:
    means for determining a plurality of UEs of the UE group based on proximity of each of the plurality of UEs to at least one other UE of the plurality of UEs; and
    means for transmitting, to at least one of the plurality of UEs of the UE group, an indication of the UE group.
12. The communication device of clause 11, wherein the indication of the UE group includes a group identification.
13. The communication device of clause 11, further comprising means for transmitting a positioning request to a selected UE of the plurality of UEs of the UE group for the selected UE to provide requested position information.
14. The communication device of clause 13, further comprising means for transmitting a sharing request to the selected UE of the plurality of UEs of the UE group for the selected UE to share the requested position information with a designated UE of the plurality of UEs of the UE group.
15. The communication device of clause 11, further comprising means for determining the plurality of UEs of the UE group based on proximity of all of the plurality of UEs of the UE group.

16. The communication device of clause 11, further comprising:
means for receiving a joining request indicating a prospective UE group member; and
means for determining whether to include the prospective UE group member in the plurality of UEs of the UE group in response to receiving the joining request.

17. The communication device of clause 11, further comprising:
means for detecting a new sidelink connection to a prospective UE group member; and
means for determining whether to include the prospective UE group member in the plurality of UEs of the UE group in response to detecting the new sidelink connection to the prospective UE group member.

18. The communication device of clause 11, further comprising means for transmitting a delegate indication to a selected UE of the plurality of UEs of the UE group indicating for the selected UE to act as a delegate of the UE group by collecting respective position information from one or more UEs of the plurality of UEs of the UE group and transmitting the respective position information to a network entity.

19. The communication device of clause 11, further comprising means for transmitting a group-change indication indicating a new member of the UE group, removal of a previous member of the UE group, or a combination thereof.

20. The communication device of clause 19, wherein the means for transmitting the group-change indication comprise means for transmitting the group-change indication indicating removal of the previous member of the UE group at least one of in response to receiving a request for removal of the previous member of the UE group or in response to loss of sidelink connection between the communication device and the previous member of the UE group.

21. A method of managing a UE group (user equipment group), the method comprising:
determining a plurality of UEs of the UE group based on proximity of each of the plurality of UEs to at least one other UE of the plurality of UEs; and
transmitting, from a communication device, to at least one of the plurality of UEs of the UE group, an indication of the UE group.

22. The method of clause 21, wherein the indication of the UE group includes a group identification.

23. The method of clause 21, further comprising transmitting a positioning request to a selected UE of the plurality of UEs of the UE group for the selected UE to provide requested position information.

24. The method of clause 23, further comprising transmitting a sharing request to the selected UE of the plurality of UEs of the UE group for the selected UE to share the requested position information with a designated UE of the plurality of UEs of the UE group.

25. The method of clause 21, further comprising determining the plurality of UEs of the UE group based on proximity of all of the plurality of UEs of the UE group.

26. The method of clause 21, further comprising:
receiving a joining request indicating a prospective UE group member; and
determining whether to include the prospective UE group member in the plurality of UEs of the UE group in response to receiving the joining request.

27. The method of clause 21, further comprising:
detecting a new sidelink connection to a prospective UE group member; and
determining whether to include the prospective UE group member in the plurality of UEs of the UE group in response to detecting the new sidelink connection to the prospective UE group member.

28. The method of clause 21, further comprising transmitting a delegate indication to a selected UE of the plurality of UEs of the UE group indicating for the selected UE to act as a delegate of the UE group by collecting respective position information from one or more UEs of the plurality of UEs of the UE group and transmitting the respective position information to a network entity.

29. The method of clause 21, further comprising transmitting a group-change indication indicating a new member of the UE group, removal of a previous member of the UE group, or a combination thereof.

30. The method of clause 29, wherein the group-change indication indicates removal of the previous member of the UE group at least one of in response to receiving a request for removal of the previous member of the UE group or in response to loss of sidelink connection between the communication device and the previous member of the UE group.

31. A non-transitory, processor-readable storage medium comprising processor-readable instructions to cause a processor of a communication device, in order to manage a UE group (user equipment group), to:
determine a plurality of UEs of the UE group based on proximity of each of the plurality of UEs to at least one other UE of the plurality of UEs; and
transmit, to at least one of the plurality of UEs of the UE group, an indication of the UE group.

32. The storage medium of clause 31, wherein the indication of the UE group includes a group identification.

33. The storage medium of clause 31, further comprising processor-readable instructions to cause the processor to transmit a positioning request to a selected UE of the plurality of UEs of the UE group for the selected UE to provide requested position information.

34. The storage medium of clause 33, further comprising processor-readable instructions to cause the processor to transmit a sharing request to the selected UE of the plurality of UEs of the UE group for the selected UE to share the requested position information with a designated UE of the plurality of UEs of the UE group.

35. The storage medium of clause 31, further comprising processor-readable instructions to cause the processor to determine the plurality of UEs of the UE group based on proximity of all of the plurality of UEs of the UE group.

36. The storage medium of clause 31, further comprising processor-readable instructions to cause the processor to:
receive a joining request indicating a prospective UE group member; and
determine whether to include the prospective UE group member in the plurality of UEs of the UE group in response to receiving the joining request.

37. The storage medium of clause 31, further comprising processor-readable instructions to cause the processor to:
detect a new sidelink connection to a prospective UE group member; and
determine whether to include the prospective UE group member in the plurality of UEs of the UE group in response to detecting the new sidelink connection to the prospective UE group member.

38. The storage medium of clause 31, further comprising processor-readable instructions to cause the processor to transmit a delegate indication to a selected UE of the plurality of UEs of the UE group indicating for the selected UE to act as a delegate of the UE group by collecting respective position information from one or more UEs of the plurality of UEs of the UE group and transmitting the respective position information to a network entity.

39. The storage medium of clause 31, further comprising processor-readable instructions to cause the processor to transmit a group-change indication indicating a new member of the UE group, removal of a previous member of the UE group, or a combination thereof.

40. The storage medium of clause 39, wherein the processor-readable instructions to cause the processor to transmit the group-change indication comprise processor-readable instructions to cause the processor to transmit the group-change indication indicating removal of the previous member of the UE group at least one of in response to receiving a request for removal of the previous member of the UE group or in response to loss of sidelink connection between the communication device and the previous member of the UE group.

41. A first UE (user equipment) comprising:
a transceiver;
a memory; and
a processor, communicatively coupled to the transceiver and the memory, configured to:
    receive, via the transceiver, a UE group indication indicating a group of UEs including the first UE and a second UE; and
    communicate, via the transceiver using sidelink communication, with the second UE to identify first position information to be determined by the first UE, or second position information to be determined by the second UE, or a combination thereof.

42. The first UE of clause 41, wherein the processor is further configured to:
determine the first position information; and
transmit the first position information, and a UE group identification in association with the first position information, to a network entity.

43. The first UE of clause 41, wherein the processor is further configured to:
determine the first position information;
receive a delegate indication that a third UE, separate from the first UE and the second UE, is a delegate of the group of UEs; and
transmit the first position information, and a UE group identification in association with the first position information, to the third UE based on receiving the delegate indication.

44. The first UE of clause 41, wherein the processor is further configured to:
determine the first position information;
receive a delegate indication that the second UE is a delegate of the group of UEs; and
transmit the first position information to the second UE based on receiving the delegate indication.

45. The first UE of clause 41, wherein the processor is further configured to:
measure a PRS resource (positioning reference signal resource) to determine a first PRS resource measurement;
receive a second PRS resource measurement;
compare the first PRS resource measurement and the second PRS resource measurement; and
transmit the first position information, based on the first PRS resource measurement, without transmitting third position information, that is based on the second PRS resource measurement, based on the second PRS resource measurement differing unacceptably from the first PRS resource measurement.

46. A first UE (user equipment) comprising:
means for receiving a UE group indication indicating a group of UEs including the first UE and a second UE; and
means for communicating, using sidelink communication, with the second UE to identify first position information to be determined by the first UE, or second position information to be determined by the second UE, or a combination thereof.

47. The first UE of clause 46, further comprising:
means for determining the first position information; and
means for transmitting the first position information, and a UE group identification in association with the first position information, to a network entity.

48. The first UE of clause 46, further comprising:
means for determining the first position information;
means for receiving a delegate indication that a third UE, separate from the first UE and the second UE, is a delegate of the group of UEs; and
means for transmitting the first position information, and a UE group identification in association with the first position information, to the third UE based on receiving the delegate indication.

49. The first UE of clause 46, further comprising:
means for determining the first position information;
means for receiving a delegate indication that the second UE is a delegate of the group of UEs; and
means for transmitting the first position information to the second UE based on receiving the delegate indication.

50. The first UE of clause 46, further comprising:
means for measuring a PRS resource (positioning reference signal resource) to determine a first PRS resource measurement;
means for receiving a second PRS resource measurement;
means for comparing the first PRS resource measurement and the second PRS resource measurement; and
means for transmitting the first position information, based on the first PRS resource measurement, without transmitting third position information, that is based on the second PRS resource measurement, based on the second PRS resource measurement differing unacceptably from the first PRS resource measurement.

51. A method of providing position information from a first UE (user equipment), the method comprising:
receiving, at the first UE, a UE group indication indicating a group of UEs including the first UE and a second UE; and
communicating, by the first UE using sidelink communication, with the second UE to identify first position information to be determined by the first UE, or second position information to be determined by the second UE, or a combination thereof.

52. The method of clause 51, further comprising:
determining the first position information at the first UE; and transmitting the first position information, and a UE group identification in association with the first position information, from the first UE to a network entity.

53. The method of clause 51, further comprising:
determining the first position information at the first UE;
receiving, at the first UE, a delegate indication that a third UE, separate from the first UE and the second UE, is a delegate of the group of UEs; and
transmitting the first position information, and a UE group identification in association with the first position information, from the first UE to the third UE based on receiving the delegate indication.

54. The method of clause 51, further comprising:
determining the first position information at the first UE:
receiving, at the first UE, a delegate indication that the second UE is a delegate of the group of UEs; and
transmitting the first position information from the first UE to the second UE based on receiving the delegate indication.

55. The method of clause 51, further comprising:
measuring, at the first UE, a PRS resource (positioning reference signal resource) to determine a first PRS resource measurement;
receiving a second PRS resource measurement at the first UE;
comparing, at the first UE, the first PRS resource measurement and the second PRS resource measurement; and
transmitting the first position information, based on the first PRS resource measurement, from the first UE without transmitting third position information, that is based on the second PRS resource measurement, from the first UE based on the second PRS resource measurement differing unacceptably from the first PRS resource measurement.

56. A non-transitory, processor-readable storage medium comprising processor-readable instructions to cause a processor of a first UE (user equipment) to:
receive a UE group indication indicating a group of UEs including the first UE and a second UE; and
communicate, using sidelink communication, with the second UE to identify first position information to be determined by the first UE, or second position information to be determined by the second UE, or a combination thereof.

57. The storage medium of clause 56, further comprising processor-readable instructions to cause the processor to:
determine the first position information; and
transmit the first position information, and a UE group identification in association with the first position information, to a network entity.

58. The storage medium of clause 56, further comprising processor-readable instructions to cause the processor to:
determine the first position information;
receive a delegate indication that a third UE, separate from the first UE and the second UE, is a delegate of the group of UEs; and
transmit the first position information, and a UE group identification in association with the first position information, to the third UE based on receiving the delegate indication.

59. The storage medium of clause 56, further comprising processor-readable instructions to cause the processor to:
determine the first position information;
receive a delegate indication that the second UE is a delegate of the group of UEs; and
transmit the first position information to the second UE based on receiving the delegate indication.

60. The storage medium of clause 56, further comprising processor-readable instructions to cause the processor to:
measure a PRS resource (positioning reference signal resource) to determine a first PRS resource measurement;
receive a second PRS resource measurement;
compare the first PRS resource measurement and the second PRS resource measurement; and
transmit the first position information, based on the first PRS resource measurement, without transmitting third position information, that is based on the second PRS resource measurement, based on the second PRS resource measurement differing unacceptably from the first PRS resource measurement.

Third Implementation Examples

Further implementation examples are provided in the following numbered clauses.

1. A first UE (user equipment) comprising:
a transceiver;
a memory; and
a processor, communicatively coupled to the transceiver and the memory, configured to:
measure a first PRS resource (positioning reference signal resource) to determine a first PRS measurement;
receive, via the transceiver from a second UE via sidelink communication, a second PRS measurement of a second PRS resource; and
determine whether at least one of the first PRS measurement or the second PRS measurement is unreliable based on a relationship of the first PRS measurement to the second PRS measurement.

2. The first UE of clause 1, wherein the processor is further configured to determine whether at least one of the first PRS measurement or the second PRS measurement is unreliable only if the second UE is within a threshold proximity of the first UE.

3. The first UE of clause 1, wherein the processor is further configured to determine that at least one of the first PRS measurement or the second PRS measurement is unreliable based on the first PRS measurement differing from the second PRS measurement by more than a threshold.

4. The first UE of clause 3, wherein the processor is further configured to identify the first PRS measurement or the second PRS measurement as an unreliable measurement based on timing of the first PRS resource relative to the second PRS resource.

5. The first UE of clause 4, wherein the processor is further configured to transmit, to the second UE via the transceiver based on the second PRS measurement being identified as the unreliable measurement, an indication that the second PRS measurement is unreliable.

6. The first UE of clause 4, wherein the processor is further configured to abstain from using the unreliable measurement to determine a position estimate for the first UE.

7. The first UE of clause 4, wherein the processor is further configured to abstain from transmitting the unreliable measurement to a network entity via the transceiver.
8. The first UE of clause 4, wherein the processor is further configured to transmit, to the second UE via the transceiver, a request for a PRS-ID (PRS identity) of the second PRS resource based on the first PRS measurement being identified as the unreliable measurement.
9. The first UE of clause 4, wherein the processor is further configured to measure a next instance of the second PRS resource instead of a next instance of the first PRS resource based on the first PRS measurement being identified as the unreliable measurement.
10. The first UE of clause 3, wherein the processor is further configured to determine the threshold based on a distance between the first UE and the second UE, or a measurement uncertainty, or a measurement resolution, or any combination thereof.
11. A first UE (user equipment) comprising:
means for measuring a first PRS resource (positioning reference signal resource) to determine a first PRS measurement;
means for receiving, from a second UE via sidelink communication, a second PRS measurement of a second PRS resource; and
means for determining whether at least one of the first PRS measurement or the second PRS measurement is unreliable based on a relationship of the first PRS measurement to the second PRS measurement.
12. The first UE of clause 11, wherein the means for determining comprise means for determining whether at least one of the first PRS measurement or the second PRS measurement is unreliable only if the second UE is within a threshold proximity of the first UE.
13. The first UE of clause 11, wherein the means for determining comprise means for determining that at least one of the first PRS measurement or the second PRS measurement is unreliable based on the first PRS measurement differing from the second PRS measurement by more than a threshold.
14. The first UE of clause 13, further comprising means for identifying the first PRS measurement or the second PRS measurement as an unreliable measurement based on timing of the first PRS resource relative to the second PRS resource.
15. The first UE of clause 14, further comprising means for transmitting, to the second UE based on the second PRS measurement being identified as the unreliable measurement, an indication that the second PRS measurement is unreliable.
16. The first UE of clause 14, further comprising means for abstaining from using the unreliable measurement to determine a position estimate for the first UE.
17. The first UE of clause 14, further comprising means for abstaining from transmitting the unreliable measurement to a network entity.
18. The first UE of clause 14, further comprising means for transmitting, to the second UE, a request for a PRS-ID (PRS identity) of the second PRS resource based on the first PRS measurement being identified as the unreliable measurement.
19. The first UE of clause 14, further comprising means for measuring a next instance of the second PRS resource instead of a next instance of the first PRS resource based on the first PRS measurement being identified as the unreliable measurement.
20. The first UE of clause 13, further comprising means for determining the threshold based on a distance between the first UE and the second UE, or a measurement uncertainty, or a measurement resolution, or any combination thereof.
21. A method of cross validating a positioning reference signal (PRS), the method comprising:
measuring, at a first UE (user equipment), a first PRS resource to determine a first PRS measurement;
receiving, from a second UE via sidelink communication, a second PRS measurement of a second PRS resource; and
determining whether at least one of the first PRS measurement or the second PRS measurement is unreliable based on a relationship of the first PRS measurement to the second PRS measurement.
22. The method of clause 21, wherein determining whether at least one of the first PRS measurement or the second PRS measurement is unreliable comprises determining whether at least one of the first PRS measurement or the second PRS measurement is unreliable only if the second UE is within a threshold proximity of the first UE.
23. The method of clause 21, wherein determining whether at least one of the first PRS measurement or the second PRS measurement is unreliable comprises determining that at least one of the first PRS measurement or the second PRS measurement is unreliable based on the first PRS measurement differing from the second PRS measurement by more than a threshold.
24. The method of clause 23, further comprising identifying the first PRS measurement or the second PRS measurement as an unreliable measurement based on timing of the first PRS resource relative to the second PRS resource.
25. The method of clause 24, further comprising transmitting, to the second UE based on the second PRS measurement being identified as the unreliable measurement, an indication that the second PRS measurement is unreliable.
26. The method of clause 24, further comprising abstaining from using the unreliable measurement to determine a position estimate for the first UE.
27. The method of clause 24, further comprising abstaining from transmitting the unreliable measurement to a network entity.
28. The method of clause 24, further comprising transmitting, to the second UE, a request for a PRS-ID (PRS identity) of the second PRS resource based on the first PRS measurement being identified as the unreliable measurement.
29. The method of clause 24, further comprising measuring a next instance of the second PRS resource instead of a next instance of the first PRS resource based on the first PRS measurement being identified as the unreliable measurement.
30. The method of clause 23, further comprising determining the threshold based on a distance between the first UE and the second UE, or a measurement uncertainty, or a measurement resolution, or any combination thereof.
31. A non-transitory, processor-readable storage medium comprising processor-readable instructions to cause a processor of a first UE (user equipment) to:

measure a first PRS resource (positioning reference signal resource) to determine a first PRS measurement;

receive, from a second UE via sidelink communication, a second PRS measurement of a second PRS resource; and determine whether at least one of the first PRS measurement or the second PRS measurement is unreliable based on a relationship of the first PRS measurement to the second PRS measurement.

32. The storage medium of clause 31, wherein the processor-readable instructions to cause the processor to determine whether at least one of the first PRS measurement or the second PRS measurement is unreliable comprise processor-readable instructions to cause the processor to determine whether at least one of the first PRS measurement or the second PRS measurement is unreliable only if the second UE is within a threshold proximity of the first UE.

33. The storage medium of clause 31, wherein the processor-readable instructions to cause the processor to determine whether at least one of the first PRS measurement or the second PRS measurement is unreliable comprise processor-readable instructions to cause the processor to determine that at least one of the first PRS measurement or the second PRS measurement is unreliable based on the first PRS measurement differing from the second PRS measurement by more than a threshold.

34. The storage medium of clause 33, further comprising processor-readable instructions to cause the processor to identify the first PRS measurement or the second PRS measurement as an unreliable measurement based on timing of the first PRS resource relative to the second PRS resource.

35. The storage medium of clause 34, further comprising processor-readable instructions to cause the processor to transmit, to the second UE based on the second PRS measurement being identified as the unreliable measurement, an indication that the second PRS measurement is unreliable.

36. The storage medium of clause 34, further comprising processor-readable instructions to cause the processor to abstain from using the unreliable measurement to determine a position estimate for the first UE.

37. The storage medium of clause 34, further comprising processor-readable instructions to cause the processor to abstain from transmitting the unreliable measurement to a network entity.

38. The storage medium of clause 34, further comprising processor-readable instructions to cause the processor to transmit, to the second UE, a request for a PRS-ID (PRS identity) of the second PRS resource based on the first PRS measurement being identified as the unreliable measurement.

39. The storage medium of clause 34, further comprising processor-readable instructions to cause the processor to measure a next instance of the second PRS resource instead of a next instance of the first PRS resource based on the first PRS measurement being identified as the unreliable measurement.

40. The storage medium of clause 33, further comprising processor-readable instructions to cause the processor to determine the threshold based on a distance between the first UE and the second UE, or a measurement uncertainty, or a measurement resolution, or any combination thereof.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

As used herein, the term RS (reference signal) may refer to one or more reference signals and may apply, as appropriate, to any form of the term RS, e.g., PRS, SRS, CSI-RS, etc.

As used herein, unless otherwise stated, a statement that a function or operation is "based on" an item or condition means that the function or operation is based on the stated item or condition and may be based on one or more items and/or conditions in addition to the stated item or condition.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that communication using the wireless communication device is exclusively, or evenly primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or ±0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or ±0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A communication device for managing a UE group (user equipment group), the communication device comprising:
    a transceiver;
    a memory; and
    a processor, communicatively coupled to the transceiver and the memory, configured to:
        determine a plurality of UEs of the UE group based on proximity of each of the plurality of UEs to at least one other UE of the plurality of UEs;
        transmit, via the transceiver to at least one of the plurality of UEs of the UE group, an indication of the UE group;
        transmit, via the transceiver, a positioning request to a selected UE of the plurality of UEs of the UE group for the selected UE to provide requested position information; and
        transmit, via the transceiver, a sharing request to the selected UE of the plurality of UEs of the UE group for the selected UE to share the requested position information with a designated UE of the plurality of UEs of the UE group.

2. The communication device of claim 1, wherein the indication of the UE group includes a group identification.

3. The communication device of claim 1, wherein the processor is configured to determine the plurality of UEs of the UE group based on proximity of all of the plurality of UEs of the UE group.

4. The communication device of claim 1, wherein the processor is further configured to:
    receive a joining request via the transceiver indicating a prospective UE group member; and determine whether to include the prospective UE group member in the plurality of UEs of the UE group in response to receiving the joining request.

5. The communication device of claim 1, wherein the processor is further configured to:
   detect a new sidelink connection to a prospective UE group member; and
   determine whether to include the prospective UE group member in the plurality of UEs of the UE group in response to detecting the new sidelink connection to the prospective UE group member.

6. The communication device of claim 1, wherein the processor is further configured to transmit a delegate indication to a selected UE of the plurality of UEs of the UE group indicating for the selected UE to act as a delegate of the UE group by collecting respective position information from one or more UEs of the plurality of UEs of the UE group and transmitting the respective position information to a network entity.

7. The communication device of claim 1, wherein the processor is further configured to transmit, via the transceiver, a group-change indication indicating a new member of the UE group, removal of a previous member of the UE group, or a combination thereof.

8. The communication device of claim 7, wherein the processor is configured to transmit the group-change indication indicating removal of the previous member of the UE group at least one of in response to receiving a request for removal of the previous member of the UE group or in response to loss of sidelink connection between the communication device and the previous member of the UE group.

9. A communication device for managing a UE group (user equipment group), the communication device comprising:
   means for determining a plurality of UEs of the UE group based on proximity of each of the plurality of UEs to at least one other UE of the plurality of UEs;
   means for transmitting, to at least one of the plurality of UEs of the UE group, an indication of the UE group;
   means for transmitting a positioning request to a selected UE of the plurality of UEs of the UE group for the selected UE to provide requested position information; and
   means for transmitting a sharing request to the selected UE of the plurality of UEs of the UE group for the selected UE to share the requested position information with a designated UE of the plurality of UEs of the UE group.

10. The communication device of claim 9, wherein the indication of the UE group includes a group identification.

11. The communication device of claim 9, further comprising means for determining the plurality of UEs of the UE group based on proximity of all of the plurality of UEs of the UE group.

12. The communication device of claim 9, further comprising:
   means for receiving a joining request indicating a prospective UE group member; and
   means for determining whether to include the prospective UE group member in the plurality of UEs of the UE group in response to receiving the joining request.

13. The communication device of claim 9, further comprising:
   means for detecting a new sidelink connection to a prospective UE group member; and
   means for determining whether to include the prospective UE group member in the plurality of UEs of the UE group in response to detecting the new sidelink connection to the prospective UE group member.

14. The communication device of claim 9, further comprising means for transmitting a delegate indication to a selected UE of the plurality of UEs of the UE group indicating for the selected UE to act as a delegate of the UE group by collecting respective position information from one or more UEs of the plurality of UEs of the UE group and transmitting the respective position information to a network entity.

15. The communication device of claim 9, further comprising means for transmitting a group-change indication indicating a new member of the UE group, removal of a previous member of the UE group, or a combination thereof.

16. The communication device of claim 15, wherein the means for transmitting the group-change indication comprise means for transmitting the group-change indication indicating removal of the previous member of the UE group at least one of in response to receiving a request for removal of the previous member of the UE group or in response to loss of sidelink connection between the communication device and the previous member of the UE group.

17. A method of managing a UE group (user equipment group), the method comprising:
   determining a plurality of UEs of the UE group based on proximity of each of the plurality of UEs to at least one other UE of the plurality of UEs;
   transmitting, from a communication device, to at least one of the plurality of UEs of the UE group, an indication of the UE group;
   transmitting a positioning request to a selected UE of the plurality of UEs of the UE group for the selected UE to provide requested position information; and
   transmitting a sharing request to the selected UE of the plurality of UEs of the UE group for the selected UE to share the requested position information with a designated UE of the plurality of UEs of the UE group.

18. The method of claim 17, wherein the indication of the UE group includes a group identification.

19. The method of claim 17, further comprising determining the plurality of UEs of the UE group based on proximity of all of the plurality of UEs of the UE group.

20. The method of claim 17, further comprising:
   receiving a joining request indicating a prospective UE group member; and
   determining whether to include the prospective UE group member in the plurality of UEs of the UE group in response to receiving the joining request.

21. The method of claim 17, further comprising:
   detecting a new sidelink connection to a prospective UE group member; and
   determining whether to include the prospective UE group member in the plurality of UEs of the UE group in response to detecting the new sidelink connection to the prospective UE group member.

22. The method of claim 17, further comprising transmitting a delegate indication to a selected UE of the plurality of UEs of the UE group indicating for the selected UE to act as a delegate of the UE group by collecting respective position information from one or more UEs of the plurality of UEs of the UE group and transmitting the respective position information to a network entity.

23. The method of claim 17, further comprising transmitting a group-change indication indicating a new member of the UE group, removal of a previous member of the UE group, or a combination thereof.

24. The method of claim 23, wherein the group-change indication indicates removal of the previous member of the UE group at least one of in response to receiving a request for removal of the previous member of the UE group or in response to loss of sidelink connection between the communication device and the previous member of the UE group.

25. A non-transitory, processor-readable storage medium comprising processor-readable instructions to cause a processor of a communication device, in order to manage a UE group (user equipment group), to:
  determine a plurality of UEs of the UE group based on proximity of each of the plurality of UEs to at least one other UE of the plurality of UEs;
  transmit, to at least one of the plurality of UEs of the UE group, an indication of the UE group;
  transmit a positioning request to a selected UE of the plurality of UEs of the UE group for the selected UE to provide requested position information; and
  transmit a sharing request to the selected UE of the plurality of UEs of the UE group for the selected UE to share the requested position information with a designated UE of the plurality of UEs of the UE group.

26. The storage medium of claim 25, wherein the indication of the UE group includes a group identification.

27. The storage medium of claim 25, further comprising processor-readable instructions to cause the processor to determine the plurality of UEs of the UE group based on proximity of all of the plurality of UEs of the UE group.

28. The storage medium of claim 25, further comprising processor-readable instructions to cause the processor to:
  receive a joining request indicating a prospective UE group member; and
  determine whether to include the prospective UE group member in the plurality of UEs of the UE group in response to receiving the joining request.

29. The storage medium of claim 25, further comprising processor-readable instructions to cause the processor to:
  detect a new sidelink connection to a prospective UE group member; and
  determine whether to include the prospective UE group member in the plurality of UEs of the UE group in response to detecting the new sidelink connection to the prospective UE group member.

30. The storage medium of claim 25, further comprising processor-readable instructions to cause the processor to transmit a delegate indication to a selected UE of the plurality of UEs of the UE group indicating for the selected UE to act as a delegate of the UE group by collecting respective position information from one or more UEs of the plurality of UEs of the UE group and transmitting the respective position information to a network entity.

31. The storage medium of claim 25, further comprising processor-readable instructions to cause the processor to transmit a group-change indication indicating a new member of the UE group, removal of a previous member of the UE group, or a combination thereof.

32. The storage medium of claim 31, wherein the processor-readable instructions to cause the processor to transmit the group-change indication comprise processor-readable instructions to cause the processor to transmit the group-change indication indicating removal of the previous member of the UE group at least one of in response to receiving a request for removal of the previous member of the UE group or in response to loss of sidelink connection between the communication device and the previous member of the UE group.

* * * * *